(12) United States Patent
Popper et al.

(10) Patent No.: US 6,579,815 B1
(45) Date of Patent: Jun. 17, 2003

(54) RAPID FABRIC FORMING

(75) Inventors: Peter Popper, Wilmington, DE (US); William Charles Walker, Wilmington, DE (US); Albert S. Tam, Hockessin, DE (US); James K. Odle, Newark, DE (US); George Yeaman Thomson, Jr., Oxford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/507,822

(22) Filed: Feb. 22, 2000

Related U.S. Application Data

(62) Division of application No. 08/953,360, filed on Oct. 17, 1997, now Pat. No. 6,107,220.
(60) Provisional application No. 60/028,696, filed on Oct. 18, 1996.

(51) Int. Cl.[7] .............................. D04H 3/05; B32B 27/12
(52) U.S. Cl. ....................... 442/366; 156/180; 156/169; 156/173; 156/175; 156/181; 428/105; 428/107; 428/109; 428/114; 442/394
(58) Field of Search .................................. 442/366, 394; 428/105, 107, 109, 114; 156/180–181, 169, 173, 175

(56) References Cited

U.S. PATENT DOCUMENTS

| 2,982,327 A | 5/1961 | Vanzo et al. .................. 152/361 |
|---|---|---|
| 3,024,828 A | 3/1962 | Smith et al. .................. 152/354 |
| 3,554,826 A | 1/1971 | Macaluso ..................... 156/82 |
| 3,575,752 A | 4/1971 | Carpenter .................... 156/73 |
| 3,589,426 A | 6/1971 | Varmer ....................... 152/361 |
| 3,728,195 A | 4/1973 | Bolles ........................ 156/441 |
| 3,729,365 A | 4/1973 | Greene ........................ 161/57 |
| 3,761,341 A | 9/1973 | Kimble ....................... 156/446 |
| 3,769,142 A | 10/1973 | Holmes et al. ................ 161/53 |
| 4,030,168 A | 6/1977 | Cole .......................... 28/101 |
| 4,200,937 A | 5/1980 | Off et al. ..................... 2/227 |
| 4,325,999 A | 4/1982 | Campman et al. .......... 428/112 |
| 4,366,658 A | 1/1983 | Maistre ....................... 52/648 |
| 4,594,122 A | 6/1986 | McConnell ................. 156/433 |
| 4,600,456 A | 7/1986 | Oswald ....................... 156/117 |
| 4,631,101 A | 12/1986 | Rix ............................ 156/175 |
| 4,830,781 A | 5/1989 | Oswald ....................... 152/530 |
| 4,838,966 A | 6/1989 | Oswald ....................... 156/117 |
| 5,137,058 A | 8/1992 | Anahara et al. ........... 139/384 R |
| 5,192,597 A | 3/1993 | Forsythe .................... 428/34.5 |
| 5,482,584 A | 1/1996 | Herrmann et al. .......... 156/172 |

FOREIGN PATENT DOCUMENTS

| DE | 42 12 135 | 10/1993 | ........ B65H/81/00 |
|---|---|---|---|
| FR | 1 145 298 | 10/1957 | |
| FR | 2 743 821 | 7/1997 | ........... D04H/3/04 |

*Primary Examiner*—Cheryl A. Juska

(57) ABSTRACT

The invention concerns a method of forming a fabric of interlaced yarn by arranging on a surface a plurality of yarn guide blocks, each guide block adapted to guide yarn from a yarn source to the surface and wherein the relative motion of the yarn guide blocks and surface serves to deposit yarn from the guides onto the surface in such a way that when said yarns are deposited on a surface, the diagonal positions of the yarns from one block are offset from a direct overlapping alignment with the yarns from the remaining blocks to thereby densely cover the surface during repeated cycles of such motion.

15 Claims, 33 Drawing Sheets

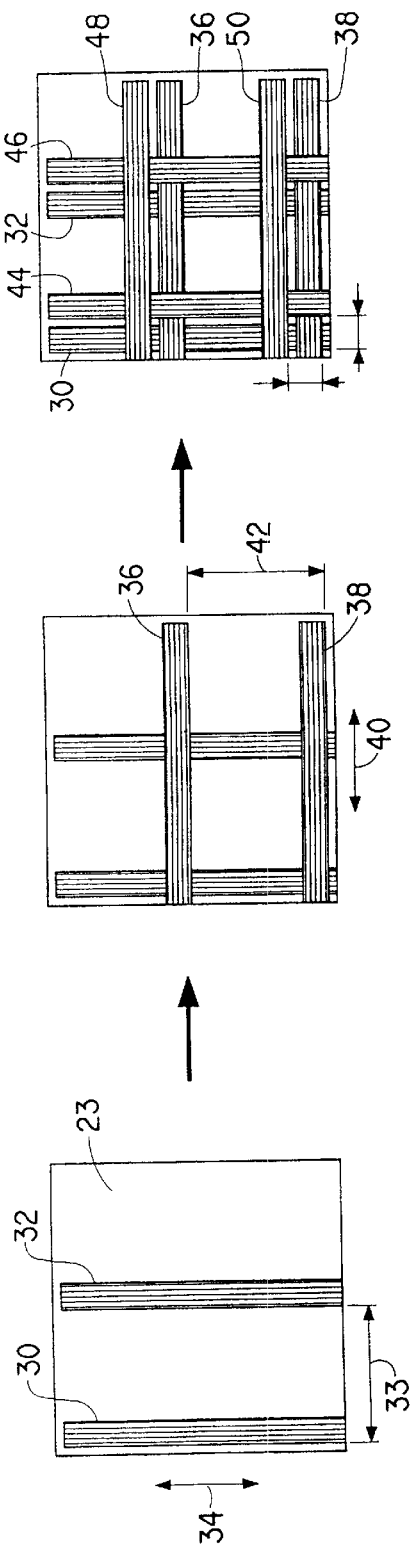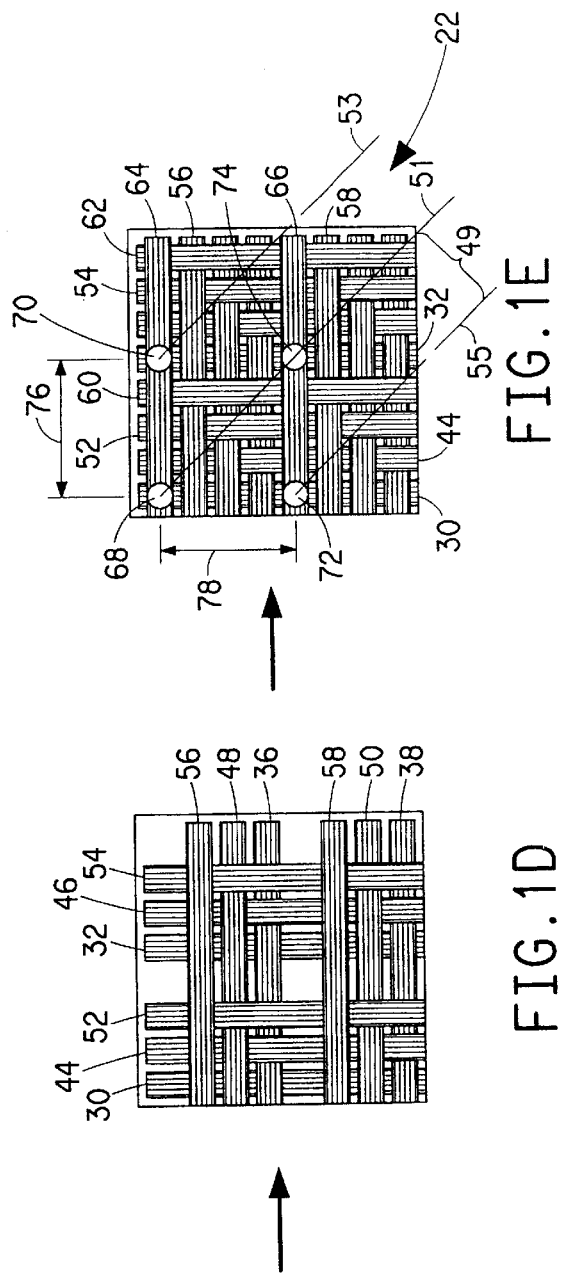

213

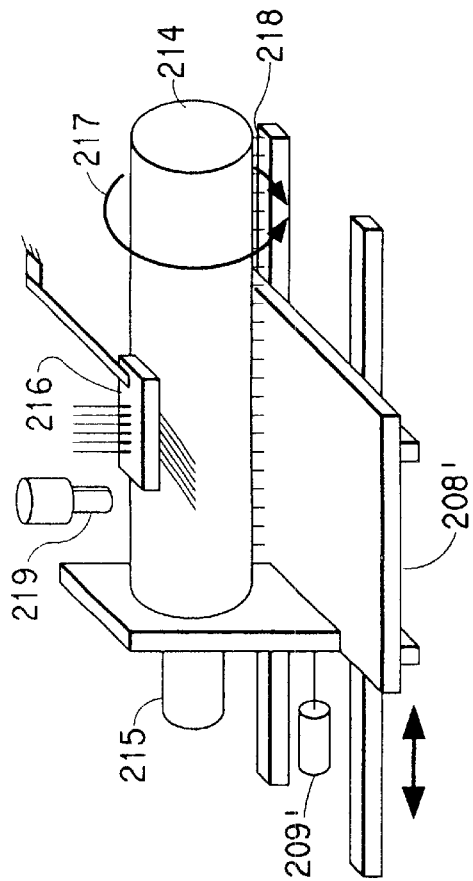
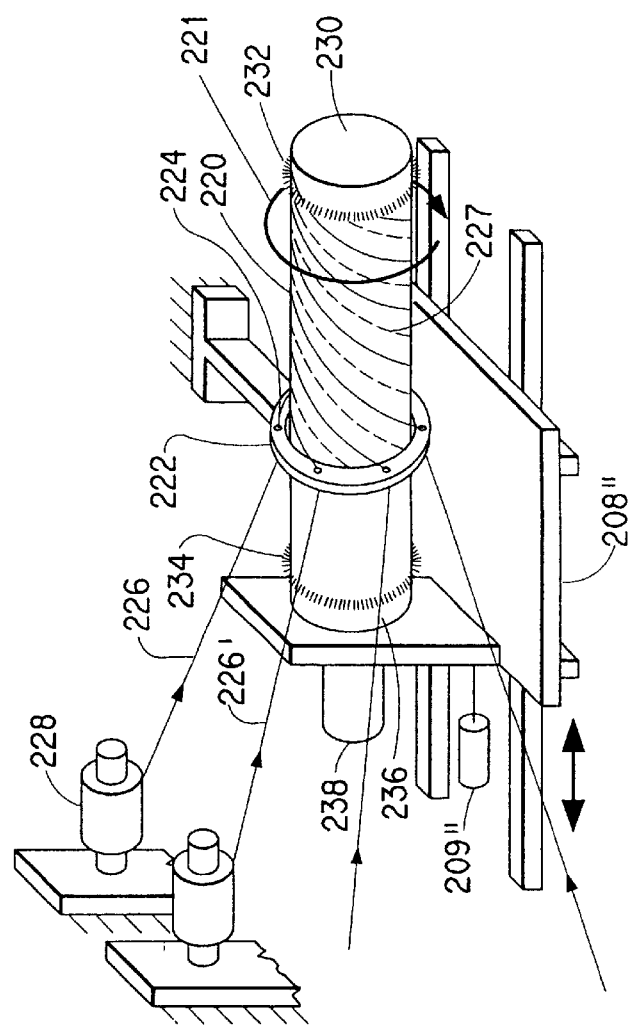
FIG. 11A
FIG. 11B

FIG. 19E
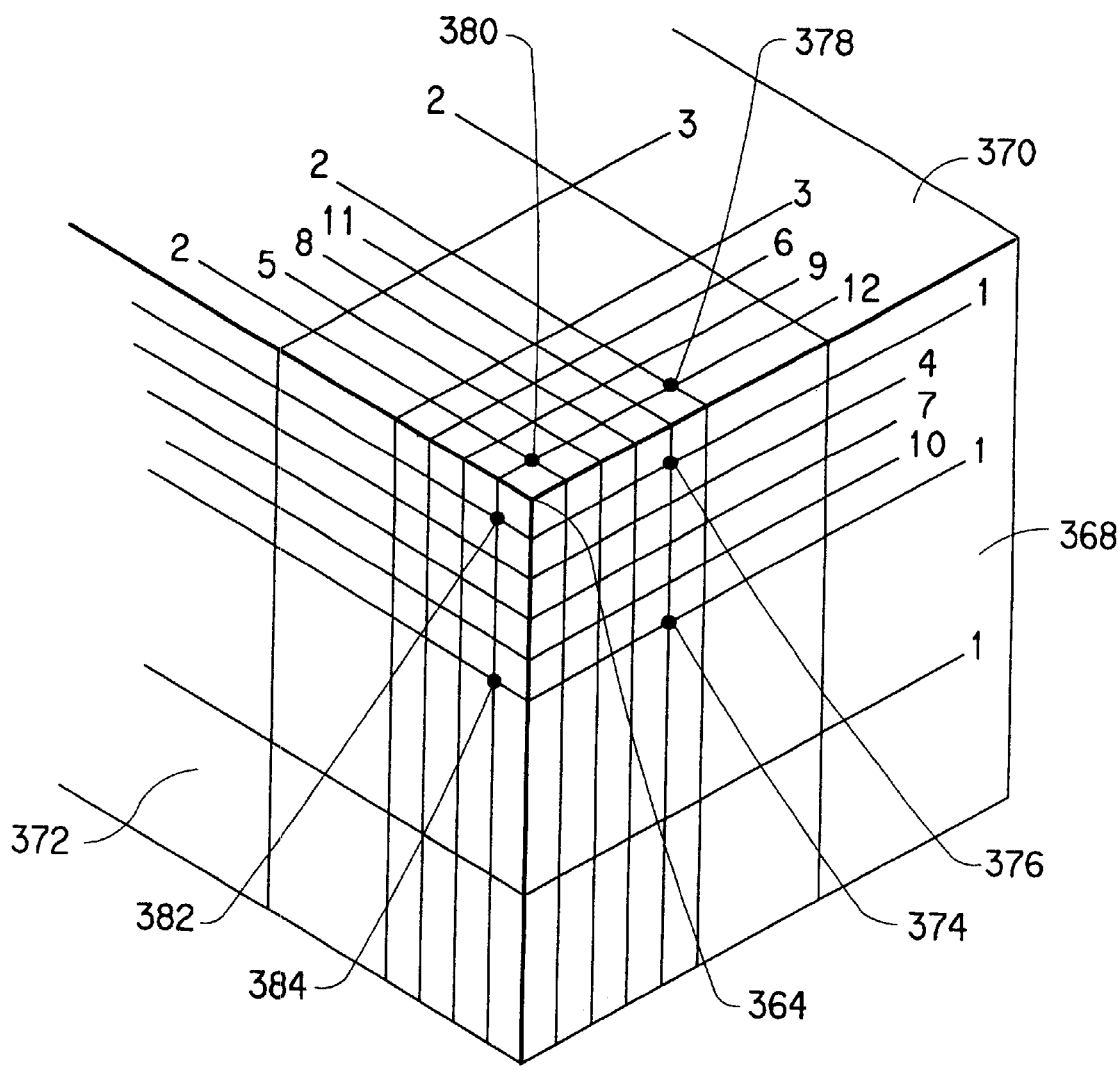
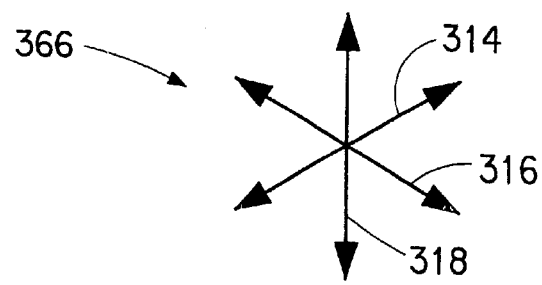

RAPID FABRIC FORMING

This application is a division of Ser. No. 08/953,360, filed on Oct. 17, 1997, now U.S. Pat. No. 6,107,220, which claims the priority of Provisional No. 60/028,696, filed on Oct. 18, 1996.

FIELD OF THE INVENTION

The invention teaches a process and apparatus to rapidly form a flat or shaped fabric and the fabric formed thereby consisting of groups of yarn densely covering an area.

TECHNICAL BACKGROUND

Textile fabric is often formed from strands, or filaments, of yarn by weaving or knitting or the like to hold the strands together. Processes of weaving and knitting where strands are guided over and under adjacent strands are slow and do not permit much variety in forming fabric shapes. In a loom for weaving fabrics, the weft yarns are added one at a time. These processes typically result in flat or cylindrical fabrics. There is a need for a process that, in addition to making flat or cylindrical fabrics, permits more variety in forming fabrics with random three dimensional shapes, for instance, that would permit forming an article of clothing, such as a shirt, without having to cut pieces of fabric and seam them together. The cutting of fabric into irregularly shaped patterns wastes a lot of fabric, plus cutting and sewing add steps over forming the fabric article directly. The same problem is present in making flexible engineered shapes such as automotive air bags, sail boat sails, industrial filter bags, or the like. In these cases, the need for seams to form three dimensional shapes presents problems with structural strength and/or permeability so the seams must be carefully made.

There is a need for a way to rapidly form a flexible fabric from strands of yarn; there is a need for a way to rapidly form a three dimensional, flexible, fabric article without cutting a flat fabric and seaming.

There is also a problem making complex shapes for composite structures that may be impregnated with a hardenable resin. It is sometimes desired to lay down the filaments in a three dimensional shape before adding the resin or during resin addition. Present means for doing so involve complex forms with retractable support means to hold the filaments in place before the resin hardens. There is a need for a simpler way to preform these fabric shapes without seams. Such seams would compromise the strength of the composite structure.

A series of Oswald patents (U.S. Pat. No. 4,600,456; U.S. Pat. No. 4,830,781; and U.S. Pat. No. 4,838,966) lay down a pattern of partially vulcanized rubber coated strips, or cords, to make a loop of preformed reinforcing belt for a vehicle tire. The strips or cords are stuck together wherever they touch to make a relatively stiff structure. The cords are laid in a "zig-zag repeating pattern with succeeding lengths of the strips being displaced from each other. The cord lengths are interleaved with lengths of cords disposed at an opposite angle. This interleaving relationship results in a woven structure". The stickiness of the partially vulcanized rubber apparently holds the cords in place to a forming surface and to each other until the belt is assembled with other elements of the tire and molded under heat and pressure to form a completed tire.

The process practiced by Oswald and others uses one or a few cords that are traversed back and forth across the belt numerous times to complete one circumference. This is believed to result in a multilayered structure where the cords in any one layer are sparsely arrayed, but they do not completely cover the belt area. It is only after repeated zig-zag passes over the belt area that the area becomes sparsely covered with cord. Due to the repeated zig-zag passes of only a few cords, it is believed that within any one layer there are cords layed down in two different directions that do not cross one another. Cords that cross one another would be in different layers. These structural features of the reinforcing belts are symptomatic of a process that lays down only a few cords at a time and must make repeated passes over the belt area to get coverage of the area. There is a need for a simple non-weaving process that can make fabric structures by laying down many yarns simultaneously over a fabric area to sparsely cover it rapidly, and to stack several of such sparse yarn coverages to densely cover the area.

SUMMARY OF THE INVENTION

The invention concerns a fabric product and its variations, processes for making the product and variations on such processes and several forms of automated devices for making preferred forms of the product. Included in the invention are the following embodiments:

A fabric structure comprising:
  a plurality of groups of yarn densely covering an area and the yarns within one group following substantially parallel paths (defined to include loops in a yarn path) and the yarns in one group arranged to cross yarns in another group;
  a plurality of subgroups comprising each group, each subgroup comprising a plurality of yarns sparsely covering said area, and the yarns in one subgroup of one group offset from the yarns in the other subgroups in said one group;
  a plurality of connections between the top subgroup of the structure and the bottom subgroup of the structure either directly or through the yarns in other subgroups.

In other embodiments, there are unconnected regions separate from the connections and the inherent flexibility of the yarns in the structure is retained in the unconnected regions.

In other embodiments, the connections are spaced apart bonded regions and there are unbonded regions separate from the bonded regions and the inherent flexibility of the yarns is retained in the unbonded regions.

In further embodiments, the yarns in a subgroup follow substantially parallel paths that cause each of the yarns to cross itself within a subgroup and to cross its neighbors within a group.

In other embodiments, the yarns in a subgroup of one group are folded over to become the yarns in a subgroup of another group and thereby to cross them.

In other embodiments, a film or nonwoven sheet is placed between two adjacent subgroups within the structure.

In other embodiments, there are three groups of yarn employed in the fabric structure to make a stacked triaxial fabric structure.

Also claimed herein is a method of forming such an interlaced structure comprising:
  laying down a first yarn subgroup having a plurality of yarns oriented in a first angular direction free of crossings, the yarns in the first subgroup following substantially parallel paths that are spaced apart in a repeating pattern to sparsely cover a predetermined fabric area;

stacking a second yarn subgroup next to the first yarn subgroup, the second yarn subgroup having a plurality of yarns oriented in a second angular direction free of crossings, the yarns in the second subgroup following substantially parallel paths that are spaced apart in a repeating pattern to sparsely cover the predetermined fabric area;

continuing alternately stacking a plurality of first yarn subgroups and a plurality of second yarn subgroups comprising the substeps of:

offsetting the plurality of yarns in any one subgroup of the plurality of first subgroups from the plurality of yarns in all other subgroups of the first plurality of subgroups, and laying down all the yarns in one of the first plurality of subgroups before laying down the yarns in another subgroup;

offsetting the plurality of yarns in any one subgroup of the plurality of second subgroups from the plurality of yarns in all other subgroups of the second plurality of subgroups and laying down all the yarns in one of the second plurality of subgroups before laying down the yarns in another subgroup;

stopping the stacking when all of the plurality of first subgroups form a first yarn group comprising yarns that densely cover the predetermined fabric area, and when the stacking of all of the plurality of second subgroups form a second yarn group comprising yarns that densely cover the predetermined fabric area; and connecting the yarns in the top subgroup in the stack to the yarns in the bottom subgroup in the stack to thereby contain the other subgroups in the stack and form an interlaced fabric structure.

The method as above further comprising: urging the stacked subgroup of each group to nest together into a consolidated structure where the yarns in one group bend over the yarns in the adjacent groups.

The method as above wherein the connecting step comprises bonding said subgroups at spaced regions and providing unbonded regions separate from the bonded regions wherein the inherent flexibility of the yarns is retained in the unbonded regions.

Connecting the outermost subgroups may also include connecting strands from the innermost subgroups. The connecting means may consist of loops of yarn, spots of adhesive, bonded joints (such as those formed by squeezing the outermost groups together and applying ultrasonic energy to the squeezed yarns), staples and clips.

The invention is also a three dimensional shaped product and a process of rapidly forming a three dimensional shaped fabric where the yarns in the subgroups are not necessarily generally parallel, but are regularly spaced to follow the contours of the shape. The three dimensional, shaped, interlaced, fabric structure, comprises:

a stack of a first plurality of subgroups, a second plurality of subgroups, and a third plurality of subgroups, each subgroup having yarns spaced apart to define a sparse covering of a fabric area, the yarns generally parallel, and the yarns following a curved path in space;

the stacked subgroups arranged in a predetermined array with reference to a common axis and a common reference plane perpendicular to said axis;

the first subgroups arranged at a first angle with respect to said reference plane and positioned at a first rotational angle about said axis, the second subgroups arranged at a second angle with respect to said reference plane and positioned at a second rotational angle about said axis, the third subgroups arranged at a first angle with respect to said reference plane and positioned at a third rotational angle about said axis, wherein the yarns in any one of the first, second and third subgroups cross the yarns in another of the first, second and third subgroups; within each first, second and third plurality of subgroups, the yarns of one subgroup are offset from the yarns of the other subgroups to thereby form a group of yarns for each of the respective subgroups, the group for any respective subgroups densely covering a fabric area;

the top subgroup in the stack is connected to the bottom subgroup in the stack to thereby form a three-dimensional, shaped interlaced, fabric structure.

Further taught herein is a fabric forming device for forming a fabric structure from a plurality of yarns, comprising:

(a) an endless loop conveyor having a traveling support surface for supporting the fabric structure being formed, the surface having opposed edges parallel to the direction of travel and holders along each edge to temporarily hold the yarn to resist lateral motion of the yarn, the conveyor having a controllable motor for propelling the traveling support;

(b) a plurality of guide bars adapted for movement across the surface from edge to edge, each bar containing a plurality of guides for repeatedly guiding a plurality of yarns from the holders along one edge to the holders along the opposed edge and back to the one edge, the guide bars having a controllable actuator for propelling the bars back and forth across the support surface;

(c) a plurality of bonders arranged across the support surface between the support surface edges and beyond the last guide bar in the direction of travel of the surface, the bonders adapted to bond one yarn to another yarn where they cross;

(d) a controller for coordinating the controllable motor; and actuators to continuously form a fabric structure on the support surface of the conveyor.

A further embodiment is a yarn dispensing device for laying down yarn accurately on a compound curvature, when using a mechanical actuator, comprising the following elements:

(a) a mechanical guide actuating means;

(b) a yarn guide comprising a frame that supports a hollow shaft through which yarn can pass;

(c) a slide, attached to the yarn guide, and also attached to the guide actuating means;

(d) a block mounted on said hollow shaft which supports a plurality of flexible springs that intersect at a common point;

(e) at the point of intersection of the springs is a hollow tip with a hemispherical end through which the yarn can pass, said springs permitting motion of the tip in an axial or angular direction, the rotation of said shaft allowing the tip to roll over any surface it contacts while it is also free to deflect axially and angularly, so as to accurately place a yarn on the surface while the yarn passes through a hole in the hollow shaft and a hole in the hollow tip.

BRIEF DESCRIPTION OF THE FIGURES

FIGS. 1A–E show plan views of a progression of yarn laydown to form a basic two group (two-directional or biaxial) flexible fabric from a plurality of multiple-yarn subgroups.

FIG. 11A shows a mandrel apparatus for making a single batch of two-dimensional or three dimensional fabric structure.

FIG. 11B shows a mandrel apparatus for making a tubular batch of fabric structure.

FIGS. 19A–19E show a system for making a shirt fabric.

DETAILED DESCRIPTION

Figure 2A:
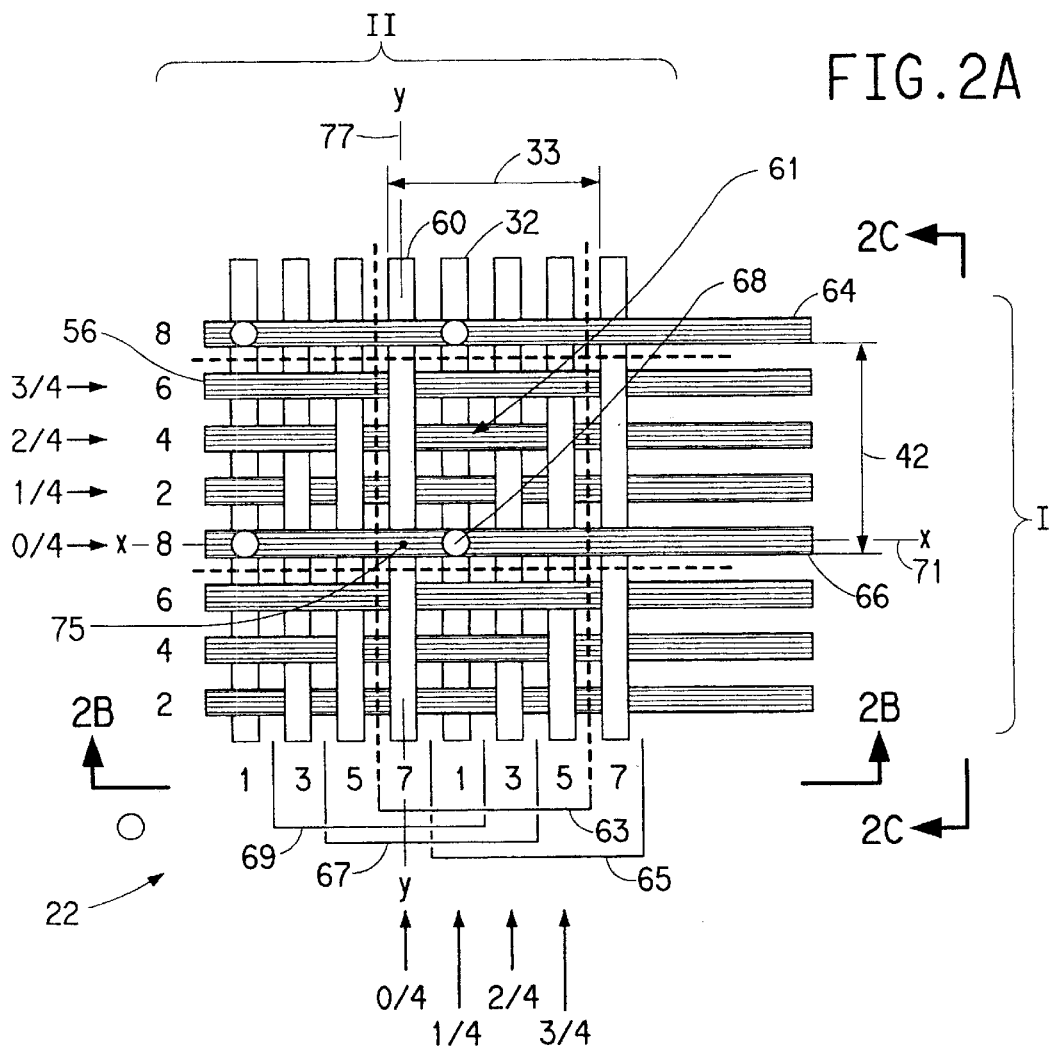
FIGS. 2A–E show plan and side views of the yarn subgroups of basic cells of the fabric.

FIGS. 1A–E show a simplified basic structure and process for forming a two-directional or biaxial yarn fabric 22 (FIG. 1E) of the invention on a planar surface 23. In FIG. 1A, two yarns 30 and 32 are laid down in a first direction, such as a ninety degree direction 34. Yarns 30 and 32 are spaced apart a cell distance, or space, 33 which may be about 3–20 yarn diameters (preferably 4–16, and most preferably 4–8); about four diameters are shown here to provide 4 positions for yarns to be laid down spaced from, or offset from, the other yarns in that direction. In FIG. 1B, two yarns 36 and 38 are laid down in a second direction, such as a zero degree direction 40, and on top of the first yarns. Yarns 36 and 38 are also spaced apart a cell distance, or space, 42 which is the same magnitude as cell distance 33 for these yarns of the same width. For yarns of different widths or for special effects, cell distances 33 and 42 may be different. In FIG. 1C, two yarns 44 and 46 are spaced apart at distance 33 and in direction 34, and are placed adjacent yarns 30 and 32 respectively, and on top of yarns 36 and 38. Two yarns 48 and 50 are then spaced apart at distance 42 and in direction 40, and are placed adjacent yarns 36 and 38 respectively, and on top of yarns 44 and 46. In FIG. 1D, two yarns 52 and 54 are spaced apart at distance 33 and in direction 34, and are placed adjacent yarns 44 and 46 respectively, and on top of yarns 48 and 50. Two yarns 56 and 58 are then spaced apart at distance 42 and in direction 40, and are placed adjacent yarns 48 and 50 respectively, and on top of yarns 52 and 54. In FIG. 1E, two yarns 60 and 62 are spaced apart at distance 33 and in direction 34, and are placed adjacent yarns 52 and 54 respectively, and on top of yarns 56 and 58. Two yarns 64 and 66 are then spaced apart at distance 42 and in direction 40, and are placed adjacent yarns 56 and 58 respectively, and on top of yarns 60 and 62.

This completes the yarn lay-down and a basic planar fabric structure 22 has been created of a plurality of yarns that are held in place now only by friction and gravity. It remains to secure the yarns in place. This is done in the simplest manner by attaching the top yarns 64 and 66 to the bottom yarns 30 and 32 where they cross at points 68, 70, 72, and 74. This now traps all the yarns in the structure together so they can not be removed in the manner in which they were assembled.

The structure shown in FIG. 1E is also shown in FIG. 2A expanded slightly and the ends of the yarns extended for purposes of further discussion. The structure as illustrated in FIG. 2A has a characteristic structure, or cell 61, that would be repeated in a large area of the fabric; it is shown outlined by heavy dashed lines. There is a crossing point between the uppermost yarns and lowermost yarns in each cell of this structure, such as point 68 in cell 61 where an uppermost yarn 66 crosses a lowermost yarn 32.

Figure 2B:
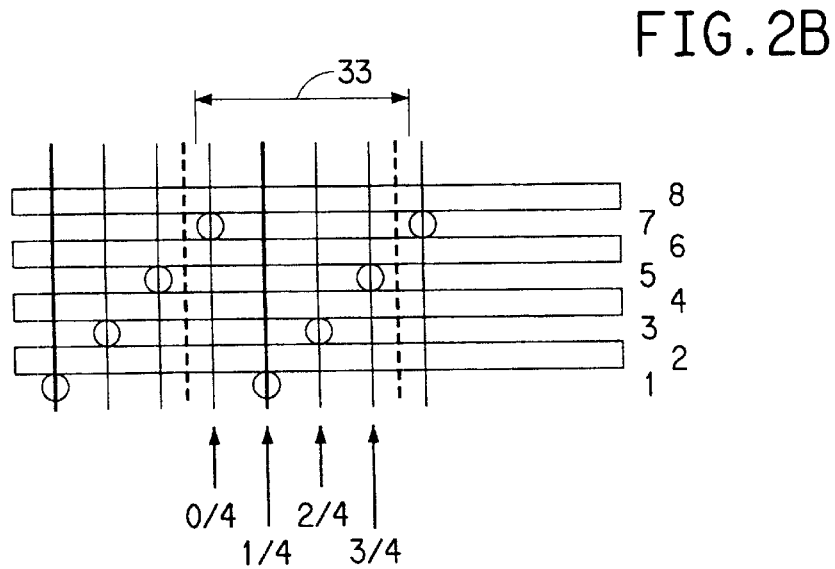
Figure 2C:
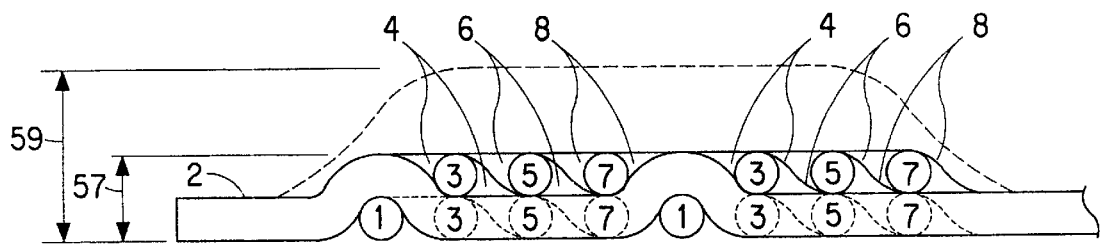

FIG. 2B shows a side elevation view 2B—2B of fabric 22 in FIG. 2A where the yarns are shown as rigid elements. It will be appreciated that since the yarns are flexible, if untensioned they will bend over and under one another in the structure and collapse to about a two-to-four yarn thickness so it will be difficult to pull unbonded yarns from the structure. This over and under path of a yarn in a structure is referred to in the fabric art as interlace. The more interlace that is present, the more the fabric is stable and the yarns tend to stay in place without shifting and opening up holes in the fabric. That is, the fabric has good integrity. This is a desirable feature for maintaining the covering ability of the fabric over an area. A representation of a fully collapsed structure is depicted in FIG. 2C where the individual yarns in each subgroup 1–8 are identified. The fully collapsed thickness at 57 is about the thickness of an individual yarn of one group in one direction, 34, stacked on top of an individual yarn of the other group in the other direction, 40. This fully consolidated thickness is about two yarn diameters thick which may be achieved by urging the yarns together with an increased amount of bonding. By controlling the bonding to be the minimum as shown in FIG. 2A, the fabric structure may be much bulkier and achieve a thickness 59 of 3–4 yarn diameters. This is 1½–2 times bulkier than if the same yarn were used in a woven structure. Alternatively, a less expensive, lower bulk yarn with less texture and/or crimp could be used in the structure of the invention to achieve the same bulky fabric as a woven structure using a more expensive high-bulk yarn. This is a unique advantage of the fabric of the invention.

Figure 2D:
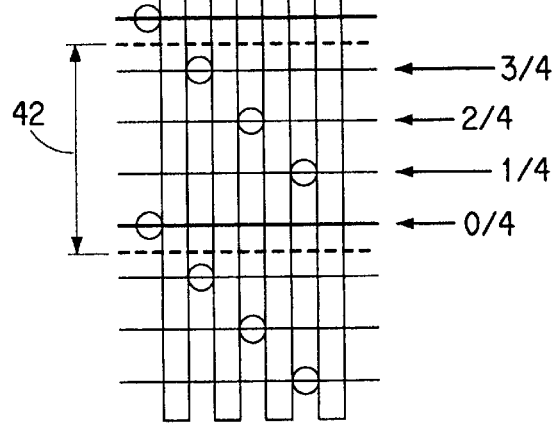
Figure 2E:
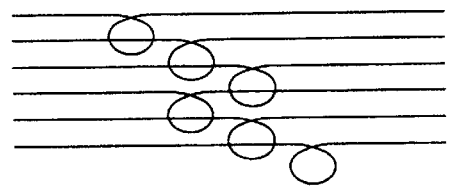

It is useful to develop some special definitions to discuss the general features of the invention referring to FIGS. 1E, 2A and 2B:

yarn—a predominantly one dimensional, elongated, flexible, fabric element essentially continuous in length such as a strand, fiber, filament, wire, rope, tape, ribbon, tow, thread, tube, string, or the like made up of one or more subelements that may be continuous in length (such as a continuous multi-filament yarn) or discontinuous in length (such as a staple yarn).

cell—a cell is the smallest section of a fabric where the yarn pattern appears to repeat over most of the fabric structure, and where, for convenience, the topmost yarn, such as yarn 66, lies along one side of the cell and the next topmost yarn, such as yarn 60, lies along the other side of the cell (other repeating units of the cell could be chosen if desired). In FIG. 2A, a complete cell is shown as cell 61. In some structures, the edges of the fabric may only have partial cells, or there may be several cells in a fabric with slightly different yarn laydown patterns that will repeat in the fabric. In some fabrics, there may be highly variable or very large cell repeats and it may not be useful to designate a cell; the entire fabric may be referred to as a cell.

group of yarn—a group of yarn comprises all the yarns in a fabric or cell in a given direction, such as a zero degree direction or a ninety degree direction. In FIG. 2A, the zero degree yarn group for all cells is designated by the Roman numeral I, and the ninety degree yarn group for all cells is designated by the Roman numeral II. The yarns in a group form a dense covering of yarn over an area and the yarns in a group follow substantially parallel paths which may include curved paths or looped paths where a given yarn may cross itself. To achieve the most dense covering, the yarns would all be non-intersecting and preferably parallel; for less dense covering, this is not necessary.

cell space—the cell space is the length of the side of a cell that determines the space available for the number of non-intersecting, non-overlapping yarns in a group. For simple repeating cells, this dimension defines the yarn spacing between sparsely spaced yarns in a subgroup (see below). For group II, the cell space is shown at 33; for group I, the cell space is shown at 42. Within the cell space 33 or 42 shown in FIGS. 1A, 1B, and 2A, there are four positions for the yarns in that group that are offset from one another. For the cell shown in FIG. 2A identified using the conventions developed, the cell space 33 is seen between the top yarns 64 and 66.

subgroup of yarn—a subgroup is a plurality of yarns making up a sparce subdivision of a group. The yarns in a group are stacked in subgroups with yarns of other groups. In FIGS. 2A, 2B and 2C the total of eight subgroups for a complete cell are labeled 1–8, shown at different levels of the stack in FIG. 2(b) with all the yarns in a subgroup given the same number; subgroups 1, 3, 5, 7 make up group I for cell 61 and subgroups 2, 4, 6, 8 make up group II for cell 61. Each subgroup considered by itself is a sparse covering of yarns over the fabric area. For instance, the yarns labeled 1 make up subgroup 1 and they are spaced apart at cell spacing 33. The yarns labeled 1 comprise the lowermost subgroup of group I and also the cell, and they are stacked against the yarns labeled 2 in the lowermost subgroup of group II in the cell. The yarns in the different subgroups in group I are non-intersecting, that is, in a plan view they do not lay on top of one another, although in special cases involving yarn loops, an individual yarn in a subgroup may cross itself and other subgroup yarns as in FIG. 2E.

yarn position—the yarn position in a given group refers to the location in a cell where a yarn is placed relative to a preselected reference yarn in the same group. Within the distance of a cell space, there are a finite number of yarn positions available for the yarns in the subgroup of a group that are substantially parallel and offset from one another. In a preferred convention, an X-axis is placed over an uppermost yarn in the cell and a Y-axis is placed through an origin defined by the intersection of the uppermost yarn and a yarn in the next subgroup that crosses the uppermost yarn. For the sake of convention, the cell would be defined as the repeating unit of yarn structure that has one edge adjacent the X-axis and the X-Y origin in the lower left corner of the cell. The yarn position for a subgroup can then be defined as the fraction of the total number of possible yarn positions spaced from the reference yarn, with the reference yarn being in the zero-th position. If the paths of the yarns are not straight, unlike the example of FIGS. 1A–E and 2A, the X-axis would align with the predominant non-straight path which may be the axis of symmetry of the yarn path, in the case of a sinusoidal or zigzag path. In cell 61 of FIG. 2A, the uppermost yarn 66 in subgroup 8 of group II is selected as the reference yarn and is coincident with an X-axis 71. The yarn 60 in the next subgroup 7 of the cell 61 crosses the reference yarn 66 in subgroup 8. Where it crosses reference yarn 66 defines an origin 75 through which a Y-axis 77 passes. The subgroup positions of the group I yarns within the cell 61 are labeled 0/4, 1/4, 2/4, 3/4 with subgroup 8, represented by the uppermost yarn 66, in the 0/4 position and the sign determined by the direction of the Y-coordinate where the yarn crosses the Y-axis. The subgroup positions of the group II yarns within the cell 61 are labeled 0/4, 1/4, 2/4, 3/4, with subgroup 7, represented by the next yarn 60, in the 0/4 position and the sign determined by the direction of the X-coordinate where the yarn crosses the X-axis. Referring to FIGS. 2A and 2B, the yarns in subgroup 1 of group II, such as yarn 32, are in the 1/4 position in the cell shown, which is the +1 location of 4 possible positions. Referring to FIGS. 2A and 2D, the yarns in subgroup 6 of group I, such as yarn 56, are in position 3/4 in the cell shown, which is the +3 location of 4 possible positions.

A matrix can be created to describe the arrangement of yarns in a cell of a structure. For instance, for the fabric illustrated in FIGS. 2A, 2B, and 2C, the matrix for the two groups of yarns, 0 and 90, would look like the following:

| group/ direction | sub- group | no of pos. for subgroup yarns | subgroup offset position | 3rd group shift from orig. | other group shift from orig. |
|---|---|---|---|---|---|
| II/0 top | 8 | 4 | 0/4 | n/a | n/a |
| I/90 next | 7 | 4 | 0/4 | | |
| II/0 | 6 | 4 | 3/4 | | |
| I/90 | 5 | 4 | 3/4 | | |

-continued

| group/<br>direction | sub-<br>group | no of pos.<br>for subgroup<br>yarns | subgroup<br>offset<br>position | 3rd group<br>shift from<br>orig. | other group<br>shift from<br>orig. |
|---|---|---|---|---|---|
| II/0 | 4 | 4 | 2/4 | | |
| I/90 | 3 | 4 | 2/4 | | |
| II/0 | 2 | 4 | 1/4 | | |
| I/90 | 1 | 4 | 1/4 | | |

In FIG. 1E, four yarns are used to fill space 33: yarn 30, 44, 52, and 60. From a practical standpoint, the size of each space 33 and 40 determines the length of unsecured yarn on the top and bottom surfaces of the fabric structure, such as length 76 in the zero degree uppermost yarn 64, and length 78 in the ninety degree lowermost yarn 30 in FIG. 1E. As this space increases when more subgroups of yarns are added to the structure, the unsecured yarn lengths grows and may present a snagging problem in the finished fabric structure. On the other hand, it may be desirable to have such an unsecured yarn on the surface of the fabric for some applications. In satin fabrics made by conventional weaving processes, there are many long segments of unsecured yarn on the surface of such a fabric to create a special style and hand. When it is desired to minimize the length of unsecured yarn on the surface of the fabric, however, four to eight yarn diameters is the preferred determinant for space 33 and 40 and the number of subgroups. Sixteen to twenty yarn diameters is probably a maximum cell space from a practical standpoint. If a thicker structure is acceptable or desired, two complete fabric structures can be assembled one on top of the other and then the outer subgroups connected so the number of subgroups is increased without increasing the unsecured yarn length on the fabric surface.

Figure 3A:
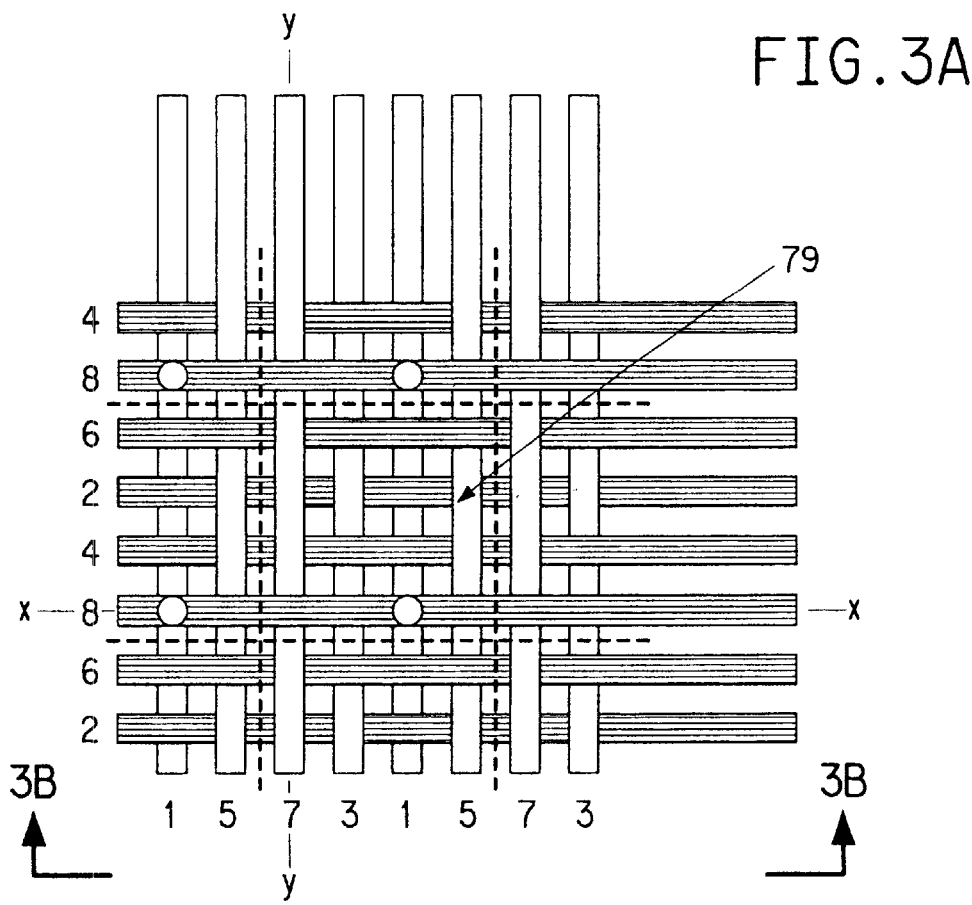
FIGS. 3A–C show plan and elevation views of variations in yarn arrangement in a cell.
Figure 3B:
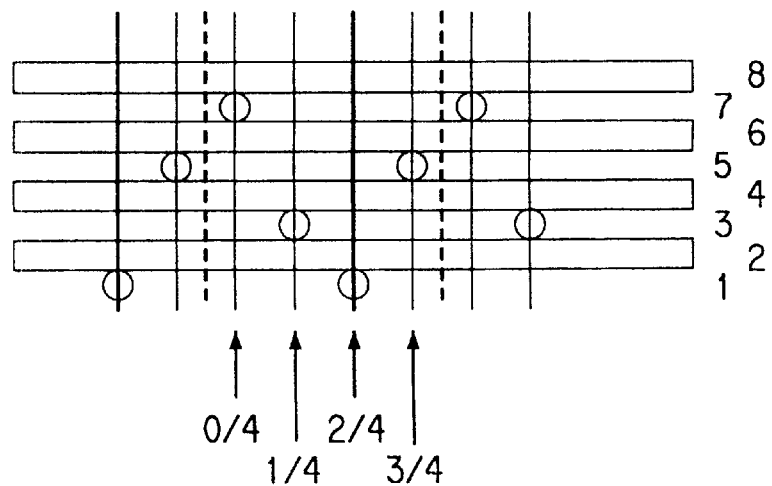
Figure 3C:
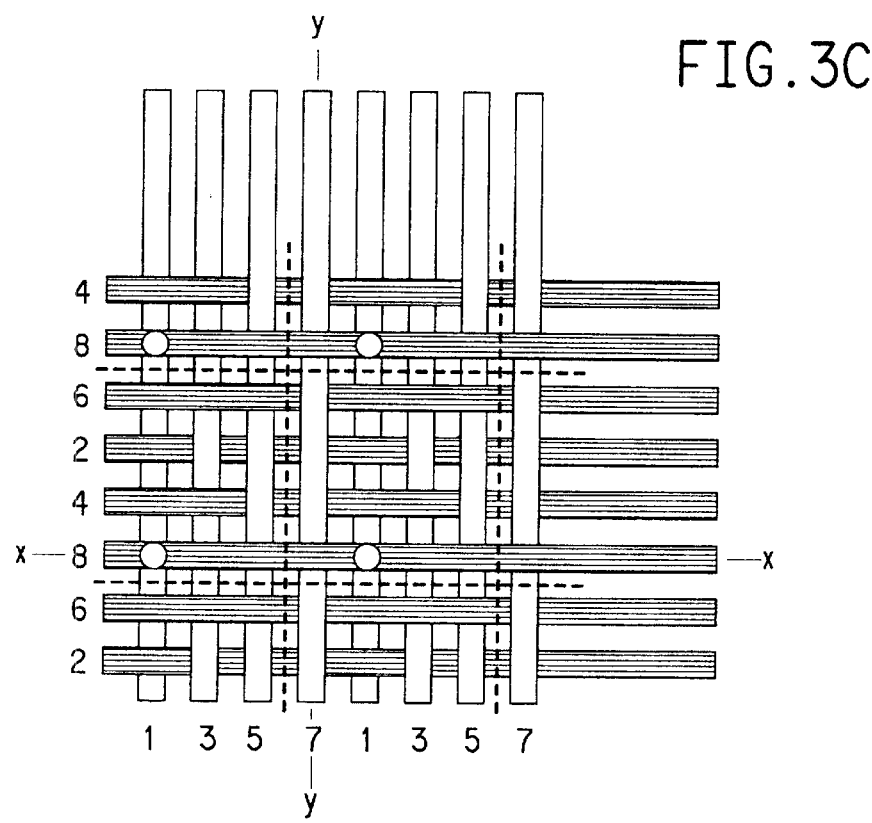
Figure 4B:
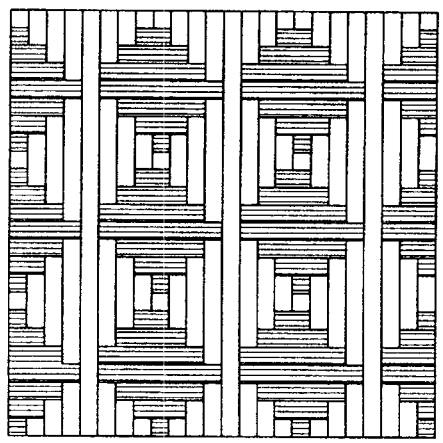
FIGS. 4A–D show plan views of additional biaxial fabric structures.
Figure 4A:
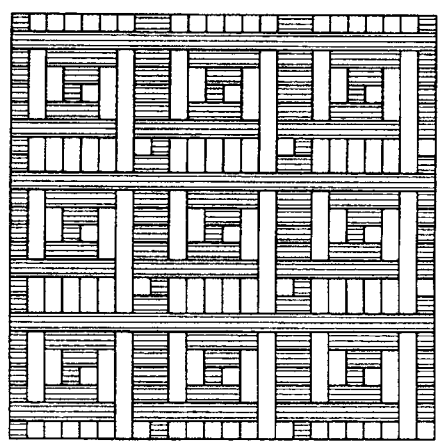

There are various patterns possible for laying down the subgroups of yarn. All yarns in one subgroup are in place before the succeeding subgroup is put in place, which characterizes the yarns in a subgroup. FIG. 2A shows the basic module of fabric structure shown in FIG. 1E where the sequence of subgroup placement going from left to right is 1-3-5-7 in each ninety degree group and going from bottom to top of the figure is 2-4-6-8 in each zero degree group. In FIG. 3A, the sequence of subgroup placement going from left to right is 1-5-7-3 in each ninety degree group; the sequence of subgroup placement going from bottom to top of the figure is 2-6-8-4 in each zero degree group. FIG. 3B is an elevation view 3B—3B of FIG. 3A and shows the position of the subgroups in cell 79 in FIG. 3A. FIG. 3C shows another pattern where the ninety degree yarns were shifted as in FIG. 2A (1-3-5-7) and the zero degree yarns were shifted as in FIG. 3A (2-6-8-4). As can be seen, various patterns of yarn shifts in each subgroup are possible to vary yarn patterns or structural features as desired, and the zero degree and ninety degree subgroups may be shifted differently. Another variation is shown in FIG. 4A where the yarns in succeeding subgroups are placed in the middle of the cell space remaining to produce a different looking pattern of yarns. In general, the placement in FIG. 4A is less preferred; rather it is preferred to place the yarns in succeeding subgroups adjacent a yarn in a preceding subgroup. This results in improved accuracy of yarn placement and restraint of yarn movement in the direction of the adjacent yarn during buildup of the structure before bonding. FIG. 4B shows still another pattern.

The actual steps followed by a yarn placement device for sequentially placing the subgroups may also be varied further as desired. For instance, referring to FIG. 2A and the ninety degree group, a device may step through the numerical sequence 1, 3, 5, 7 as seen in brackets 63, or 65, or 67, or 69; the zero degree group may be varied similarly. The steps followed will not affect the appearance and structure of the pattern in the mid-section of the fabric structure, but may be used to determine the appearance along the edge of the fabric.

Means of connecting the top and bottom yarns are possible other than by connecting only the points of overlap. In one preferred embodiment, an ultrasonic horn is traversed across the structure diagonally in a path 51, such as through point 68 and point 74 (FIG. 1E), to continuously bond all the yarns in the path to their overlapping neighbors. A parallel path 53 would run through point 70 and another parallel path 55 would run through point 72 so a plurality of ultrasonically bonded pathways would exist to hold the structure together. Alternatively, the bond pathways could run from point 68 to 70 or 68 to 72. In practice, the paths would not have to pass directly through points 68, 70, 72 and 74 to effectively trap the yarns in the structure. What is important is that the top yarns and bottom yarns are connected to other yarns that are eventually connected to one another, so the top yarns are eventually connected by a series of connections to the bottom yarn. This "pathway process" of connecting is beneficial in that precise location of the bonds at the top and bottom yarn overlap points is not required, although it is still preferred. Such a spacing of paths as just discussed results in a bonding frequency that is low enough to retain the inherent flexibility of the yarns in the structure in spite of the high frequency of molten polymer fused bonds. The bond pathways form a bonded region in the fabric structure and can be used to control the fabric bulk. Between the bond pathways, such as paths 51 and 55 there is an unbonded region 49 where the yarns remain unbonded and unconnected so the inherent flexibility of the yarn used in the structure is retained. It will be appreciated that to make a fabric structure of a practical size, a great many yarns would be used and many bonded regions and unbonded regions would be employed.

Figure 4C:
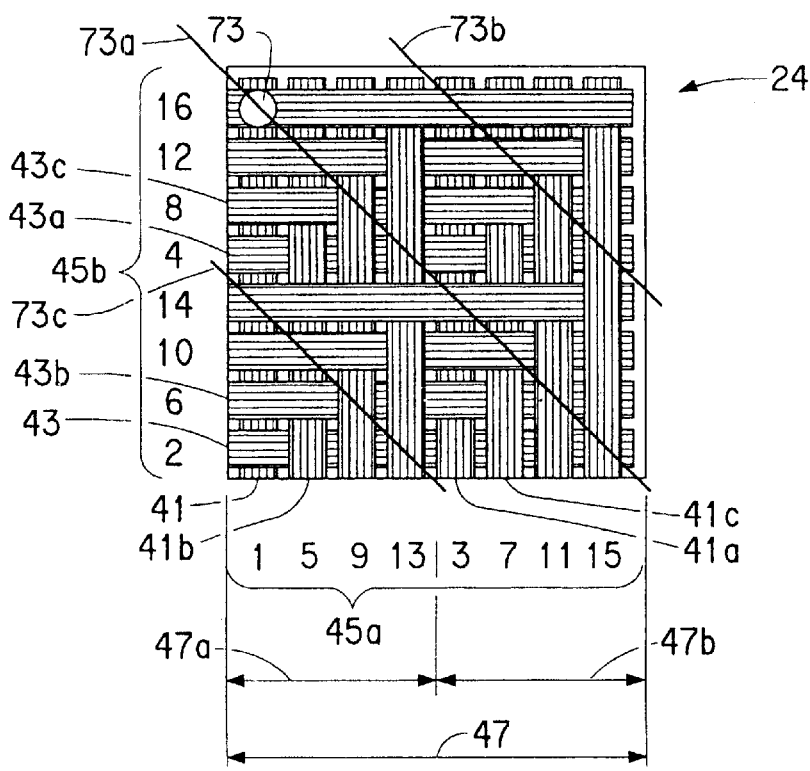

FIG. 4C shows a small area of a portion of a fabric with a pattern that resembles that in FIG. 1E (also 2A). The small area fabric portion 22 shown in FIGS. 1E/2A, referred to as a simple cell/single step pattern (or just the simple cell pattern), can be made with four passes of two yarns in each group, such as four passes of two feed yarns 30 and 32 in the ninety degree direction; alternated with four passes of two feed yarns 36 and 38 in the zero degree direction. In each subgroup the succeeding yarns are placed next to the previous yarns at a single yarn step away. This fabric could be rapidly made in this manner. An equivalent fabric portion 24 shown in FIG. 4C was made with eight passes of only a single feed yarn in each group, such as eight passes of feed yarn 41 in the ninety degree direction alternated with eight passes of feed yarn 43 in the zero degree direction. If the numbered sequence shown at 45a is followed for the ninety degree feed yarn 41, and the numbered sequence shown at 45b is followed for the zero degree feed yarn 43, a pattern very similar to that in FIGS. 1E/2A is produced. The pattern in the fabric portion made as in FIGS. 1E/2A shows four cells of fabric with four yarns per cell side, and the pattern in the fabric portion made as in FIG. 4C shows one cell of fabric with eight yarns per cell side. Some visual differences in the fabric can be observed looking at the lower right quadrant of the two fabrics where it is seen that in FIG. 2A (same as 1E), subgroup 5 passes under subgroup 6, and subgroup 7 passes under subgroup 8; but in the equivalent fabric in FIG. 4C, subgroup 11 passes over subgroup 10 and subgroup 15 passes over subgroup 14.

This pattern in FIG. 4C is referred to as the split/split single step pattern (or just the split cell pattern) since the second yarn layed down in each group of yarns, 41*a* and 43*a*, splits the cell distance, such as distance 47, into some cell fraction, such as ½ cell, as shown by the equal split cell distances 47*a* and 47*b*. The succeeding yarns in each group, such as yarns 41*b* and 43*b*, are then layed down next to previous yarns, such as yarns 41 and 43 respectively, at a single yarn step away in the first split cell distances, such as 47*a*. Also succeeding yarns in each group, such as yarns 41*c* and 43*c*, are then layed down next to previous yarns, such as yarns 41*a* and 43*a* respectively, at a single yarn step away in the second split cell distances, such as 47*b*. In this way, the two or more split cell fractions are built up together. When the cell is completed, the top and bottom yarn intersection is bonded as at 73. Additional bond lines similar to those shown at 51, 53, and 55 in FIG. 1E could also be utilized to bond more of the yarns to each other, as shown at 73*a*, 73*b*, and 73*c* in FIG. 4C. More or fewer bond lines may be utilized as desired. For the simple cell/single step pattern and split cell/single step pattern, and any other similar pattern which produces good yarn interlace, it may be possible to use fewer than the suggested one bond per cell over a large fabric pattern that has many cells and bonds.

Figure 4D:
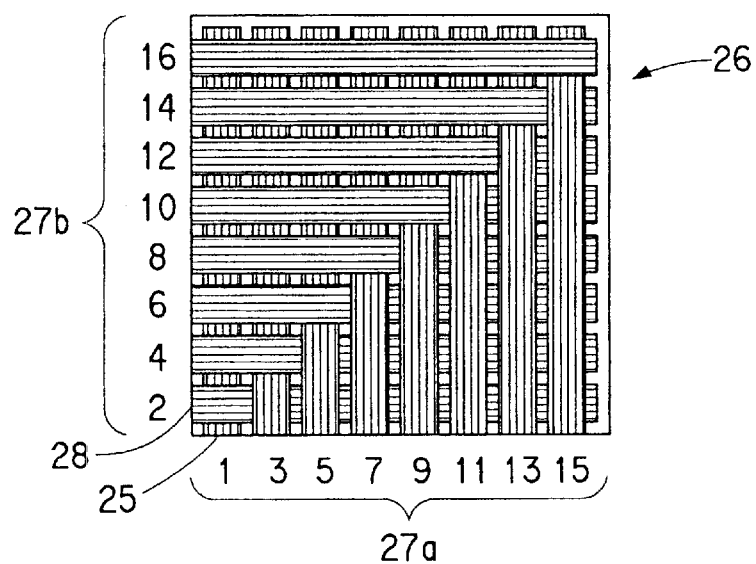

FIG. 4D shows, for comparison, a fabric 26 made using the simple cell pattern as in FIGS. 1E/2A but using eight yarns per cell distance instead of only four. Only a single feed yarn for each group of yarns would be needed for the area of fabric shown in this single cell. The numbered sequence shown at 27*a* is followed for the ninety degree feed yarn 25, alternating with the numbered sequence shown at 27*b* which is followed for the zero degree feed yarn 28. This single cell pattern covers the same area as the four cell area of FIGS. 1E/2A or the single cell area FIG. 4C, but it has a large number of long unsecured yarn lengths which may be undesirable for some applications. When placing down a large number of yarns per cell (8 or greater), it is preferred to use the split cell pattern to minimize the number of long unsupported yarn lengths.

It has been found that the pattern of yarns illustrated in FIGS. 1E/2A and 4C provide particularly good interlacing of yarns so the fabric structures tend to hold their shapes better without yarns shifting and holes opening up in the fabric. There are some significant differences in the two yarn laydown patterns, however. The simple cell of FIGS. 1E/2A utilizes more feed yarns per inch of fabric than the split cell of FIG. 4C, and if the practice of providing at least one bond per cell is followed, more bonds would be used per area of fabric. The use of more feed yarns may require a larger yarn creel and more yarn guides as will be appreciated when various apparatuses will be discussed below. This use of more feed yarn per inch, however, results in more rapid fabric development using the simple cell pattern. The split cell pattern, on the other hand, provides the same good interlacing of yarns as the simple cell pattern and offers more flexibility in forming different yarn structures with any given apparatus at the tradeoff of fabric forming time. In general terms, the fabric structure of the invention is an interlaced fabric structure comprising:

a plurality of first yarn subgroups having a plurality of yarns oriented in a first angular direction free of crossings, the first subgroups forming a stack with a plurality of second yarn subgroups having a plurality of yarns oriented in a second angular direction free of crossings;

the yarns in each subgroup following substantially parallel paths that are spaced apart in a repeating pattern to sparsely cover a common predetermined fabric area;

the yarn subgroups are alternately stacked with a first subgroup next to a second subgroup, wherein the yarns in the first subgroup cross the yarns in the second subgroup;

the yarns in any one subgroup of the plurality of first subgroups are offset from the yarns in all other subgroups of the first plurality of subgroups;

the yarns in any one subgroup of the plurality of second subgroups are offset from the yarns in all other subgroups of the second plurality of subgroups;

the stacking of all of the plurality of first subgroups forming a first yarn group comprising yarns that densely cover the predetermined fabric area, and the stacking of all of the plurality of second subgroups forming a second yarn group comprising yarns that densely cover the predetermined fabric area; and the yarns in the top subgroup in the stack, are connected to the yarns in the bottom subgroup in the stack, to thereby contain the other subgroups in the stack in an interlaced fabric structure.

In the case of the simple cell, single step pattern, the interlaced fabric structure also includes:

the yarns in successive ones of the plurality of first subgroups in the stack are offset from each other by the width of a yarn in that subgroup of the fabric; and the yarns in successive ones of the plurality of second subgroups in the stack are offset from each other by the width of a yarn in that subgroup of the fabric.

In the case of the split cell pattern, the interlaced fabric structure also includes:

the plurality of first subgroups are arranged in the stack to define a total number of offset yarn steps equal to the number of subgroups making up the plurality of first subgroups (the distance of such a yarn step is equivalent to the yarn diameter of a yarn in the subgroup as it appears in the fabric), and wherein successive ones of the plurality of first yarn subgroups are placed at a plurality of equal subintervals of yarn steps from each other;

and subsequent ones of the plurality of first yarn subgroups are progressively placed in the subintervals with the plurality of yarns in successive ones of the plurality of first subgroups being offset one yarn step from each other;

the plurality of second subgroups are arranged in the stack to define a total number of offset yarn steps equal to the number of subgroups making up the plurality of second subgroups and wherein successive ones of the plurality of second yarn subgroups in the stack are placed at a plurality of equal subintervals of yarn steps from each other;

and subsequent ones of the plurality of second yarn subgroups in the stack are progressively placed in the subintervals with the plurality of yarns in successive ones of the plurality of second subgroups being offset one yarn step from each other.

The connection means for fabrics of the invention may be by ultrasonic bonding as discussed if the yarns are a thermoplastic polymer and the top and bottom yarns are compatible polymers that will bond together by fusion. The connection (or bonding) means may also be a hot melt adhesive, a solvent that softens the yarn polymer and permits the yarns to fuse together, a room temperature curing adhesive, a solvent based adhesive or other impregnating type, a mechanical fastener such as a staple, strap, or tie, or other such means.

In the case of a bonded connection, all of the yarns in the structure do not need to be thermoplastic yarns to act as binder yarns. The binder yarns necessary to provide the sticky polymer, partially dissolved polymer, molten polymer, or the like to act as an adhesive, or binder, for the bond may be distributed throughout the structure in a variety of ways. A binder yarn is a yarn that would mechanically or adhesively engage another binder yarn or a non-binder yarn during bonding. A non-binder yarn is one that would not mechanically or adhesively engage another non-binder yarn during bonding. In a simple case, some or all of the yarns for the structure can be made from non-binder fibers which are covered with binder fibers by twisting or wrapping. An example of such a wrapped yarn is a yarn with a multifilament non-thermoplastic core which is wrapped with a multifilament sheath that contains some or all thermoplastic filaments. The sheath can be continuous filaments or staple fibers. In the case of staple fibers, the sheath can be a blend of binder and non-binder fibers, such as thermoplastic nylon staple fibers and non-thermoplastic aramid or cotton staple filaments. Such a yarn construction can be made using a "DREF 3 friction spinning machine" available from Textilmachinenfabrik Dr. Ernst Fehrer AG of Linz, Austria. A blend of 5–25% by weight thermoplastic binder fibers in the sheath may work well for this application. Other binder and non-binder polymers may be used for the fibers in the yarn as desired. When bonding using such a sheath/core yarn, it is to be expected that the sheath filaments would be affected by the bonding process while the core filaments would not. The core filaments could be relied on to carry the load in the structure after bonding. In some cases, it may be desirable to form bonds at all yarn crossings to form a stiff board-like fabric structure. This may be accomplished by heating and urging together all the binder fiber in the structure so essentially all the yarns are bonded together.

Another way to distribute binder adhesive material to bond the structure together is to provide binder yarn for one or more upper subgroups of, for instance, the zero degree group of yarns; and for one or more bottom subgroups of, for instance, the ninety degree group of yarns. These top and bottom yarns may be the sheath/core yarns described above. Another way to distribute binder material is to use a binder containing yarn for some fraction of each subgroup of, for instance, zero and ninety degree yarns, such as every other or every tenth yarn in each subgroup. One structure that has been found to work well is to make the top and next subgroups of yarns and the bottom and next subgroups of yarns with binder fibers. During bonding, the top and next subgroup, and bottom and next subgroup, binder yarns are adhesively joined and other non-binder yarns may be mechanically engaged, such as by embedding, enveloping, encapsulating, or the like. This additional engagement of non-binder fibers results in load paths extending from the top to the bottom subgroups of yarn even where the top and bottom subgroups don't directly contact each other.

When using a distribution of binder fiber in the structure of the invention, it has been found that a distribution of about 5%–60% binder fiber by total fiber weight is useful, and preferably a distribution of about 10%–20% by total fiber weight works well to provide good fabric integrity while retaining good fabric softness (minimize fabric stiffness and boardiness). In some cases, it may be desirable to have an all binder (thermoplastic) yarn structure and control the bonds to be predominantly at some or all of the intersections between the top and bottom subgroups of yarns in the structure without having to carefully locate the intersections between these two subgroups.

When using ultrasonics, for instance, to provide bonding energy to thermoplastic yarns, it may be possible to achieve this preferential bonding by using thick or "fat" yarns for the top and bottom subgroups of yarns. When squeezed between a broad-faced ultrasonic horn and anvil, the intersection of the fat yarns will receive more squeezing pressure than the adjacent thinner yarns so the ultrasonic heating will occur preferentially at the fat yarn intersections with minimum bonding of the thinner yarn intersections.

Figure 14:
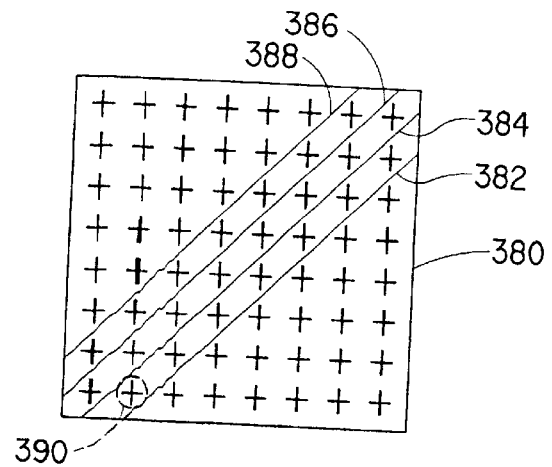
FIG. 14 shows a diagrammatic view of a cell of fabric.

The connected fabric structure needs to have a controlled number of connections to achieve adequate strength, control bulk of the fabric, and to retain the inherent flexibility of the yarns used in the fabric. Too few connections and fabric integrity is compromised; too many connections and the fabric flexibility is compromised and bulk is reduced. The number of connections can be some fraction of the total number of yarn crossings in the structure. For good integrity, bulk control, and good flexibility, the number of connections must be controlled within limits. FIG. 14 is a diagrammic view of a unit cell 380 of fabric structure, and the cross marks represent the yarn crossings in the cell. The cell 380 represents a biaxial fabric structure with eight yarns per direction for a total of (8×8) 64 crossings per cell. The lines 382, 384, 386, and 388 represent possible edges for a bond path through the cell. The circle 390 represents a single bond between a yarn on the top of the structure and a yarn on the bottom of the structure, which would be the minimum number of bonded crossings for the cell. Between lines 384 and 386 would be a single-crossing-width bond path which would be a medium number of bonded crossings for a cell; between lines 384 and 388 would be a double-crossing-width bond path which would be a high number of bonded crossings for a cell; and between 382 and 388 would be a triple-crossing-width bond path which would be a very high number of bonded crossings for a cell.

Below is a table of variables and values for determining the fraction of bonded crossing to total crossings. "N" represents the number of yarns per direction in a square unit cell; in the unit cell 380 this number is 8. "Min" is the bonding fraction if only one crossing is bonded out of $N^2$ total crossings; "Med" is the bonding fraction if a single-crossing-width bond path is used that bonds N crossings out of $N^2$ crossings; "Hi" is the bonding fraction if a double-crossing-width bond path is used that bonds N+(N−1) crossings out of $N^2$ crossings; "V Hi" is the bonding fraction if a triple-crossing-width bond path is used that bonds N+(N−1)+(N−1) crossings out of $N^2$ crossings.

BONDING FRACTION TABLE

| # Bonded Crossings = Fraction of Bonded Crossing = Comments | N (# Yarns per direction in unit cell) | Min @ 1 $1/N^2$ | Med @ N $1/N$ | Hi @ N + (N − 1) $(2N − 1)/N^2$ | V Hi @ N + 2(N − 1) $(3N − 2)/N^2$ |
|---|---|---|---|---|---|
|  | 3 | .111 | .333 | .556 | .778 |
| preferred | 4 | .063 | .250 | .438 | .625 |
| preferred | 5 | .040 | .200 | .360 | .520 |
| most preferred | 6 | .028 | .167 | .306 | .444 |
| most preferred | 7 | .020 | .143 | .265 | .388 |
| most preferred | 8 | .016 | .125 | .234 | .344 |
| most preferred | 9 | .012 | .111 | .210 | .309 |
| most preferred | 10 | .010 | .100 | .190 | .280 |
| preferred | 11 | .008 | .091 | .174 | .256 |
| preferred | 12 | .007 | .083 | .160 | .236 |
| preferred | 13 | .006 | .077 | .148 | .219 |
| preferred | 14 | .005 | .071 | .138 | .204 |
| preferred | 15 | .004 | .067 | .129 | .191 |
| preferred | 16 | .004 | .063 | .121 | .180 |
|  | 17 | .003 | .059 | .114 | .170 |
|  | 18 | .003 | .056 | .108 | .160 |

Overall, it has been discovered that a bonding fraction within the range of from about 0.003 to 0.778 is preferred. A bonding fraction within a range of about 0.008 to 0.520 is most preferred, or, that is, about 1% to 50% of the available crossings bonded or otherwise connected. This fraction can be controlled by the number of yarns in a cell and the number of bonds in a cell, which can be controlled by the width of the bond path and the number of bond paths within a cell. If there is more than one bond path within a cell, the bond paths should be narrow.

Referring to the bond fraction table above that was prepared with the simple cell process as a model, it should be noted that a fabric using 16 yarns per cell that is at one end of the preferred scale may be most preferred when made using the split cell/single step process. This is so, since the interlacing is improved and the number of long unsecured yarn lengths is reduced for a given number of yarns per cell by this process. In general, if more interlacing is provided in a fabric of the invention, the number of bonds per cell can be reduced and still maintain good fabric integrity. For instance, if the split cell fraction is ½, the 16 yarn per cell, split cell fabric may be equivalent (in preference) to the 8 yarn per cell, simple cell fabric in the table.

Figure 5A:
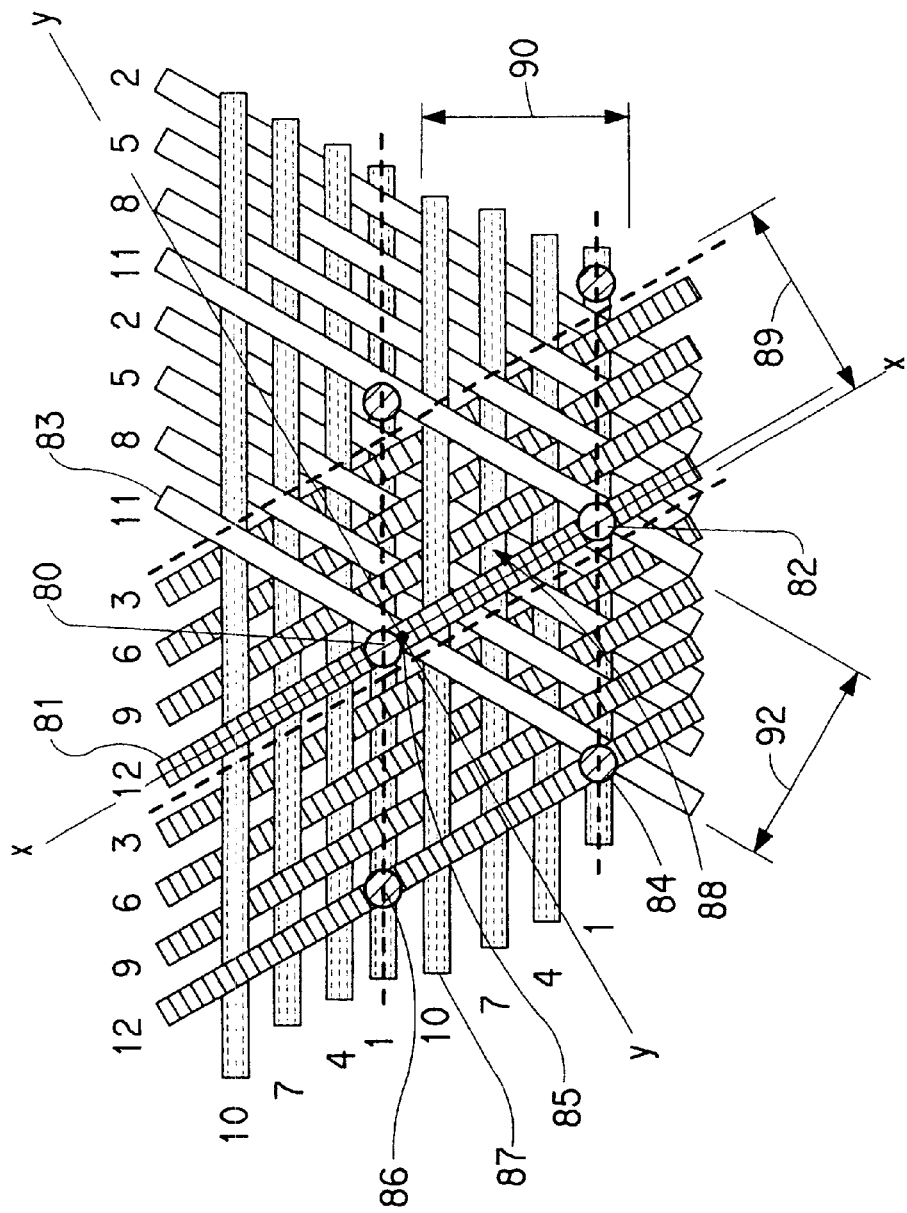
FIGS. 5A–B show two different plan views of a three group (three-directional or triaxial) flexible fabric.
Figure 5B:
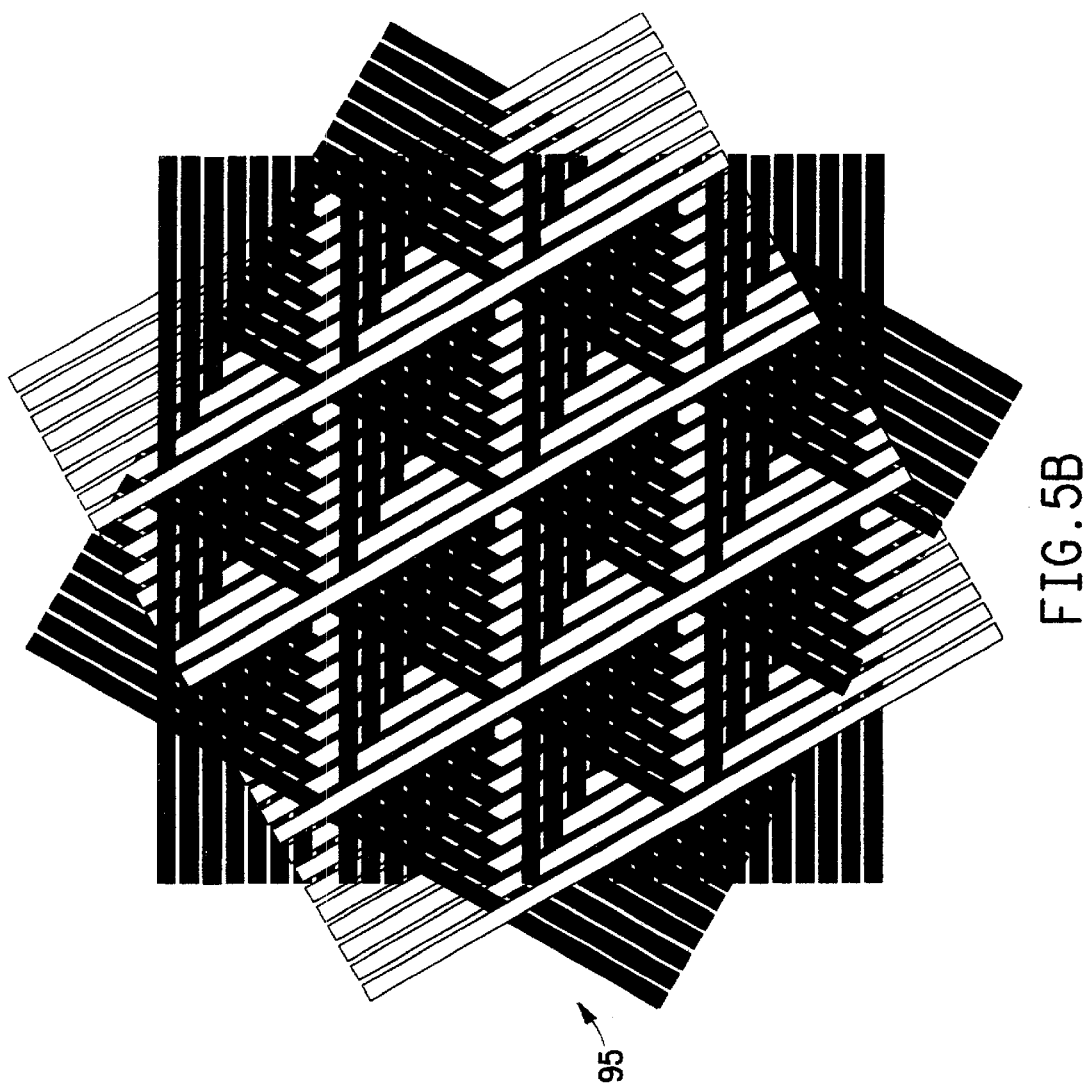

FIG. 5A shows another flexible fabric structure where the yarns are layed down in groups in three directions, at 0 degrees, 60 degrees and 120 degrees, to make a triaxial structure. For purpose of discussion, one parallelogram-shaped basic cell of the structure, that repeats throughout, is shown at 88 with sides shown by dashed lines which are oriented along the zero and sixty degree direction. Alternatively, the basic repeating cell could also have been selected as one with sides oriented along the zero and one hundred twenty degree direction. The top subgroup yarn 81 defines the location of the X-axis and the intersection of yarn 81 with the next subgroup yarn 83 defines the origin 85 and thereby the Y-axis. The cell space for the zero degree group is shown at 89; the cell space for the sixty degree group is shown at 90; The cell space for the one hundred twenty degree group is shown at 92. Each cell space has four possible positions for yarn in the subgroups. The third subgroup yarn 87 crosses the X-axis at about 0.5/4 which defines the third group shift from the origin. The top and bottom yarn subgroups, 12 and 1 respectively, are joined where they cross and overlap at points 80 and 82 both of which fall at the edge of the cell. Other overlap bond points in the structure, when developed into a larger area fabric, would be at the cross-hatched points, such as 84 and 86. Notice that the subgroup 2 yarns lay between the yarns of the top subgroup 12 and bottom subgroup 1 yarns and are at least partially involved in the bond. FIG. 5B shows a larger piece 95 of similar triaxial fabric, but made using eight yarns in each cell space, multiple cells, and a third group shift from the origin equal to zero, so equilateral triangles are formed by yarns of the three groups.

Using the position conventions discussed above, the matrix for the structure of FIG. 5A would be the following:

| group/ direction | sub-group | no. of pos. for subgroup yarns | subgroup offset position | 3rd group shift from orig. | other group shift from orig. |
|---|---|---|---|---|---|
| I/0 top | 12 | 4 | 0/4 | n/a | n/a |
| II/120 next | 11 | 4 | 0/4 | n/a | n/a |
| III/60 | 10 | 4 | 0/4 | 0.5/4 | n/a |
| I/0 | 9 | 4 | 1/4 |  |  |
| II/120 | 8 | 4 | 1/4 |  |  |
| III/60 | 7 | 4 | 1/4 |  |  |
| I/0 | 6 | 4 | 2/4 |  |  |
| II/120 | 5 | 4 | 2/4 |  |  |
| III/60 | 4 | 4 | 2/4 |  |  |
| I/0 | 3 | 4 | 3/4 |  |  |
| II/120 | 2 | 4 | 3/4 |  |  |
| III/60 | 1 | 4 | 3/4 |  |  |

In general terms, the triaxial structure of the invention is similar to a biaxial structure of the invention with the addition that the interlaced fabric structure further comprises:

a plurality of third yarn subgroups having a plurality of yarns oriented in a third angular direction free of crossings, the third yarn subgroups forming a stack with the first and second yarn subgroups wherein the yarns in the third yarn subgroup cross the yarns in the first and second subgroups;

the stacking of all of the plurality of third subgroups forming a third yarn group comprising yarns that densely cover the predetermined fabric area.

Figure 6:
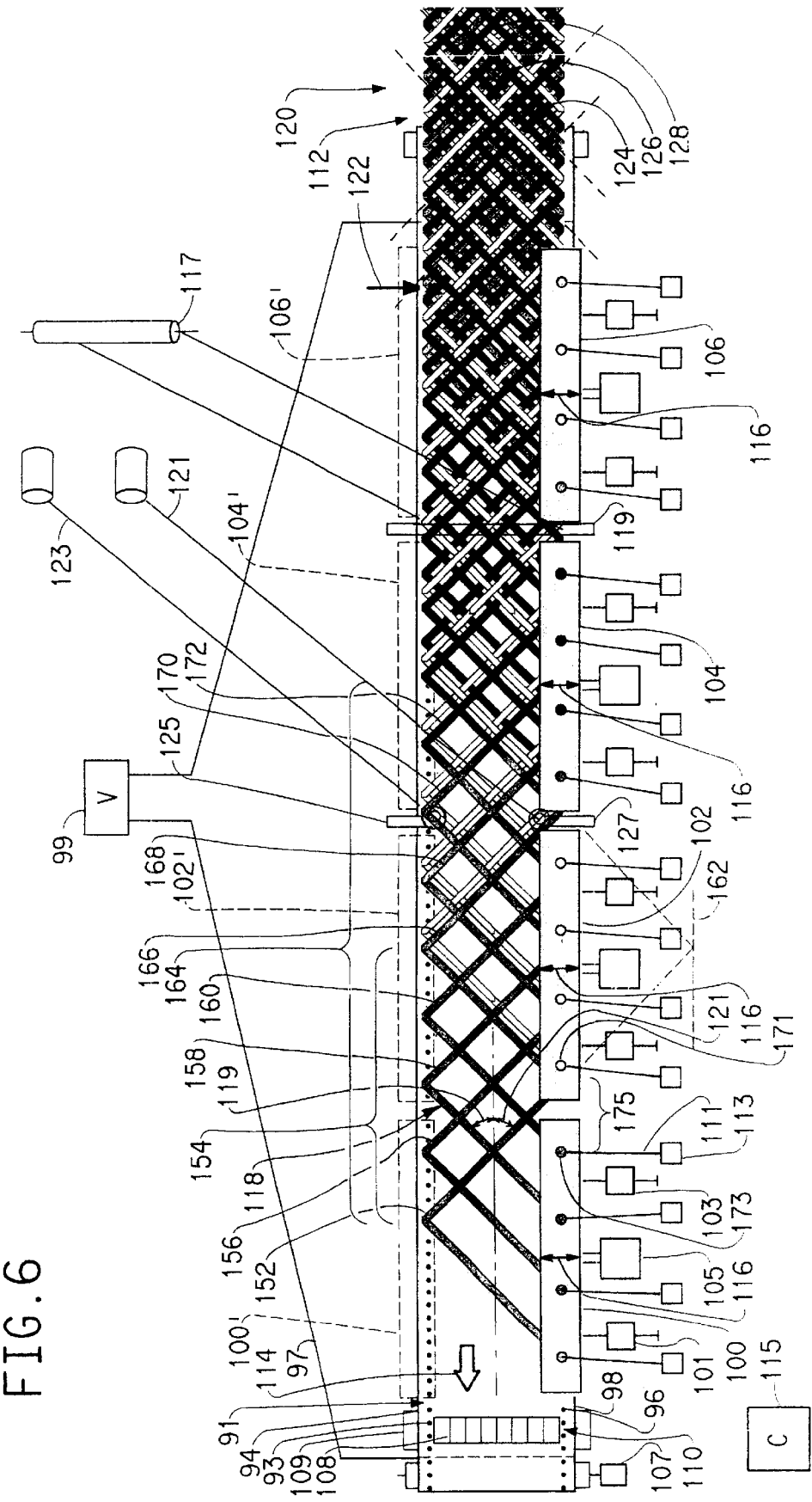
FIG. 6 shows an apparatus for continuously forming a two dimensional biaxial yarn fabric with the yarns oriented at an acute angle to the machine direction, and a fabric thus formed.

In FIG. 6, is shown an apparatus for continuously forming a biaxial fabric structure with basic cells similar to those of FIGS. 1E and 2A. The apparatus consists of an elongated yarn support surface, such as a flat perforated belt 91, driven by motor 107, having an array of pins, such as pin 93, along one edge 94 and a parallel array of pins, such as pin 96 along the opposite edge 98 of belt 91 for positively holding yarns against the forces of yarn reversal. Beneath the belt is arranged a vacuum plenum 97 attached to a source of vacuum 99 for holding the yarn in place on belt 91. Shown along edge 98 are a plurality of yarn guide blocks 100, 102, 104, and 106 that are each mounted on guide means, such as guides 101 and 103, and each having drive means, such as actuator 105 for block 100, for traversing across belt 91 from one edge 98 to an opposed edge 94. Each yarn guide block has a plurality of yarn guides, such as guide 173 in block 100, for guiding a yarn accurately onto the belt, such as yarn 111 coming off of yarn supply package 113. Dashed outlines 100', 102', 104' and 106' at edge 94 show the position the blocks would take after traversing belt 91. A plurality of ultrasonic horns, such as horn 108, at location 110 are positioned across the belt 91 to act on yarn laid thereon to fusion bond the overlapping yarns to one another at spaced positions in a deposited fabric. The belt and a rigid support 109 underneath act as the ultrasonic anvil to couple the energy through the yarn. As soon as the yarn cools from the ultrasonic bonding, the fabric structure can be stripped off the pins or hooks along the edge of the belt and the belt can be recirculated while the fabric is wound in a roll on a core (not shown). The winding tension for the fabric would be controlled to avoid distortion of the fabric along the direction of the belt which is along the fabric diagonal (bias) and along the axis of the bond path.

A representation of a two-group, biaxial, deposited fabric 112 is shown on the belt. The representation shows the pattern of yarn laid down as the process starts up and the belt moves from right to left in the direction of arrow 114 as the blocks move substantially perpendicularly across the belt together from edge 98 to edge 94 in a manner coordinated with the belt motion along the belt elongated axis; and continue back and forth as represented by arrows 116. What is shown is what was produced at start-up and then was stopped and the belt backed up to align the start pattern with the guide blocks. For a true representation, block 100 (and the other blocks) would be shown shifted to the right in the figure to a location just beyond block 106. At the left end 118 of fabric 112 the top subgroups of yarn are laid down by themselves, since at start-up none of the other subgroups are in place yet. At the right end 120 of the fabric 112, all subgroups are in place for a fully formed fabric by position 122 and the fabric will thereafter be continuously fully formed as the belt and blocks continue moving as described. The speed of the belt and the speed of the blocks are controlled and coordinated by a controller 115 communicating with motor 107 and the actuator for each block, such as actuator 105. This ensures that the yarn passing through the guide blocks and laying on the belt forms a straight path at a 45 degree angle with the centerline and edge of the belt so there is a first group of yarn at +45 degrees as at 119 and a second group of yarn at −45 degrees as at 121. By varying the controlled motions, other angles of laydown and curved paths are also possible. The first and second (lower) subgroups of yarn are laid down by block 106, the third and fourth (middle) subgroups of yarn are laid down by block 104, the fifth and sixth (middle) subgroups of yarn are laid down by block 102, and the seventh and eighth (upper) subgroups of yarn are laid down by block 100. A given yarn across the fabric may alternate between subgroups in the cells going back and forth across the fabric. In this example, the belt is moving and the blocks move only back and forth across the belt and the belt moves continuously from right to left. The same pattern can be generated if the belt is considered stationary and unusually long, and the blocks move back and forth diagonally at 45 degrees along the belt from left to right.

Figure 7:
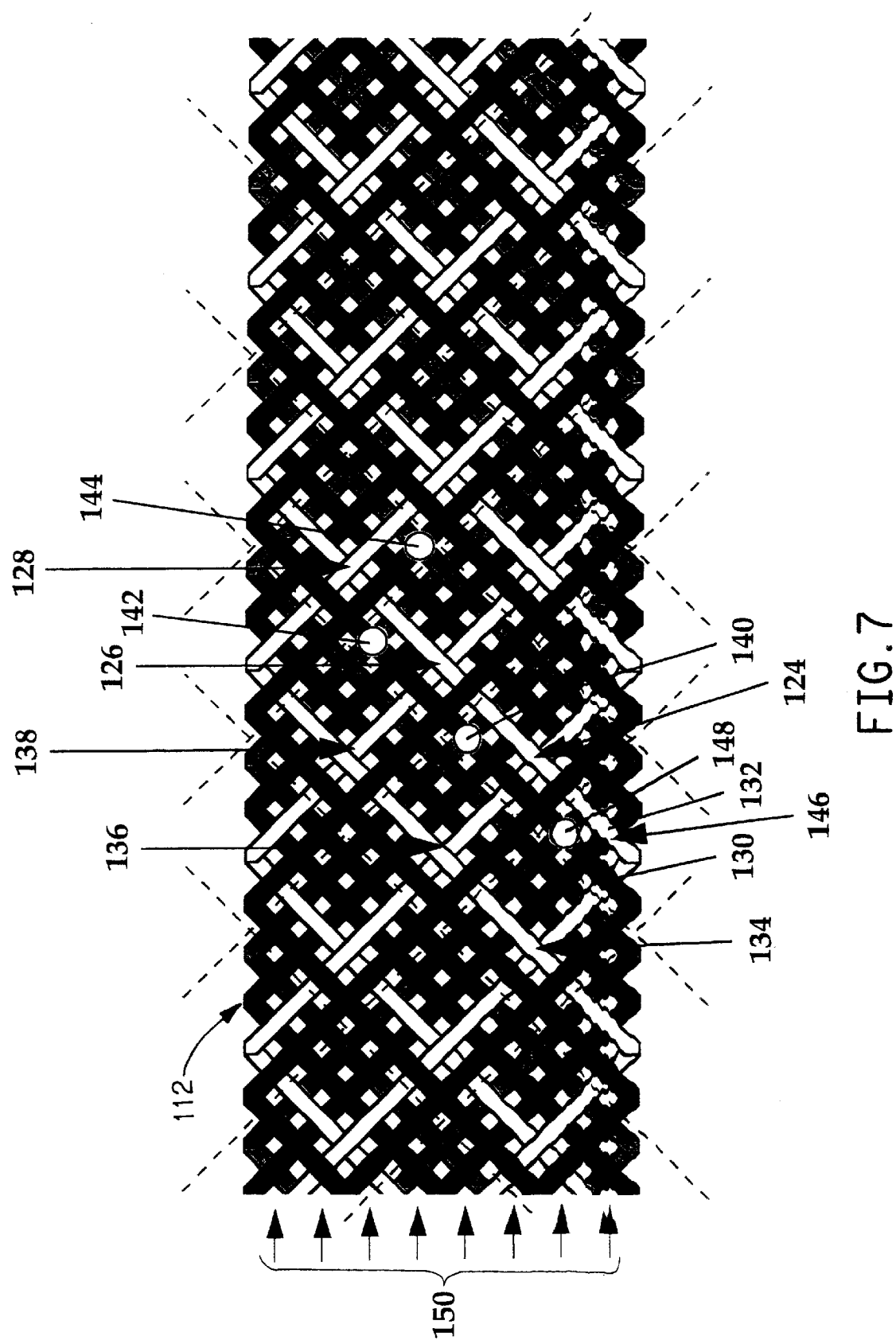
FIG. 7 is an enlarged view of a portion of the fabric of FIG. 6.

The pattern of over and under yarns varies in the fabric as evidenced by cells 124, 126, and 128. FIG. 7 shows this portion of fabric 112 enlarged for discussion. The yarns are shown slightly spaced apart in each group for clarity. In FIG. 7, yarn 130 is the eighth subgroup top yarn in cells 124 and 126, but is the seventh subgroup yarn in cell 128. Likewise, yarn 132 is the sixth subgroup yarn in cells 124 and 126, but the fifth subgroup yarn in cell 128. Similar changes occur in the remaining subgroups. This deviation from a perfectly regular pattern within a fabric, unlike the pattern in FIGS. 1E and 2A, does not affect the structural integrity of the fabric and is an example of some acceptable variations in the patterns of the invention. The adjacent cells 134, 136, and 138 are all identical and are the same as the cells of FIGS. 1E and 2A. Each yarn has a subgroup assignment and a position assignment in a cell. However, both the subgroup assignment and position assignment may vary from cell to cell in a given fabric structure, or they may remain constant, and in both cases still follow the basic rules for practicing the invention which are:

a plurality of substantially parallel yarns in a group are arranged to densely cover an area with the yarns of one group arranged to cross the yarns of another group;

each group is comprised of a plurality of subgroups, with each subgroup having a plurality of yarns sparsely arranged;

the plurality of yarns in one subgroup of one group are offset from the plurality of yarns in the other subgroups of the same group;

the yarns of the top subgroup and bottom subgroup are connected to each other at spaced locations either directly, or indirectly through the yarns in the other subgroups.

The top to bottom bond point for cell 124 is at 140; the bond point for cell 126 is at 142; the bond point for cell 128 is at 144. For a partial cell 146 at the edge of the fabric, the bond point is at 148. All these bond points would be covered by ultrasonic paths aligned with the arrows 150 at the left end of FIG. 7.

Four yarns in each guide are sufficient to cover the belt for a four-yarn-cell-space fabric at the width shown and for a 45 degree pattern. In FIG. 6, the space covered by one yarn, such as yarn 152, going from belt side 94 over to belt side 98 and back across the belt 91 takes up a distance along the belt as shown at 154. Four yarns, such as yarns 152, 156, 158, and 160 in guide 100, fill this space for subgroups 8 and 7. If a wider belt were used where the opposite edge 98 was at 162, the space covered by yarn 152 going back and forth across belt 91 would take up a distance along the belt as shown at 164. This would require additional yarns 166, 168, 170, and 172 to fill this space for subgroups 7 and 8. Guide 100 would have to be extended to hold 8 yarns instead of only 4 for this wider fabric, and block 102 would have to be shifted along the length of the belt 91 to make room for the larger block 100. Block 102 and the other blocks 104 and 106 would be extended and shifted similarly. The first yarn guide hole 171 in block 102 is shown spaced from the last yarn guide hole 173 in block 100 by a distance 175 of one cell diagonal plus one yarn position diagonal to lay down the subgroup 5 and 6 yarns in offset positions from the subgroup 7 and 8 yarns laid bown by block 100. This spacing is similar for the succeeding guide blocks along the side of belt 91. This spacing may be less or more by units of a cell diagonal depending on how much room is needed for the guide blocks.

This spacing of guide blocks and coordinated motion between the blocks and the belt results in the 45 degree diagonal pattern of yarn wherein the positions of each of the diagonal yarns are adjacent the other yarns (rather than overlapping them) to thereby densely cover the yarn support surface on the belt with the yarns. If a more dense, thicker structure is desired, additional guide blocks may be employed and another dense structure built up on top of the first one to make a layered structure. In general terms, the process just described for forming an interlaced fabric structure comprises:

(a) providing an elongated fabric support surface having an elongated axis and opposed lateral edges parallel to the axis, and arranging the surface adjacent a plurality of yarn guide blocks arranged along opposed lateral edges of the elongated surface;

(b) providing a plurality of guides on said guide block, each guide adapted to guide a yarn from a yarn source to the support surface;

(c) engaging the yarns at one edge of said support surface;

(d) providing relative motion between the support surface and each of the plurality of guide blocks so that the guide blocks deposit yarn from the guides onto the surface in a first diagonal direction relative to the edge of the surface and in a predetermined direction along the support surface;

(e) engaging the yarns at an opposed edge of said support surface;

(f) reversing the relative motion of the guide blocks and support surface so that the guide blocks deposit yarn from the guides onto the surface in a second diagonal direction relative to the edge of the surface and in said predetermined direction;

(g) arranging said guide blocks and guides and arranging said relative motion so that when said yarns from said blocks are deposited on said surface, the diagonal positions of each said yarn are offset from the other yarns to thereby densely cover the support surface with said yarns in one cycle of relative motion from one edge to the opposite edge and back to the one edge.

With the arrangement shown with separate guide blocks, the position of subgroup yarns in the cell space can be varied by displacing the blocks along the length of the belt 91. With a space between the guide blocks and the manner of laying down yarns to form a fabric, it is possible to add materials between the subgroups of yarns within a fabric structure. For instance, a roll of film 117 could be arranged to continuously feed film between blocks 104 and 106, around a guide 119, and onto the fabric 112 between the subgroups of yarn laid down by block 106 (subgroups 1 and 2) and block 104 (subgroups 3 and 4). In another instance, machine direction yarns 121 and 123 could be arranged to continuously feed yarn between blocks 102 and 104, through guides 125 and 127 respectively, and onto the fabric 112 between the subgroups of yarn laid down by block 104 (subgroups 3 and 4) and block 102 (subgroups 5 and 6). Such insertions of material between subgroups is a unique capability of the fabric of the invention. In the case illustrated, the addition of the film and machine direction yarns can reduce the deflection of the bias fabric in the machine direction or can achieve other special purposes. Other materials, such as nonwoven fabrics, wires, elastomeric fabrics or yarns, webs of natural or synthetic materials, scrims, etc., can be inserted.

Figure 8A:
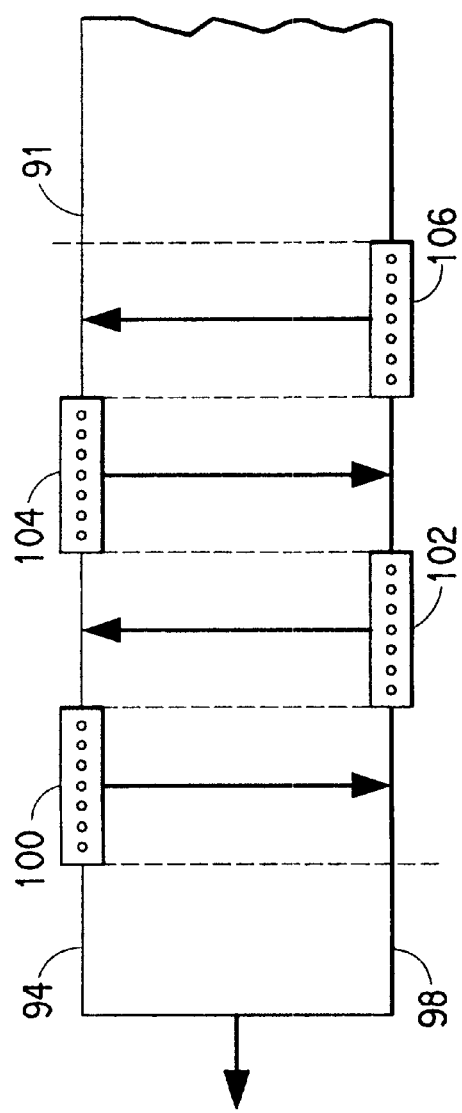
FIGS. 8A–B show another apparatus for continuously forming a two dimensional biaxial yarn fabric similar to that of FIG. 7.
Figure 8B:
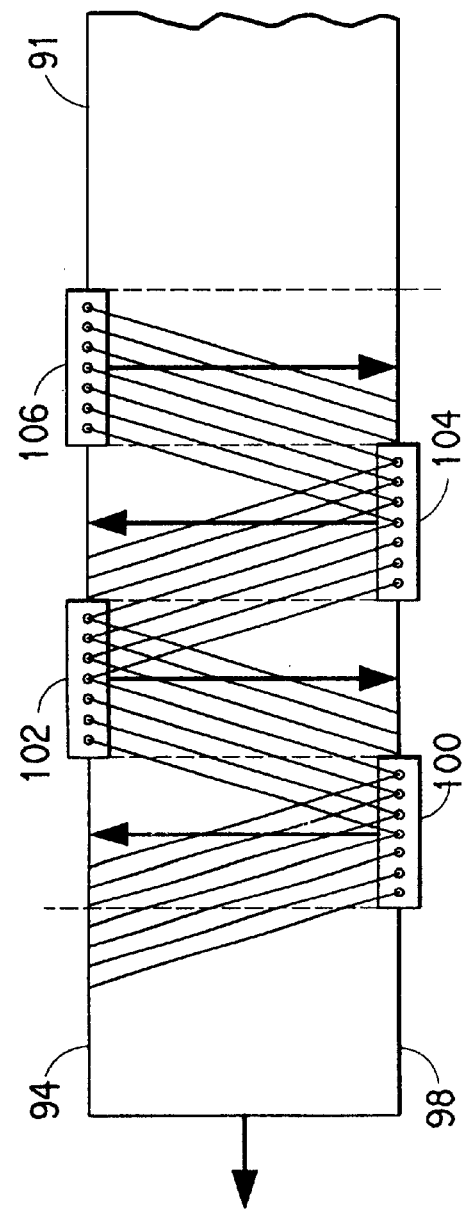
Figure 9:
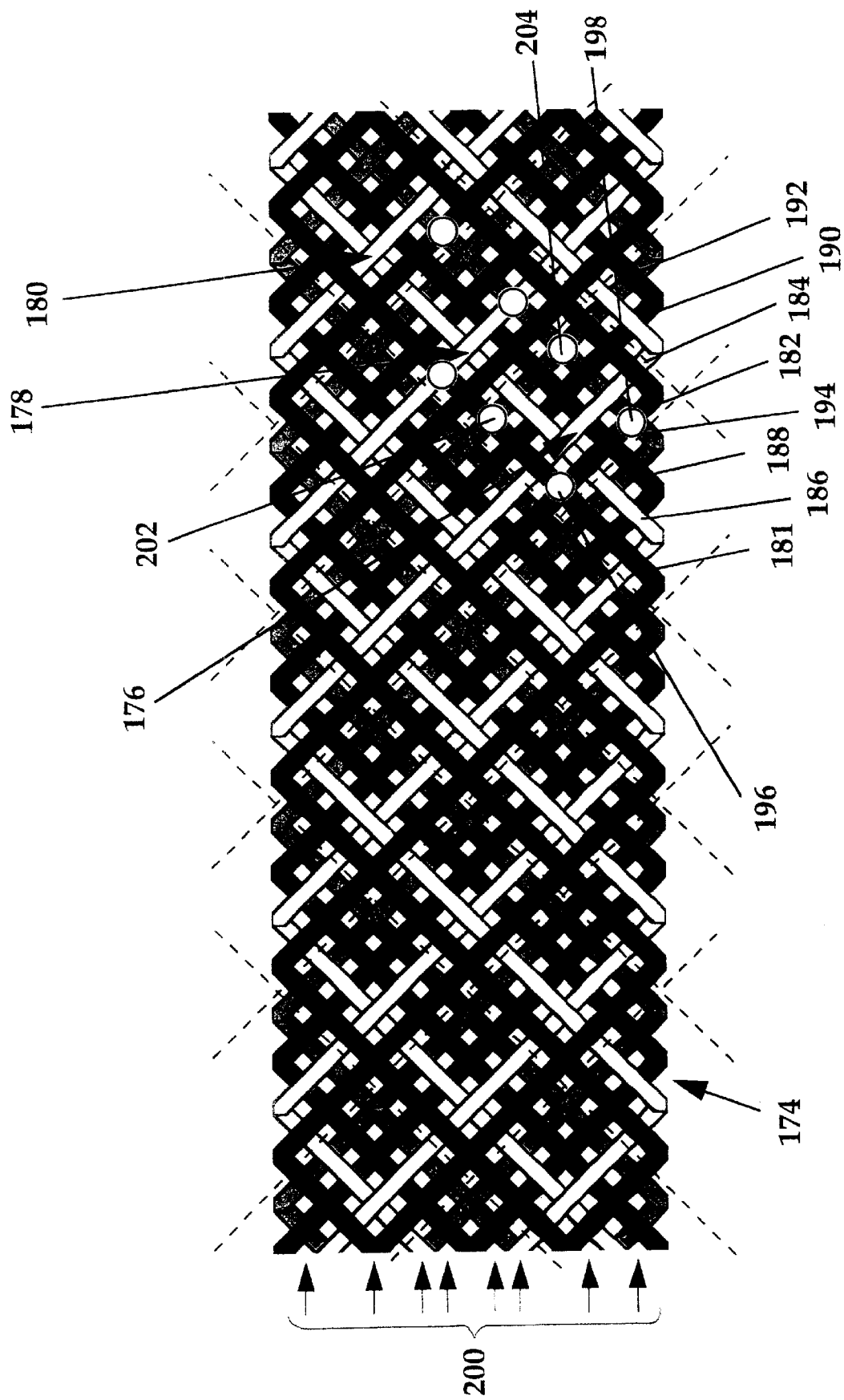
FIG. 9 is an enlarged view of a portion of a fabric formed by the apparatus of FIG. 8.

There is another way of using guide blocks to lay yarn down continuously to form a fabric on a belt. The blocks could be arranged in alternate locations along the edge of belt 91 and be arranged to travel in opposite directions across the belt as the belt is moving as shown in FIGS. 8A and 8B. In FIG. 8A, the blocks 100 and 104 are arranged along edge 94 of belt 91 and blocks 102 and 106 are arranged along edge 98. As the belt 91 moves from right to left as seen going from FIGS. 8A to 8B, the blocks cross the belt to the opposite side, thereby laying yarn down on the belt in a diagonal path. Repeated operation of the blocks back and forth as the belt continues to run will produce a pattern such as seen in enlarged fabric 174 of FIG. 9. This pattern is slightly different from the fabric 112 of FIGS. 6 and 7. Looking at cells 176, 178, and 180, cells 176 and 178 are five subgroup cells while cell 180 is an eight subgroup cell. In cell 176, yarn 181 is in subgroup 5; yarns 182 and 184 are in the same subgroup, subgroup 4; yarns 186 and 188 are both in subgroup 3; yarns 190 and 192 are both in subgroup 2 and yarn 194 is in subgroup 1. Looking at cell 180, yarn 181 is in subgroup 7; yarn 186 is in subgroup 5; yarn 188 is in subgroup 3 and yarn 194 is in subgroup 1. Cell 180 has the same arrangement as the basic cell of FIGS. 1E and 2A. In order to form proper bond points from the top subgroup 5 to the non-intersecting bottom subgroup 1 in cell 176, there must be a bond point 196 between yarn 181 of group 5 and yarn 182 of group 4 plus a bond point 198 between yarn 182 and yarn 194 of group 1. With the ultrasonic bonding paths as shown by the arrows at 200, there will be an additional bond point 202 between yarn 181 of subgroup 5 and yarn 192 of subgroup 2 and a bond point 204 between yarn 192 and yarn 194 of subgroup 1. Through a chain of bond points in cell 176, the top subgroup 5 is connected to the bottom subgroup 1 even though the top and bottom subgroups don't cross one another. The arrangement of ultrasonic bond paths to achieve proper spaced bonds for the fabric 112 of FIGS. 6 and 7 is different from the bond paths for the fabric 174 of FIG. 9.

Figure 10A:
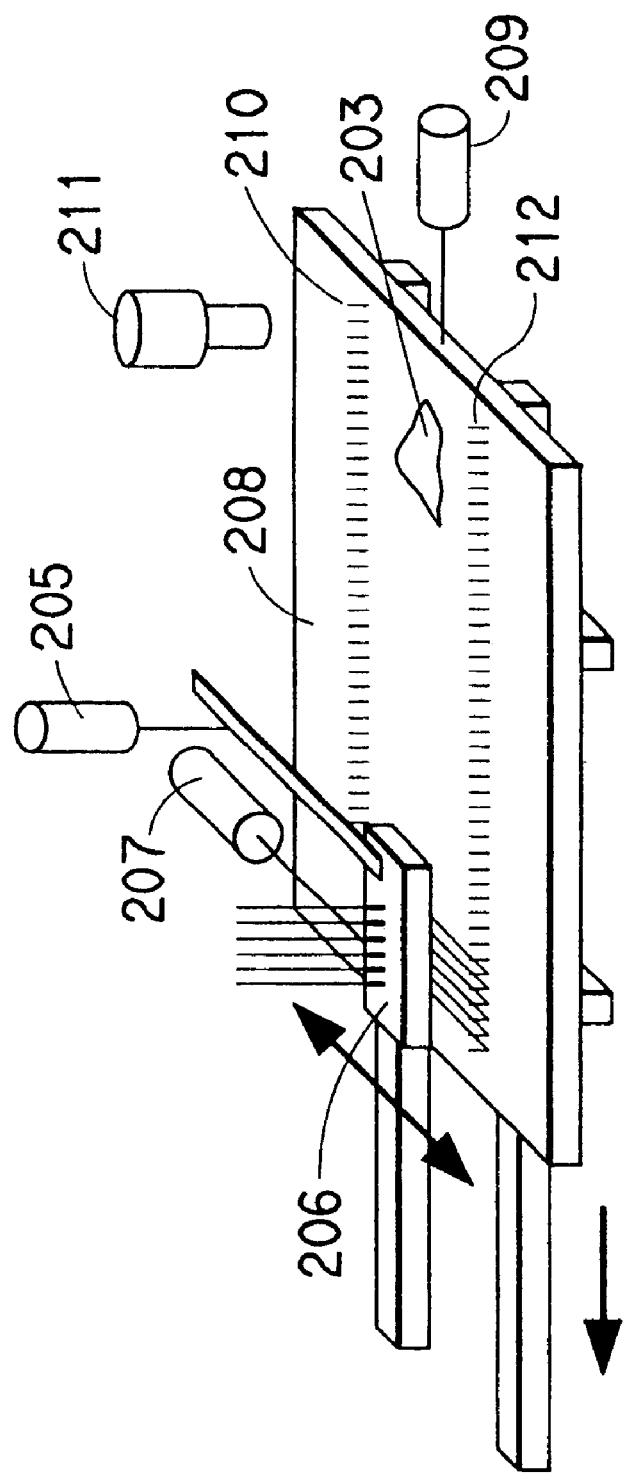
FIGS. 10A–B show a table apparatus for making a single batch of two dimensional or three dimensional fabric structure and a sample of a piece of three dimensional biaxial fabric structure.
Figure 10B:
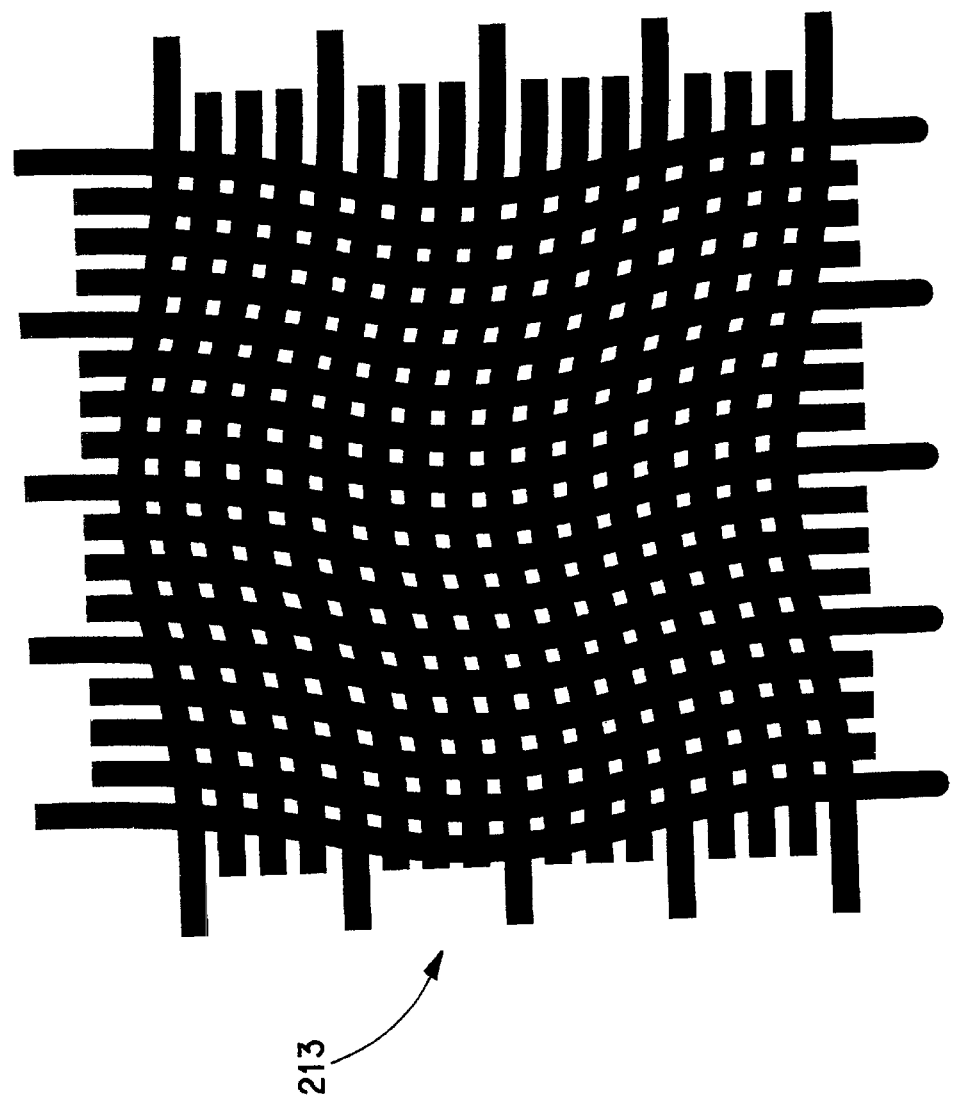

FIG. 10A shows another apparatus for producing two dimensional fabrics of the invention. It is suitable for making a batch fabric instead of a continuous fabric. It is a simplier apparatus than that of FIG. 6. A single guide block 206 is oscillated back and forth by actuator 207 over a table 208 that also oscillates back and forth by actuator 209 in a direction at right angles to the direction of oscillation of block 206. Parallel rows of pins 210 and 212 hold the yarn at the reversals. Vacuum may also be applied to the plate if desired. The block and table make numerous cycles back and forth in a manner coordinated with each other to produce dense groups of yarn crossing one another. A single ultrasonic bonding horn 211 is then repeatedly passed over the fabric in paths parallel to the oscillation direction of table 208 to make spaced bond paths to connect the top and bottom subgroups of yarns together. The fabric is then peeled off the edge pins 210, 212. By adding motion to the guide 206 in a vertical direction by actuator 205, a three dimensional fabric could be made over a three dimensional form 203 mounted on table 208. FIG. 10B shows the curved yarn paths in a fabric 213 that may be employed to cover a three dimensional form.

FIG. 11A shows another apparatus for producing two dimensional batches of fabric structure. It is similar to the apparatus of FIG. 10 except instead of laying yarn down on a table, the yarn is placed on a mandrel 214 by a guide block 216. Instead of the guide block 216 oscillating back and forth as in FIG. 10, the guide block 216 is stationary and the mandrel 214 oscillates in a rotary motion by motor 215 as indicated by arrow 217 at the same time the table 208' moves the mandrel past the guide block by actuator 209'. A single row of pins 218 holds the yarn between reversals in both directions as the mandrel rotates. The result is a fabric having a cylindrical tubular shape during fabrication. After all yarns are laid down, a single ultrasonic horn 219 repeatedly follows an axial path along the mandrel at different circumferential locations over the fabric as it is oscillated back and forth via the table and mandrel. This results in parallel bond paths to connect the top and bottom groups together. Alternatively, the horn could follow a circumferential path at different axial locations along the mandrel. When peeled off pins 218, the result is a flat fabric. This fabrication on a cylindrical mandrel has an advantage over the flat plate of FIG. 10A in that yarn tension can be used to hold the yarns securely against the mandrel.

FIG. 11B shows an apparatus similar to that in FIG. 11A except the mandrel 214 would rotate continuously in one direction to make a cylindrical batch of fabric. In FIG. 11B, a rotating mandrel 220 is mounted on moveable table 208" oscillated by actuator 209". A circular yarn guide support 222 holds a plurality of guides, such as yarn guide 224, that are spaced apart around the circumference of the mandrel 220. Support 222 is held stationary relative to the mandrel and table. A yarn strand, such as strand 226 from stationary package 228, is fed through each guide, such as 224, and is secured to end 230 of the mandrel where the support and mandrel are aligned before the mandrel starts to rotate and the table starts to move. Since the yarn packages are stationary, the yarn can be supplied endlessly using a resupply package (not shown) and yarn transfer tails on the packages. The mandrel 220 has a plurality of rings 232 and 234 of closely spaced pins near the ends 230 and 236, respectively, of the mandrel as shown. These engage the yarn at the ends of the traverse when the table reverses direction. At the end of each traverse as the yarn engages the pin rings, the table stops moving and the mandrel is moved through a few degrees of rotation to make sure the yarn is firmly engaged by the pins before the table reverses direction. The mandrel may be moved precisely by a stepping motor, such as motor 238. The yarn must also align with the desired offset position of the cell before laying down next to an adjacent yarn.

Figure 11C:
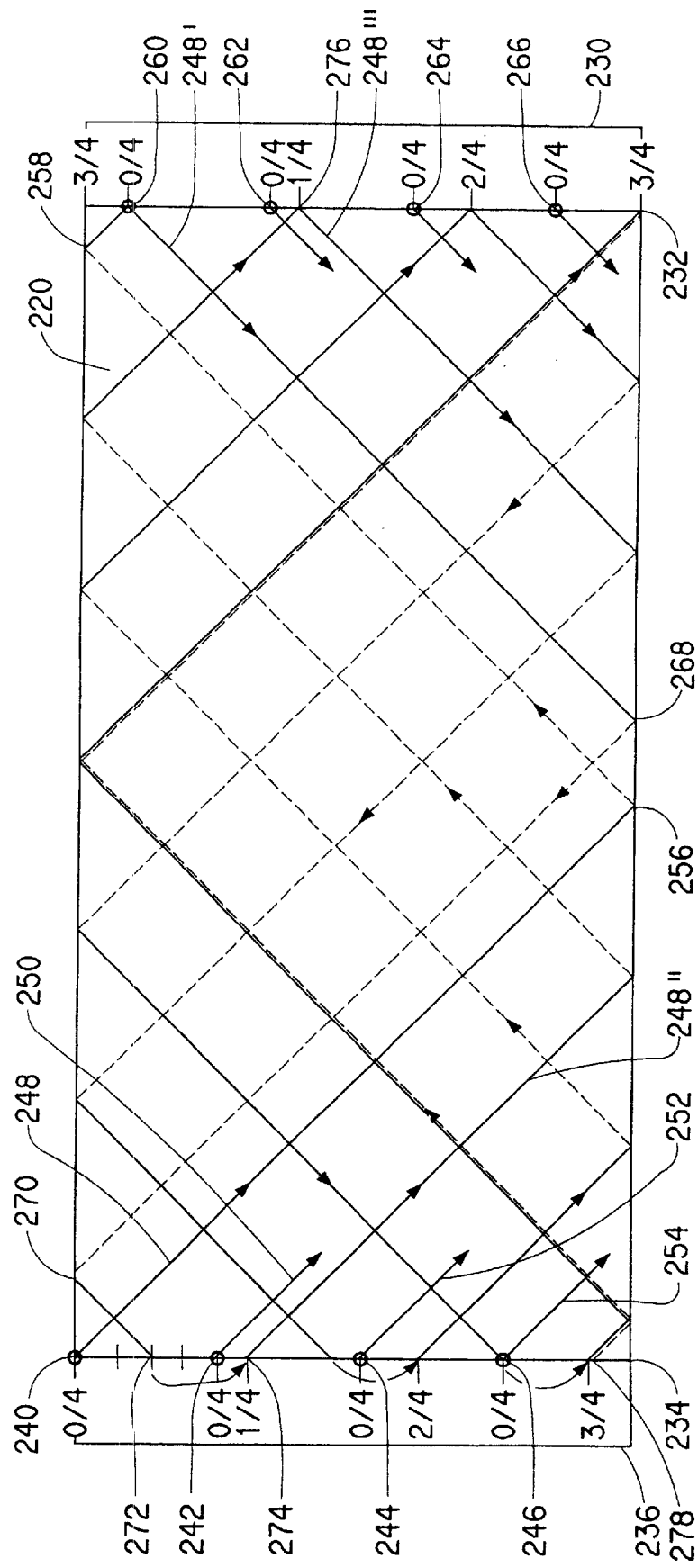
FIG. 11C shows a flattened view of a tubular fabric structure made on the apparatus of FIG. 11B.

The yarn laydown pattern and the motion of the table and mandrel will be discussed further referring to FIG. 11C which is an imaginary view of the mandrel as if it were flattened out into a two dimensional form. At the left of the figure is mandrel end 236 and pin ring 234, and at the right of the figure is mandrel end 230 and pin ring 232. The dashed lines in the figure trace the yarn paths on the back side of the flattened mandrel; the solid lines trace the yarn paths on the front side. The yarns illustrated are only those that are seen to start on the front side of the figure at points 240, 242, 244, and 246; and of these, only the yarn starting at point 240 has its path traced throughout one complete laydown. These start points are those where the yarn is laid down by guides such as guide 224 in support 222. Four other yarns from support 222 would be tracing out similar paths starting on the back side of the flattened mandrel at the same spacing as the yarns shown on the front side. These points represent the first yarn position 0/4 of four possible positions for a first group in a cell space for the fabric. Yarn at point 240 follows path 248 as mandrel 220 rotates and translates relative to yarn guide support 222; while yarns at points 242, 244, and 246 follow paths 250, 252, and 254, respectively. Tracing path 248 for laying down yarn in a first group, path 248 passes to the back side of the flattened mandrel at 256 and returns to the front side at 258 and reaches the ring of pins 232 at 260. Similarly, another first group yarn from point 242 would reach the ring 232 at point 262; yarn from point 244 would reach the ring 232 at point 264; and yarn from point 246 would reach the ring 232 at point 266.

Assuming the yarn is instantly engaged by the pin ring 232, the mandrel rotation continued, and the mandrel translation reversed immediately, the yarn path 248' would start back along the mandrel from point 260 to lay down yarn in the second group. If this ideal situation did not exist, the translation of the mandrel would stop while the mandrel rotation continued for a few degrees to anchor the yarn in the pins. The points at the right end 230 of the mandrel represent the first yarn position 0/4 for a second group in a cell space for the fabric. Yarn path 248' passes to the back side of the flattened mandrel at 268 and returns to the front side at 270, and reaches the ring of pins 234 at point 272. It now must be decided what pattern of yarn positions are desired in the fabric. Assuming the next yarn position desired is the ¼ position, and the mandrel will continue rotating in the same direction, the yarn landing at position 272 wants to be in position 274 before reversing the translation of the mandrel. The translation of the mandrel will stop when the yarn reaches point 272 and will dwell there while the mandrel rotates a few degrees until the yarn reaches point 274; and the translation will then reverse and the yarn will follow path 248". This will cause the yarn to land in the right pin ring 232 at point 276 which is also in the ¼ position of the cell space. If this is the desired pattern for the second group cell space, the mandrel translation can immediately reverse and the yarn will return along path 248'". If it is desired to change the yarn position for the cell, the translation of the mandrel can stop and the mandrel can continue rotating for a few degrees until the yarn is in the desired position in the cell space, and then the translation reverses and the yarn follows on a new path. The yarn pattern in a cell can then be different for the first group yarns and the second group yarns. This pattern will continue until the yarn from point 240 lands back at pin ring 234 at position 278. At that point all the yarn positions for the cell space are occupied by subgroups of yarns and the cylindrical batch of fabric structure is ready for bonding.

Figure 11D:
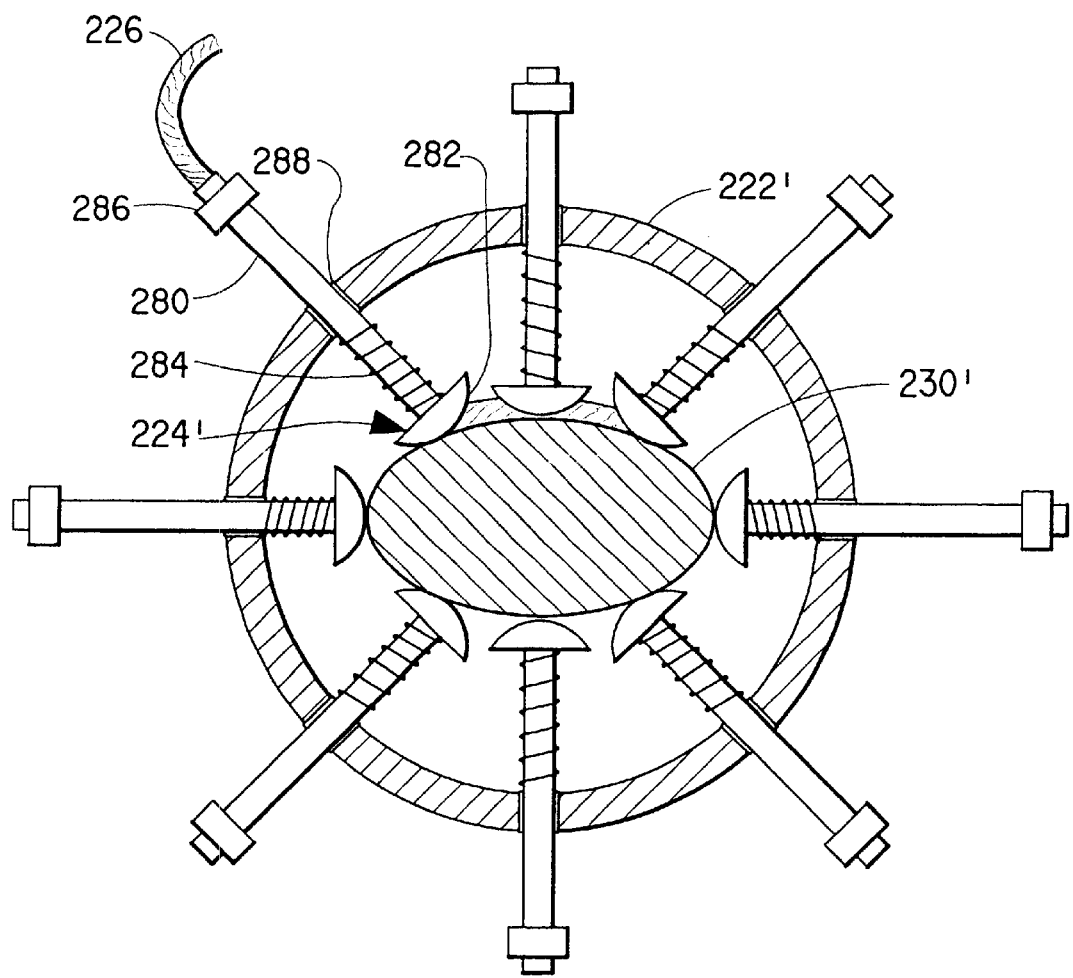
FIG. 11D shows a special device for laying down yarn.

An ultrasonic bonding horn (not shown, but similar to horn 219 in FIG. 11) can make repeated passes along the axis of the mandrel by translating the mandrel without rotation under the stationary horn and rotating the mandrel through several degrees at the end of each pass. Alternatively, the bonding can be along circumferential paths. After bonding, the pin rings may be removed (by retracting or other means) and the fabric pushed off the mandrel. Alternatively, one end of the fabric may be cut at one pin ring and only the opposite pin ring removed. By pushing the fabric, it will expand, since the fabric is oriented on a bias relative to the mandrel axis, so it will be easy to slide the fabric off the mandrel. In general terms, the process just described for forming an interlaced fabric structure comprises:

(a) providing an elongated fabric support surface on a rotatable mandrel having a rotational axis and opposed lateral ends substantially perpendicular to said axis, and (b) orienting the surface adjacent a circumferential yarn guide ring substantially perpendicular to said axis, the ring arranged adjacent a lateral end of the fabric support surface;

(c) providing a plurality of guides on said guide ring, each guide adapted to guide a yarn from a yarn source to the support surface, the guides equally spaced to deposit yarn at equal intervals around the mandrel circumference;

(d) engaging the yarns at one end of said support surface;

(e) providing relative motion between the support surface and the guide ring so that the ring deposits yarn from the guides onto the surface in a first diagonal direction relative to the ends of the surface from one end to the opposed end and in a predetermined rotational direction along the support surface thereby sparsely covering the fabric area on the mandrel surface with yarns in said first direction;

(f) engaging the yarns at an opposed end of said support surface;

(g) reversing the relative motion of the guide ring and support surface so that the guide ring deposits yarn from the guides onto the surface in a second diagonal direction relative to the ends of the surface from said opposed end to said one end and in said predetermined rotational direction along the support surface thereby sparsely covering the fabric area on the mandrel surface with yarns in said second direction;

(h) arranging said guide ring and guides and arranging said relative motion so that when the yarns from said guides on the guide ring are subsequently deposited on said surface, the diagonal positions of subsequently deposited yarns are offset from previously deposited yarns in each first and second diagonal direction to thereby densely cover the support surface with said yarns after repeated cycles of relative motion from said one end to the opposed end and back to said one end.

In some cases, it is desired to use the same circular guide support 222 (FIG. 11B) for structures having different numbers of yarns per cell so a different guide support does not need to be installed for routine changes in yarn denier or the like. One way to accomplish this flexibility is to use a special laydown pattern for yarns as discussed above referring to the split cell/single step process which would work well with this apparatus to make cells that would appear to have, and would perform as if there were, fewer numbers of yarns in each cell.

Another possibility is a method of operating the mandrel motor 238 and table actuator 209" to apply a multiple pass of yarns from guide support 222 to make actual changes in the number of yarns per subgroup in the structure. For instance, to double the number of yarns per subgroup, the yarns, such as yarns 226 and 226', could be layed down in a path designated by dashed lines 227 and which would add one yarn between the original yarns laid down by the guide. This would be accomplished as follows:

a. rotate the mandrel in a clockwise direction as designated by arrow 221, and translate the mandrel past the guide support 222 as shown so that a sparse subgroup of yarn, such as a zero degree sublayer formed of yarns such as yarn 226 and 226', is layed down on the mandrel from pin ring 232 to pin ring 234;

b. stop the translation and rotate the mandrel further by one half the distance between the yarn guides 224;

c. reverse the rotation of the mandrel to rotate counter-clockwise and translate the mandrel past the guide support 222 so that the yarn, such as yarn 226 and 226', is layed down on the mandrel from pin ring 234 to 232 and between the solid line yarns to add yarns to the sparse zero degree subgroup;

d. stop the mandrel translation and continue the counter-clockwise rotation by a distance to place a yarn guide 224 in position for the next sublayer, such as a ninety degree subgroup;

e. continue the counter-clockwise rotation and translate the mandrel past the guide support 222 so that a sparse subgroup of yarn, oriented in a ninety degree subgroup formed of yarns such as yarn 226 and 226', is layed down on the mandrel from pin ring 232 to pin ring 234;

f. stop the translation and rotate the mandrel further in a counter-clockwise direction by one half the distance between the yarn guides 224;

g. reverse the rotation of the mandrel to rotate clockwise and translate the mandrel past the guide support 222 so that the yarn, such as yarn 226 and 226', is layed down on the mandrel from pin ring 234 to 232 and between the just-layed-down ninety degree subgroup yarns to add yarns to the sparse ninety degree subgroup;

h. stop the mandrel translation and continue the clockwise rotation by a distance to place a yarn guide 224 in position for the next subgroup, such as another zero degree subgroup;

i. repeat the process a-h just described to add more subgroup as desired.

This altered process is different from the simple cell process for forming subgroup on the mandrel 220 where the guide has all the yarns necessary for a subgroup and the mandrel rotates in the same direction as it lays yarn back and forth between the pin rings. The altered process just described adds yarns to a subgroup by the continued rotation of the mandrel half the distance (or some other fraction) between the yarn guides 224, and then reversing the rotation of the mandrel to add yarns to that subgroup. If two more yarns were to be added between guided yarns instead of the one more yarn just described in the example above, the continued rotation would only be one third the distance between guides and this step would be repeated at the next pin ring. Similarly, if three more yarns were to be added, the continued mandrel rotation would only be one fourth of the distance between guides and this step would be repeated at the next two pin rings. When laying down yarns in this manner where the direction of rotation of the mandrel is reversed, it is important to minimize backlash in the apparatus and to minimize the unguided yarn length between the yarn guide and the mandrel surface.

There is a concern when laying down yarn on the mandrel of FIG. 11B that the path from the guide to the surface of the mandrel be as short as possible so the lay down position on the mandrel can be accurately predicted and controlled. This is a concern in any of the yarn laydown devices. One way to accurately lay down the yarns with precision is to use the device in FIG. 11D which is shown in an end view of a mandrel 230' and circular guide support 222'. To illustrate a general case, the mandrel 230' is shown as an oval shape. It will be appreciated that the mandrel shape may also vary along its axis. Support 222 ' holds a plurality of guides, such as guide 224' that guides yarn 226. Each guide, referring to guide 224', includes a hollow shaft 280, a radiused guide tip 282, a spring 284, and a retainer 286. The shaft passes through a hole 288 in support 222'. Spring 284 is placed over shaft 280 between support 222' and tip 282 to thereby urge the tip toward the mandrel 230'. Yarn 226 passes through hollow shaft 280 and out through tip 282 and directly onto mandrel 230'. In this way, the yarn is laid directly onto the mandrel much as if it were "painted" on the mandrel surface. This insures accurate placement of the yarn on the mandrel. The shaft moves freely in hole 288 in support 222' to allow the guide tip to ride over any variations in the shape of the mandrel while the spring keeps tip 282, and the yarn 226 issuing therefrom, securely in contact with the mandrel surface. The tip 282 may advantageously be coated with a low friction coating for ease of sliding over the mandrel and the yarns laying thereon.

Figure 20:
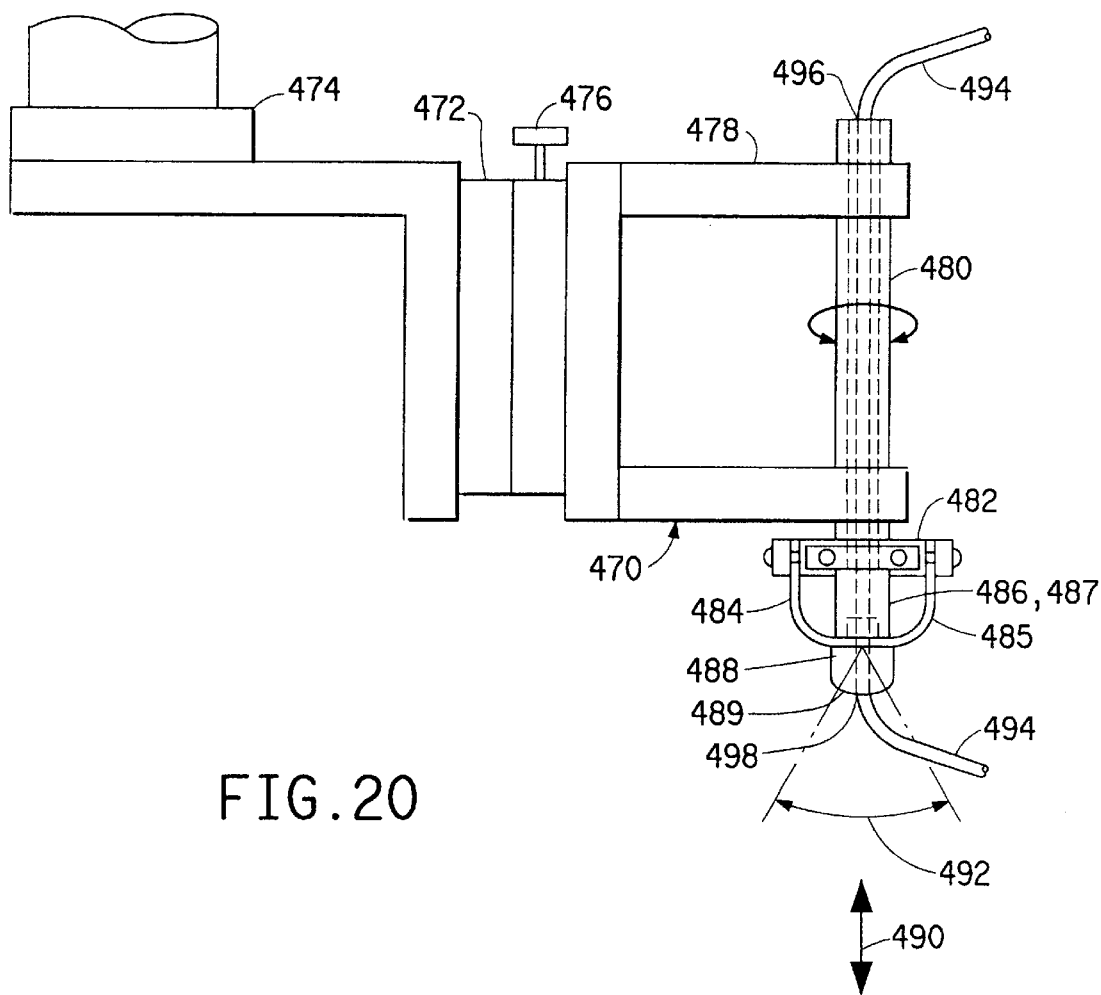
FIG. 20 shows a special device for laying down yarn on mandrels with compound curves.

FIG. 20 shows another device for laying down yarn accurately on a compound curvature, such as a spherical surface, when using a robot or other mechanical actuator. There is a problem that the robot does not always follow complex curved paths in a continuous smooth motion and some irregular stepped motion is produced. It is useful to have some compliance in a yarn guide tip to keep it in contact with a curved mandrel surface during deviations in the path of the guide actuator or robot. Yarn guide 470 is attached to a slide 472 which is attached to a robot face plate 474. The slide is useful for fine positioning adjustments by way of screw 476 to set the initial deflection of the guide when programming the robot path. The guide 470 comprises a frame 478 that supports a hollow shaft 480 for rotation. A block 482 mounted on shaft 480 supports four thin flexible springs 484, 485, 486, and 487 (located behind 486). Attached at the intersection of the springs is a hollow tip 488 with a hemispherical end 489. The springs permit motion of the tip in the axial direction 490 and in a conical direction defined by angle 492. Rotation of shaft 480 allows the tip to roll over any surface it contacts while it is also free to deflect axially and angularly. This allows the tip to accurately place a yarn 494 on the surface while the yarn is passing through the hole 496 in hollow shaft 480 and the hole 498 in hollow tip 488.

Figure 12:
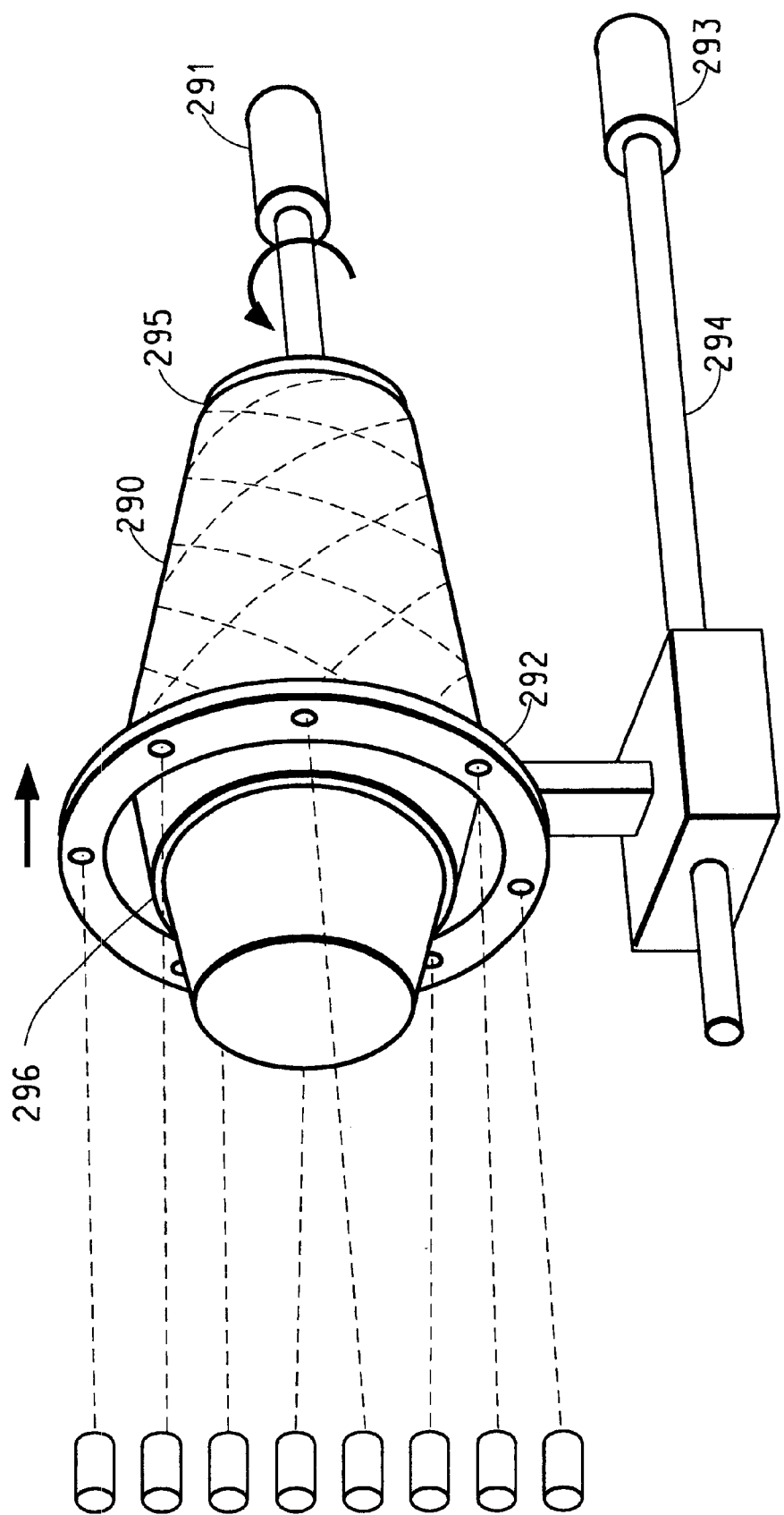
FIG. 12 shows another mandrel apparatus for making a single batch of three dimensional fabric structure.

FIG. 12 shows an apparatus that is used to make a simple three dimensional tubular batch fabric using a lathe-type device or a textile yarn winding device where the mandrel 290 rotates continuously by motor 291, but without translating, and the circular guide support 292 traverses along the mandrel axis back and forth driven by a cam or screw 294 rotated by a motor 293. Coordination of motors 291 and 293 provides control of the fabric structure. The pin rings of FIG. 11B may be eliminated by providing shoulders 295 and 296 to engage the yarn at the reversals and by keeping the bias angle low relative to the shoulder. This is a variation of the device shown in FIG. 11B which may allow fabrication of fabrics of the invention with slight modification of existing mandrel systems.

Figure 13:
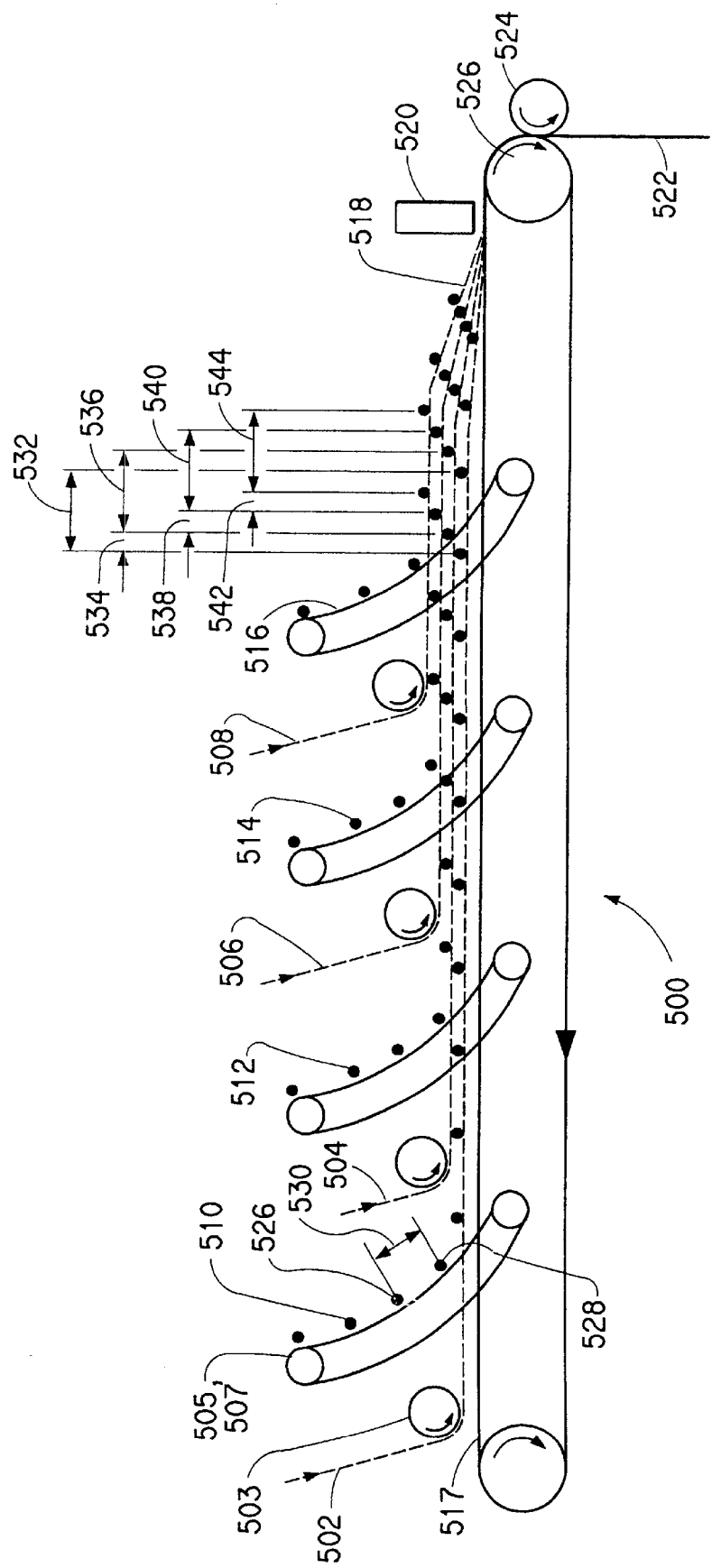
FIG. 13 shows another apparatus for continuously forming a two dimensional biaxial fabric structure with the yarns oriented at 0 degrees and 90 degrees to the machine direction.

FIG. 13 shows an apparatus that is used to make a continuous fabric where the two groups of yarn are oriented parallel and perpendicular to the direction of motion of the laydown belt. One group of yarns is supplied as a plurality of subgroups each comprising a plurality of yarns in a warp direction; and another group is supplied as a plurality of subgroups each comprising a plurality of yarns in a weft direction. A plurality of spaced ultrasonic bond paths connect the top and bottom subgroups together. The weft direction yarns are supplied by a process and apparatus similar to that disclosed in U.S. Pat. No. 4,030,168 to Cole hereby incorporated herein by reference.

In FIG. 13 is an apparatus 500 for laying down subgroups of yarns 502, 504, 506, and 508 in the machine direction (MD) and combining them with subgroups of yarns 510, 512, 514 and 516 in the cross-machine direction (XD) on a conveyor surface 517 to continuously form a pre-bonded fabric structure 518. The subgroups of yarns 502, 504, 506 and 508 are guided onto the conveyor surface 517 by guides extending across the surface 517, such as guide bar 503 for subgroup 502. The guides, such as guide bar 503, may comprise rollers each having circumferential guide grooves (not shown) to act as individual yarn guides to guide each of a plurality of yarns spaced across the guide between the opposed edges of the conveyor surface for arranging the subgroup of yarns with respect to other MD yarns deposited on the conveyor surface. The guides, such as guide bar 503, may also comprise a group of spaced eyelets on a bar to guide each of a plurality of yarns in the subgroup of the group arranged in the machine direction. The subgroups of yarns 510, 512, 514 and 516 are guided onto the conveyor surface 517 by looped guides along the two opposed edges of belt 517, such as looped guides 505 on the near side and 507 on the far side for guiding subgroup 510. The looped guides have spaced yarn holders or clamps (not shown) for holding the spaced relationship between the yarns in the subgroup of the group arranged in the XD direction. The holders or clamps would release the yarn after it is deposited on the fabric support surface of the conveyor and on any MD yarns already placed there. Preferably the XD yarns are not released by the clamps until they are engaged by the next MD yarns. In some cases, the MD yarns may be placed under tension and be able to provide enough support for the XD yarns so that a separate support surface is not required. An alternative to the endless loop conveyor surface illustrated may be a circular drum support surface, as long as the yarns can be adequately held on the surface, such as with MD yarn tension or a vacuum, during rotation of the drum. The conveyor would be driven and have a vacuum applied similarly to the conveyor described in FIG. 6. Fabric 518 is consolidated and connected by a plurality of spaced apart bonders located at position 520 to form a continuous fabric 522 of the invention. Contact roller 524 presses against conveyor roller 526 to positively drive the fabric without slippage on conveyor surface 517. The subgroup 502 comprises a sparsely spaced plurality of yarns that are spaced apart by a repeatable cell distance and are laid directly on a conveyor surface 517. The subgroup 504 comprises a sparsely spaced plurality of yarns that are also spaced apart by the same cell distance and are offset one yarn position (into the paper) from subgroup 502; subgroup 506 comprises a sparsely spaced plurality of yarns that are spaced apart by the same cell distance and are offset from both 502 and 504; and subgroup 508 comprises a sparsely spaced plurality of yarns that are spaced apart by the same cell distance and are offset from all of subgroups 502, 504, and 506. The subgroup 510 comprises a sparsely spaced plurality of yarns with all the yarns, such as yarns 526 and 528, spaced apart a repeatable cell distance 530, which distance is the same for the spacing of all the yarns in the other subgroups 512, 514, and 516. This spacing determines the number of possible yarn positions for the yarns in the subgroups 510, 512, 514, and 516.

This controlled spacing and offset is best seen as the subgroups come together to form a fabric structure. The yarns in subgroup 510 are spaced apart at a cell distance at 532; the yarns in subgroup 512 are offset from subgroup 510 by a repeatable offset 534 and are spaced apart by the cell distance at 536; the yarns in subgroup 514 are offset from subgroup 512 by a repeatable offset 538 and are spaced apart by the cell distance at 540; and the yarns of subgroup 516 are offset from subgroup 514 by a repeatable offset 542 and are spaced apart by the cell distance at 544. These yarns are shown in a position pattern of 0/4, 1/4, 2/4, and 3/4 going sequentially from subgroup 510 to subgroup 516. This sequence could be different, such as 0/4, 3/4, 1/4, and 2/4, depending on the pattern and structure desired. The same pattern sequence variations are also possible in subgroups 502, 504, 506, and 508 without regard to the patterns in subgroups 510–516. Films and other fiber materials may be inserted between subgroups of yarn as was suggested in FIG. 6. In general terms, the process just described for forming an interlaced fabric structure comprises:

(a) providing an elongated fabric support surface having an elongated axis and opposed lateral edges, wherein a machine direction (MD) is defined in the direction of the elongated axis and a cross-machine direction (XD) is defined between opposed edges;

(b) laying down at the support surface a plurality of yarn subgroups having yarns oriented in the MD, each subgroup layed down at spaced locations along the elongated axis, the yarns in each one MD subgroup located at offset positions in the XD different from other MD subgroups;

(c) laying down at the support surface a plurality of yarn subgroups having yarns oriented in the XD, each subgroup layed down at spaced locations along the elongated axis, an XD subgroup spaced from a respective MD subgroup, the yarns in each one XD subgroup located at offset positions in the MD different from other XD subgroups;

(d) moving the support surface in a predetermined direction aligned with the elongated axis to bring together the yarns deposited from all MD and XD subgroups to form a stack;

(e) urging the subgroups together and connecting the top subgroup in the stack to the bottom subgroup in the stack to thereby form an interlaced fabric structure.

A variation of the process described in relation to FIG. 13 is to preassemble the two orthogonal and adjacent subgroups, such as subgroups 502 and 510 to form a scrim. The four scrims 502/510, 504/512, 506/514, and 508/516 would be joined with the offsets between subgroups described above to make the same fabric structure. The preassembled subgroups could be temporarily assembled into the scrims with a size adhesive which is removed after final assembly and connecting of the upper and lower subgroups, or the connections between the preassembled subgroups could remain in the final fabric structure.

Figure 15:
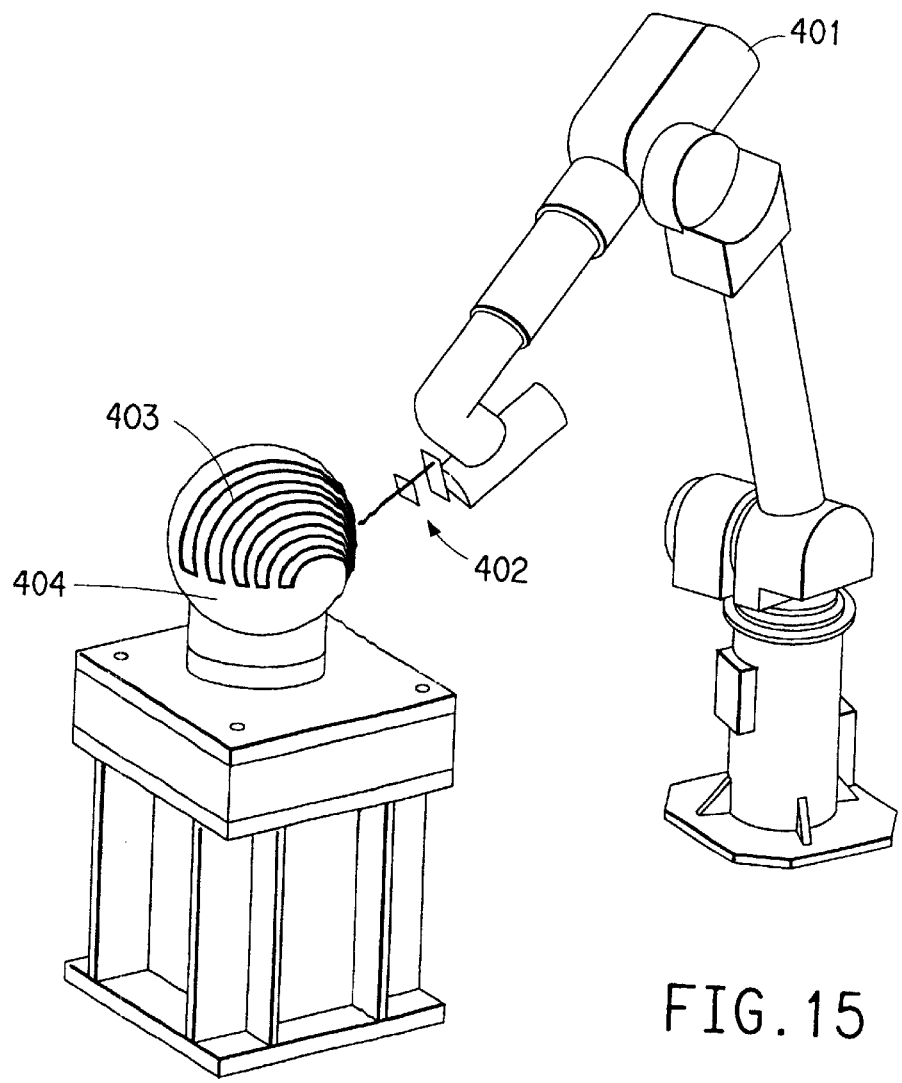
FIG. 15 shows a generalized yarn dispensing system for a shaped mandrel.

The flexible fabric of the instant invention can be made directly into a three dimensional shape referring to FIG. 15 to FIG. 18E. A flexible fabric can be made directly to shape by laying each subgroup directly onto a shaped surface. FIG. 15 shows an example of using a generalized dispensing system to create the fabric. A generalized actuator, in this case, a six degree of freedom robot 401, carries a single yarn dispenser 402, similar to that shown in FIG. 20, to the desired positions and orientations to deposit a yarn 403 onto a shaped mandrel 404. The robot may also carry a plurality of yarn dispensers to deposit a plurality of spaced yarns simultaneously onto the shaped mandrel.

Figure 16A:
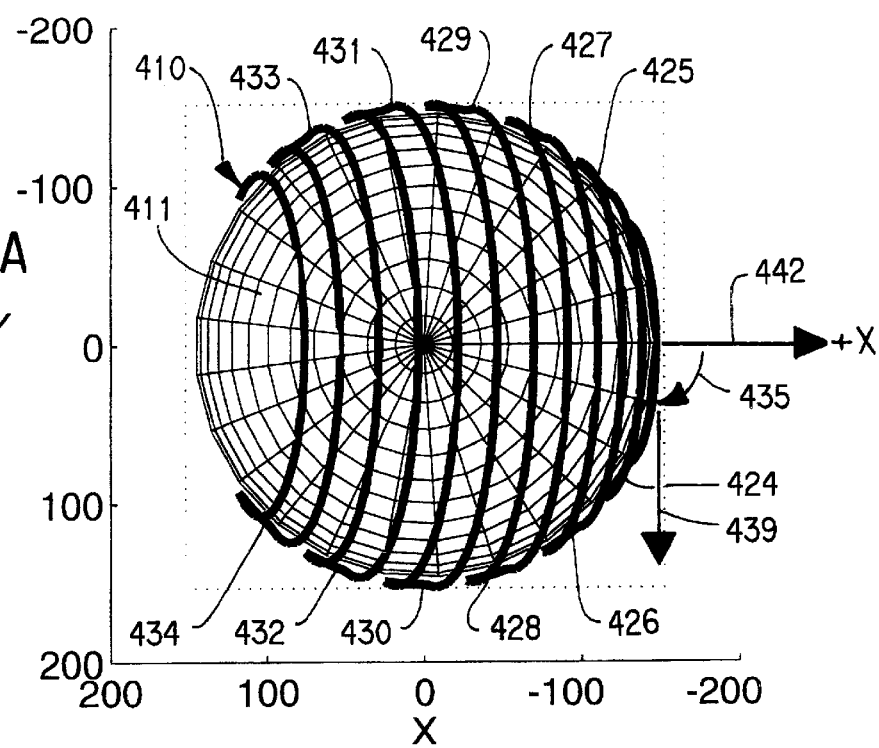
FIGS. 16A–16D show the general orientation of a single subgroup of a single group onto the shape of FIG. 15.
Figure 16B:
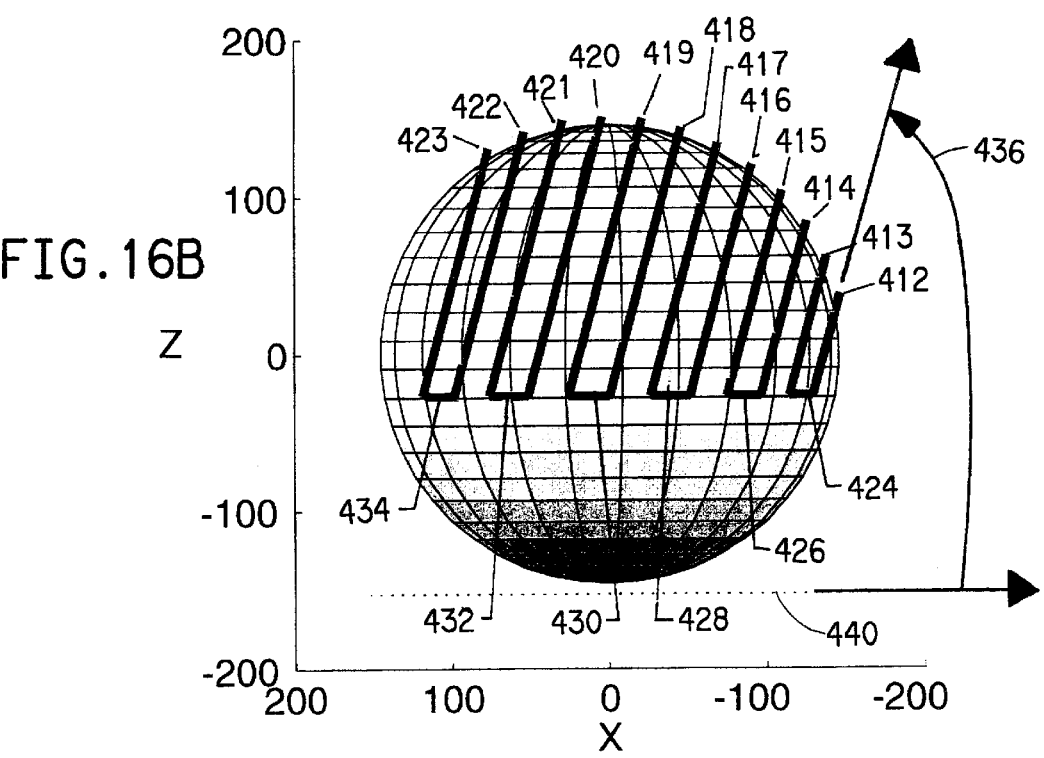
Figure 16C:
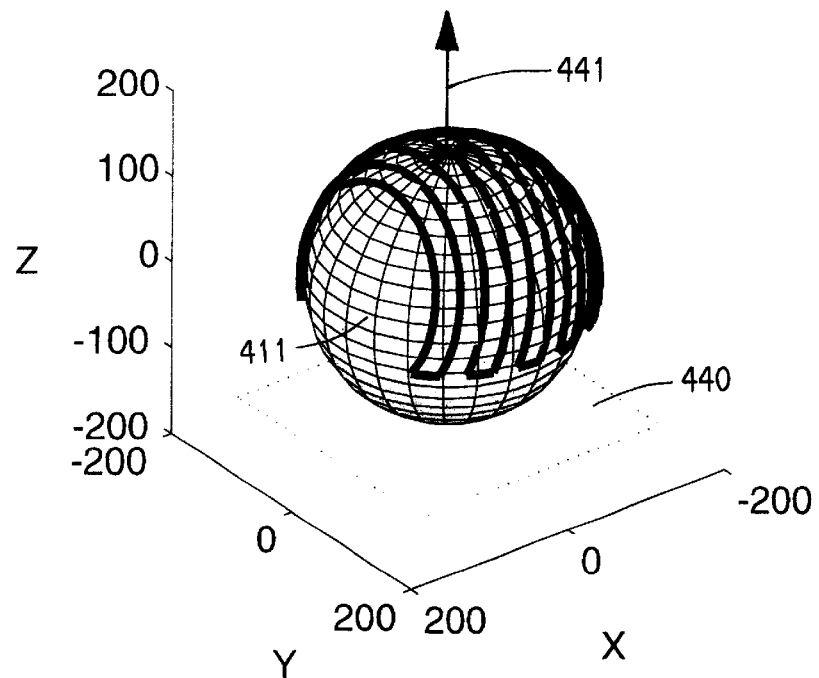
Figure 16D:
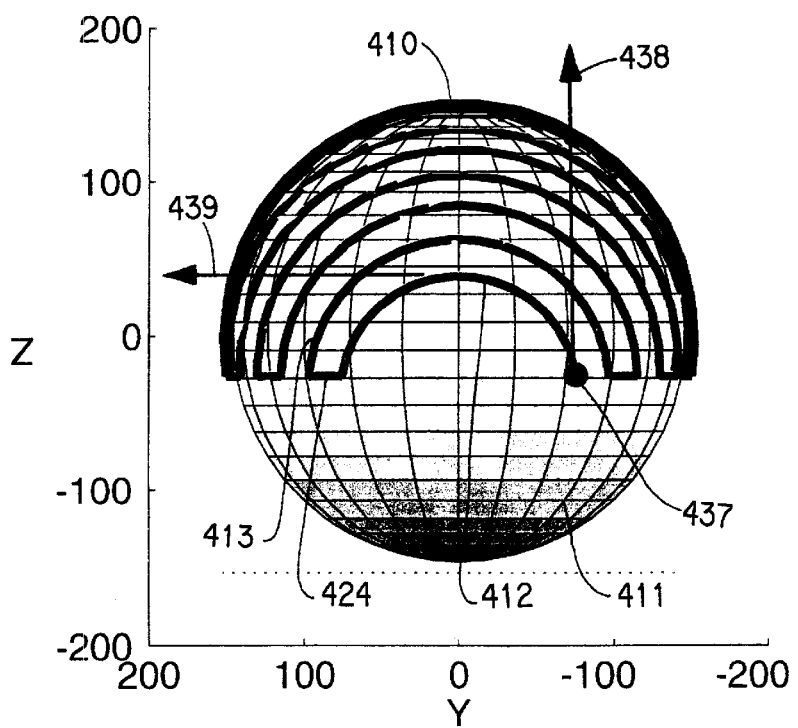
Figure 17A:
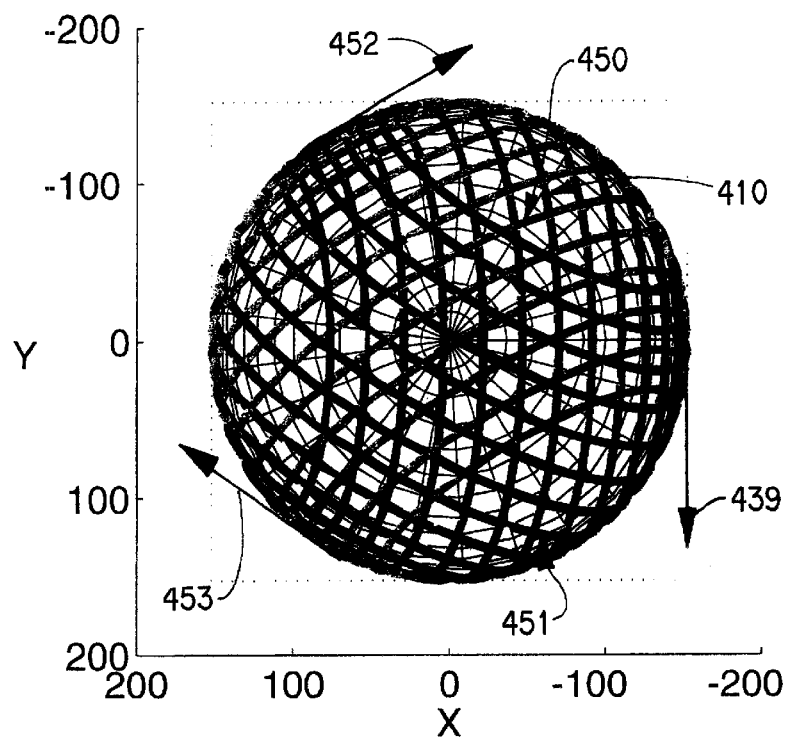
FIGS. 17A–17D show the orientation of a single subgroup of three groups onto the shape of FIG. 15.
Figure 17B:
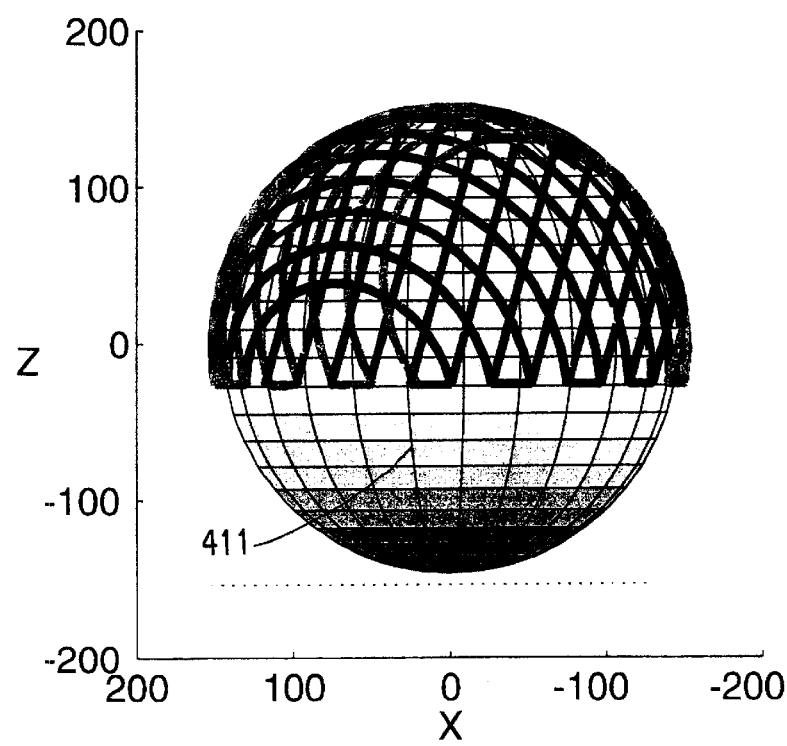
Figure 17C:
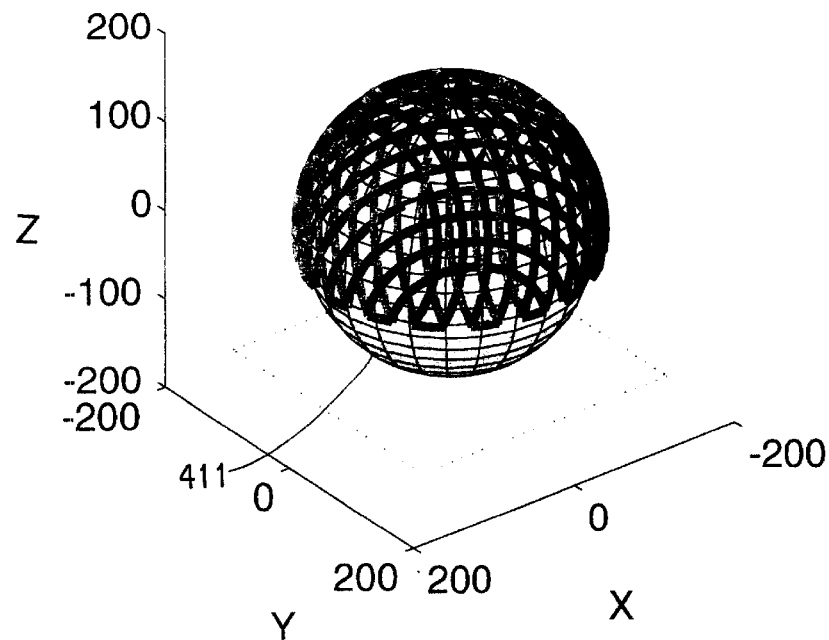
Figure 17D:
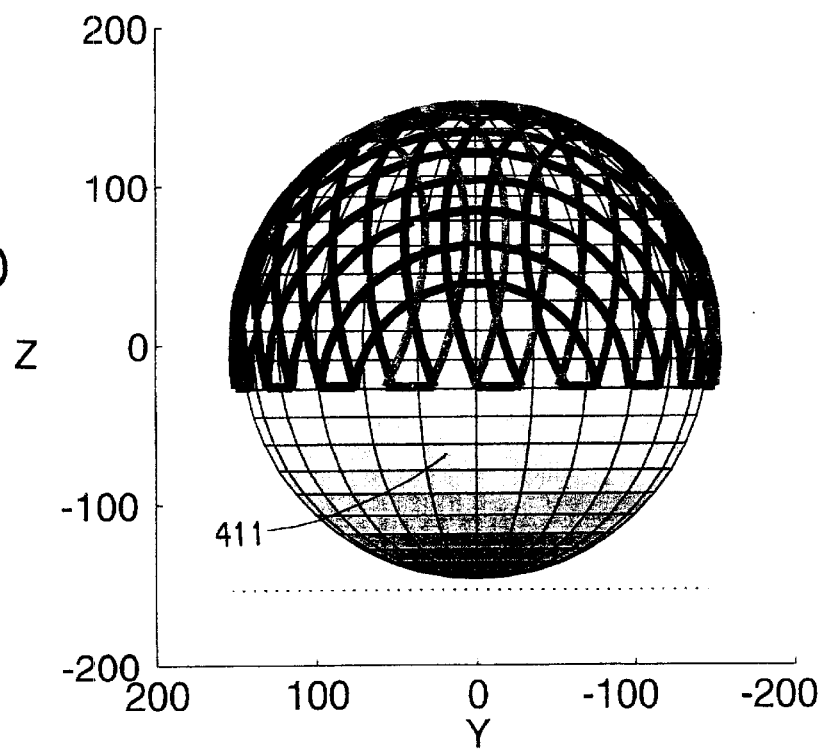

For a general shape, each group of yarns will include yarns that are curved in space. Preferably, neighboring yarns in the group are generally parallel and the yarns of a group densely cover the region of the surface bounded by the outermost yarns of that group; a given group may not necessarily cover the entirety of the desired final shape. FIG. 16A shows a plan view of the mandrel, FIGS. 16B and 16D show elevation views, and FIG. 16C an isometric view. Referring to the figures, paths 410 are curved paths in space for one subgroup of one group of yarns on a spherical mandrel 411. This subgroup path 410 consists of arcs 412, 413, 414, 415, 416, 417, 418, 419, 420, 421, 422, 423, joined by connectors 424, 425, 426, 427, 428, 429, 430, 431, 432, 433, 434. FIG. 16B clearly shows how the connectors join the arcs of subgroup path 410, such as connector 424 which joins arc 412 to arc 413.

The orientation of the subgroup paths 410 with respect to the mandrel 411 is given by two angles: a rotation about the z-axis 435 and an inclination about the x-y plane 436. To find the angle 435, start at the beginning of arc 412 at point 437 in the lower right of FIG. 16D. Define a tangent vector 438 that travels along arc 412 leftwards in FIG. 16D towards the first connector 424. The orientation of this tangent vector at Y=0 in FIG. 16D is shown in the vector 439, seen also in FIG. 16A. Angle 435 is defined as the angle from the positive x-axis 442 to vector 439, in the plan view 16A, which for the case shown is at −90 degrees. The subgroup paths 410 are inclined to the x-y plane 440 at an angle 436, which for the case shown is at +75 degrees. The angle 436 is inclined less than 90 degrees to insure that the yarns at the equator of this spherical mandrel cross in an intersecting relationship from subgroup to subgroup, rather than being nearly parallel if angle 436 were at 90 degrees.

FIGS. 17A–17D show two other subgroup paths 450 and 451 created by rotating the subgroup paths 410 about the z-axis. The plan view angle, equivalent to angle, for path 450 is +30° measure to vector 452 and for path 451 is +150° measure to vector 455. In this example, the three groups of subgroups are evenly spaced, with the plan view angle of path 450 being +120° from path 410 and the plan view angle 435 of path 451 being −120° from path 410. The number of groups and the necessary angles 435 and 436 for each group may be varied to provide the required structural properties of the shaped fabric.

The subgroup path 410 defines the skeleton of paths for the entire group of yarns in this general direction. Other subgroups in this group are found by placing yarns in offset positions along the surface, generally parallel to the sparse yarns of the skeleton 410. In general, the subgroups of a directional group are not simply shifted versions of each other, as in the flat case; they have slightly different shapes. Other subgroups for the yarns in the other group directions 450 and 451 are found by offsetting the subgroup paths 450 and 451 similarly along the surface of the mandrel for those general directions.

FIGS. 18A–18E illustrate a summation and completion of what was discussed referring to the yarn paths of FIGS. 16A–D and 17A–D. FIGS. 18A–E show the progression of yarn from a single subgroup in FIG. 18A; to the first subgroups of three groups in FIG. 18B; to the first two subgroups of three groups in FIG. 18C; to the first three subgroups of three groups in FIG. 18D; to four subgroups of three groups in FIG. 18E, in this case, densely covering the desired surface region to form shaped fabric structure 462. In this example, the yarns in each subgroup are spaced 4 yarns apart, and each subgroup is offset from the previous group by a single position. A similar procedure can be used for groups with different number of yarns (say 3 to 8 yarns) separating the yarns in each subgroup, or a different offset sequence for successive subgroups (say 0/4, 2/4, 1/4, 3/4 instead of the 0/4, 1/4, 2/4, 3/4 sequence shown).

Figure 18A:
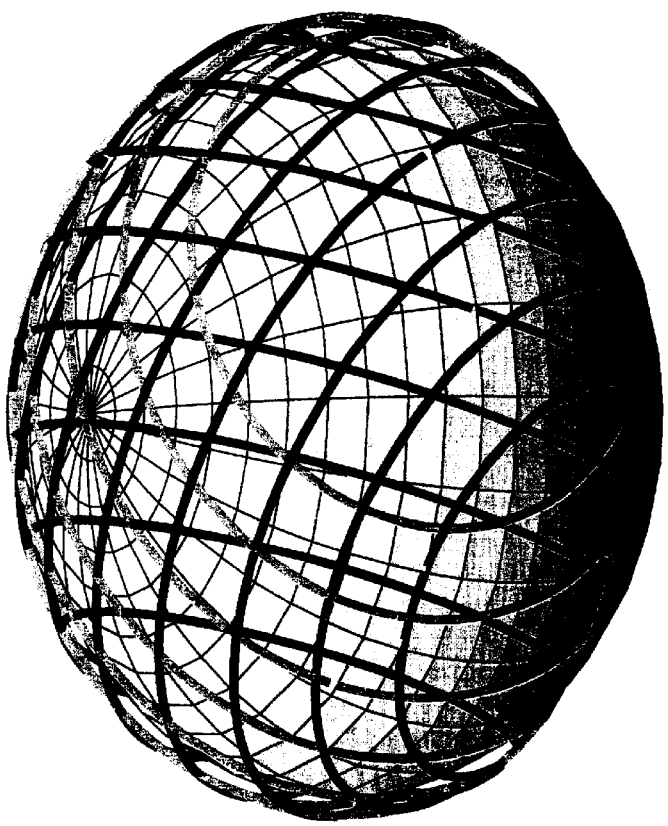
FIGS. 18A–18E show the orientation of successive subgroups of each group being deposited to densely cover the shape of FIG. 15 and form the shaped fabric.
Figure 18B:
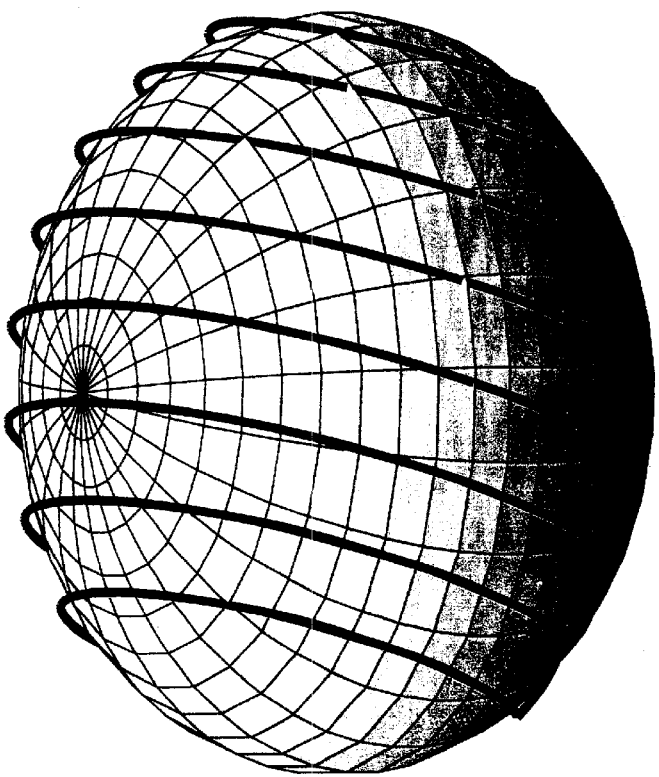
Figure 18C:
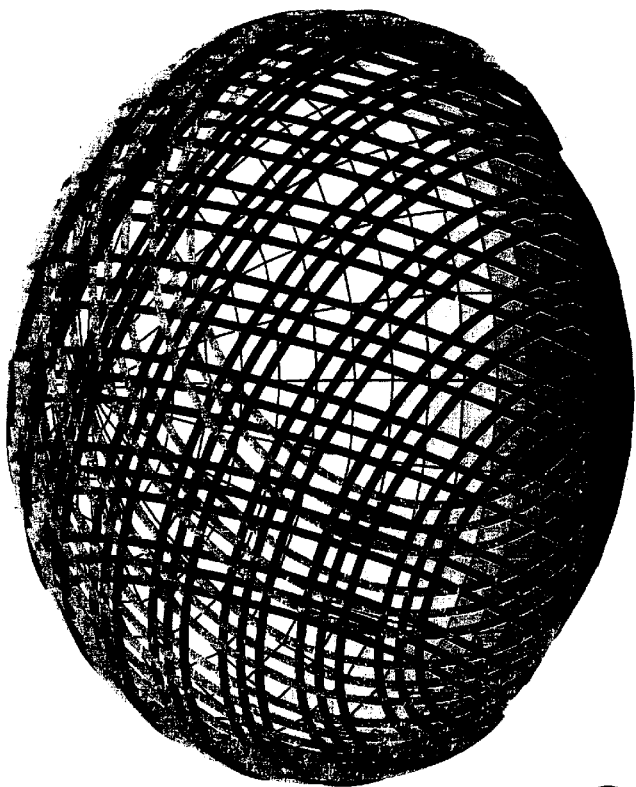
Figure 18D:
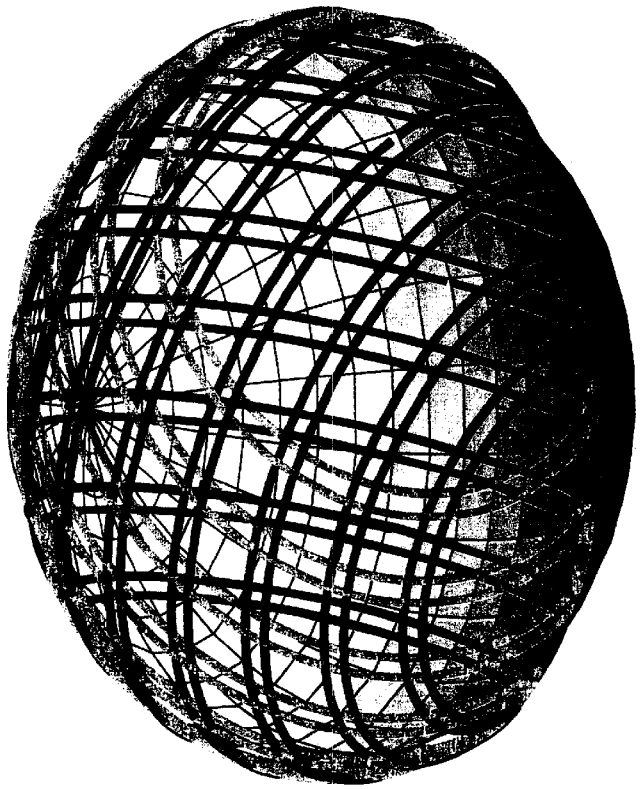
Figure 18E:
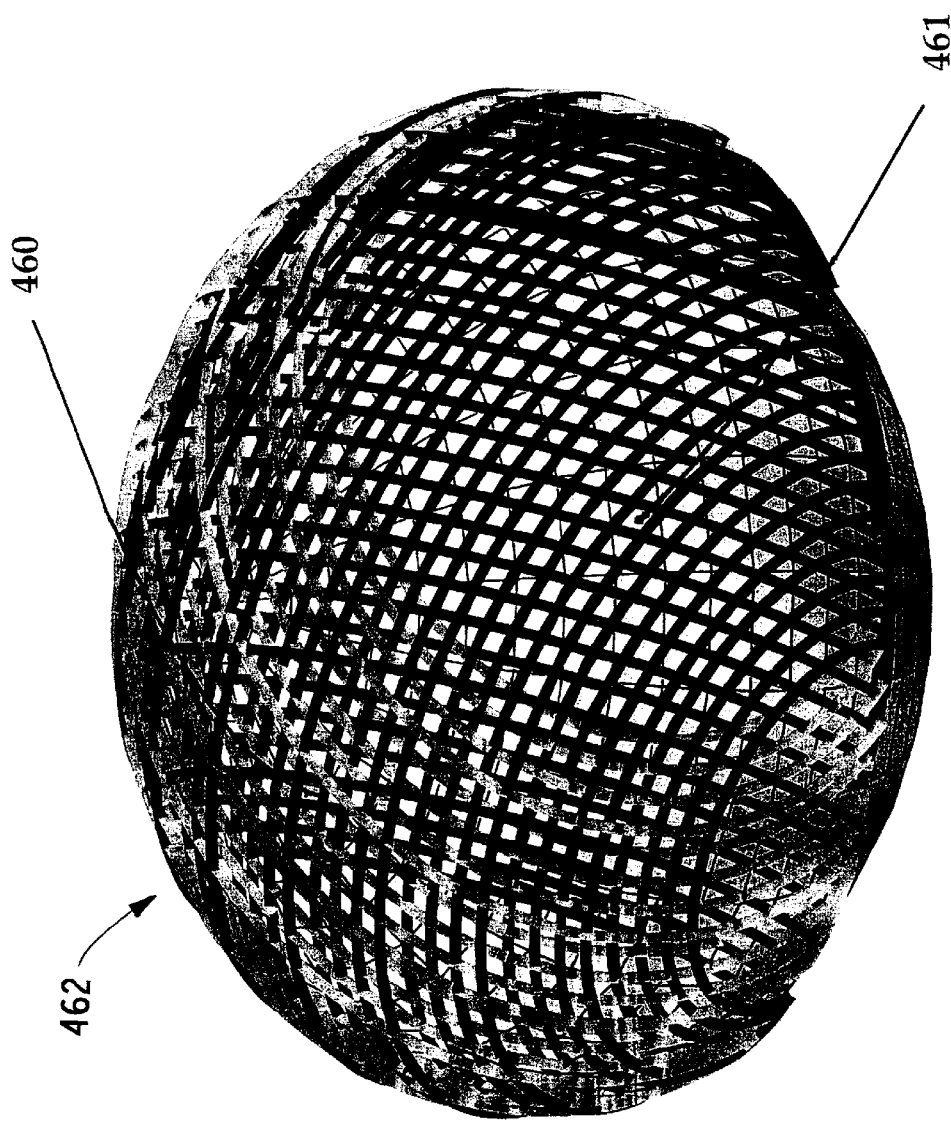

Each family of subgroup paths 410, 450, or 451, making up each of the three groups of yarn paths need not cover the entire final surface region desired, and need not be similar to each other, as in this example. For a general shape with less symmetry, the different groups will not be similar. One may choose as many groups in as many general directions as necessary to cover the desired surface region such that at every point, there are at least two groups of crossing yarns, and the crossing angle is sufficient to meet the mechanical property requirements of the fabric. FIG. 18E shows that the flexible fabric structure may combine triaxial regions 460, having three yarn directions, with biaxial regions 461, having two yarn directions.

To fabricate the fabric, (referring to FIGS. 15, 16A–D, and 17A–D) the generalized actuator may be taught or programmed to dispense yarn along the subgroup paths defined for each group. The dispenser may dispense a single yarn by traversing sequentially the arc 412, then the connector 424, then the arc 413, then the connector 425, etc., then the arc 422, then the connector 434, then the arc 423. Alternately, a dispenser can dispense all the arcs 412, 413, 414, 415, 416, 417, 418, 419, 420, 421, 422, 423 simultaneously in one pass. Alternately, a dispenser can dispense selected numbers of the arcs, such as the arcs 412, 413, 414 in one pass; and complete remaining arcs in succeeding passes of arcs 415, 416, 417, then 418, 419, 420, and then 421, 422, 423; using some or all of the connectors 424, 425, 426, 427, 428, 429, 430, 431, 432, 433, 434. Alternatively to laying yarn down in the connectors paths, the yarns may be cut at the end of an arc and reattached to the mandrel at the beginning of the next arc. In this way yarn from succeeding subgroups would not accumulate at the connector paths.

Subgroups in the other directions may be laid down by teaching or programming the robot along those paths, or in certain symmetric cases such as this one, by rotating the mandrel about the z-axis 441 by the desired angle 435 and repeating the program for path 410. Generally for non-symmetrical shapes, however, subsequent subgroups would be taught or programmed independently since they are not simple translation offsets of the path 410 for the first laid subgroup of the first group.

Yarn tension control is important during the dispensing along these paths to maintain the yarn onto the generally curved path. Excessive tension will cause the yarn to deviate significantly from the desired path. Preferably, a temporary aid, either mechanical or adhesive, is used on the mandrel surface and on yarns in preceding subgroups to maintain the yarn on the desired path. For instance, a pressure-sensitive adhesive may be sprayed on the mandrel at the start and on each succeeding subgroup of yarn to aid in holding the applied yarns in place. To further assist, a roller may be used on each subgroup to press the adhesive covered yarns onto the mandrel and each other. These aids may remain in the final fabric, or be removed after the final connecting step.

The final step is to connect the final subgroup to be laid down in each region, the top subgroup, with the first subgroup to be laid down in that region, the bottom subgroup, at the crossing points between the two subgroups. In general, the top and bottom subgroups are arranged to be crossing one another. Since each group does not necessarily cover the entire surface (but covers a substantial portion greater than ⅓ and preferably greater than ½ of the fabric area), the top and bottom subgroups may be different subgroups from different groups in the triaxial and biaxial regions. It is also possible to connect yarns in the top subgroup with yarns in the bottom subgroup by connecting the top and bottom yarns to yarns in intermediate subgroups at a plurality of spaced locations, rather than making precise direct connections between the top and bottom subgroup yarns. Such a process was discussed when describing the flat fabric structures.

In general terms, the above process makes a three dimensional, shaped, interlaced, fabric structure, comprising:

a stack of a first plurality of subgroups, a second plurality of subgroups, and a third plurality of subgroups, each subgroup having yarns spaced apart to define a sparse covering of a fabric area, the yarns generally parallel, and the yarns following a curved path in space;

the stacked subgroups arranged in a predetermined array with reference to a common axis and a common reference plane perpendicular to said axis;

the first subgroups arranged at a first angle with respect to said reference plane and positioned at a first rotational angle about said axis, the second subgroups arranged at a second angle with respect to said reference plane and positioned at a second rotational angle about said axis, the third subgroups arranged at a first angle with respect to said reference plane and positioned at a third rotational angle about said axis, wherein the yarns in any one of the first, second and third subgroups cross the yarns in another of the first, second and third subgroups;

within each first, second and third plurality of subgroups, the yarns of one subgroup are offset from the yarns of the other subgroups to thereby form a group of yarns for each of the respective subgroups, the group for any respective subgroups densely covering a fabric area;

the top subgroup in the stack is connected to the bottom subgroup in the stack to thereby form a three-dimensional, shaped interlaced, fabric structure.

Figure 19A:
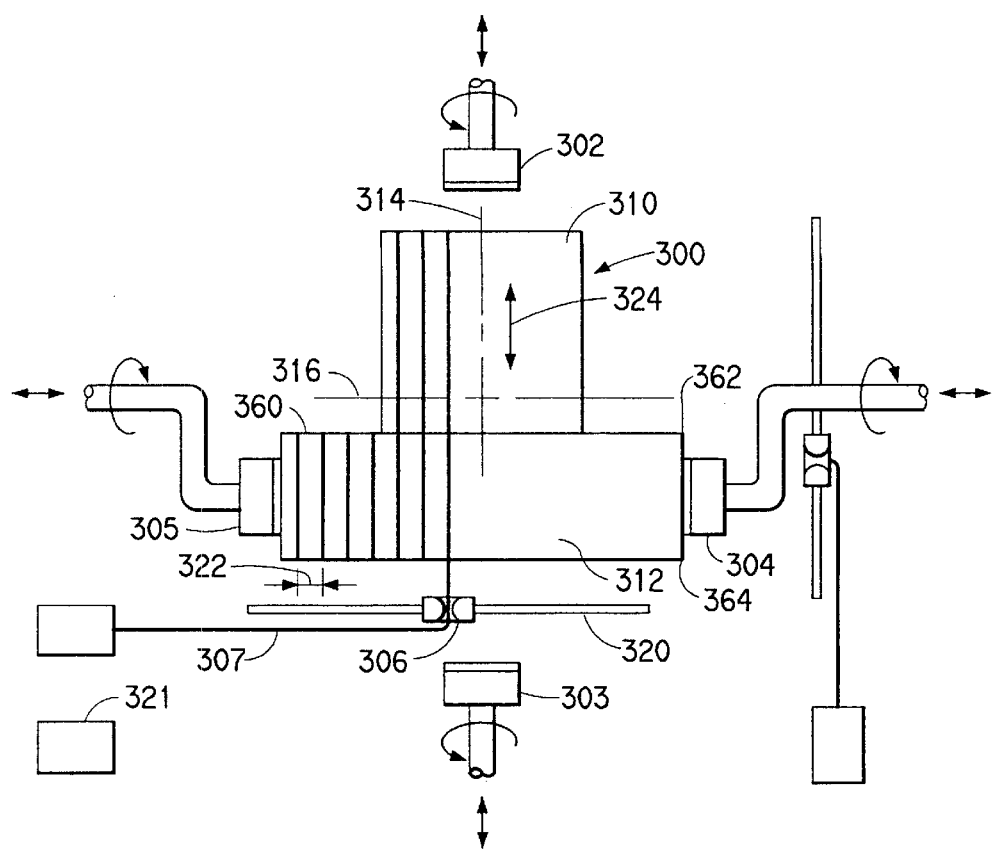

The fabric of the invention can also be wound on a composite rectangular parallelepiped form to make biaxial three dimensional fabric structures referring to FIGS. 19A–D. FIG. 19A shows a composite rectangular mandrel 300 that is the general configuration of the desired shape, which in this case would be a short sleeve shirt. The mandrel may be a solid form made of connected rectangular parallelepiped pieces, such as torso piece 310, and an shoulder piece 312 detachably connected with rods or screws or clamps (not shown). The mandrel may also be a frame structure outlining the shape, or an expandable/collapsable structure to assist in removal of the finished fabric.

Figure 19B:
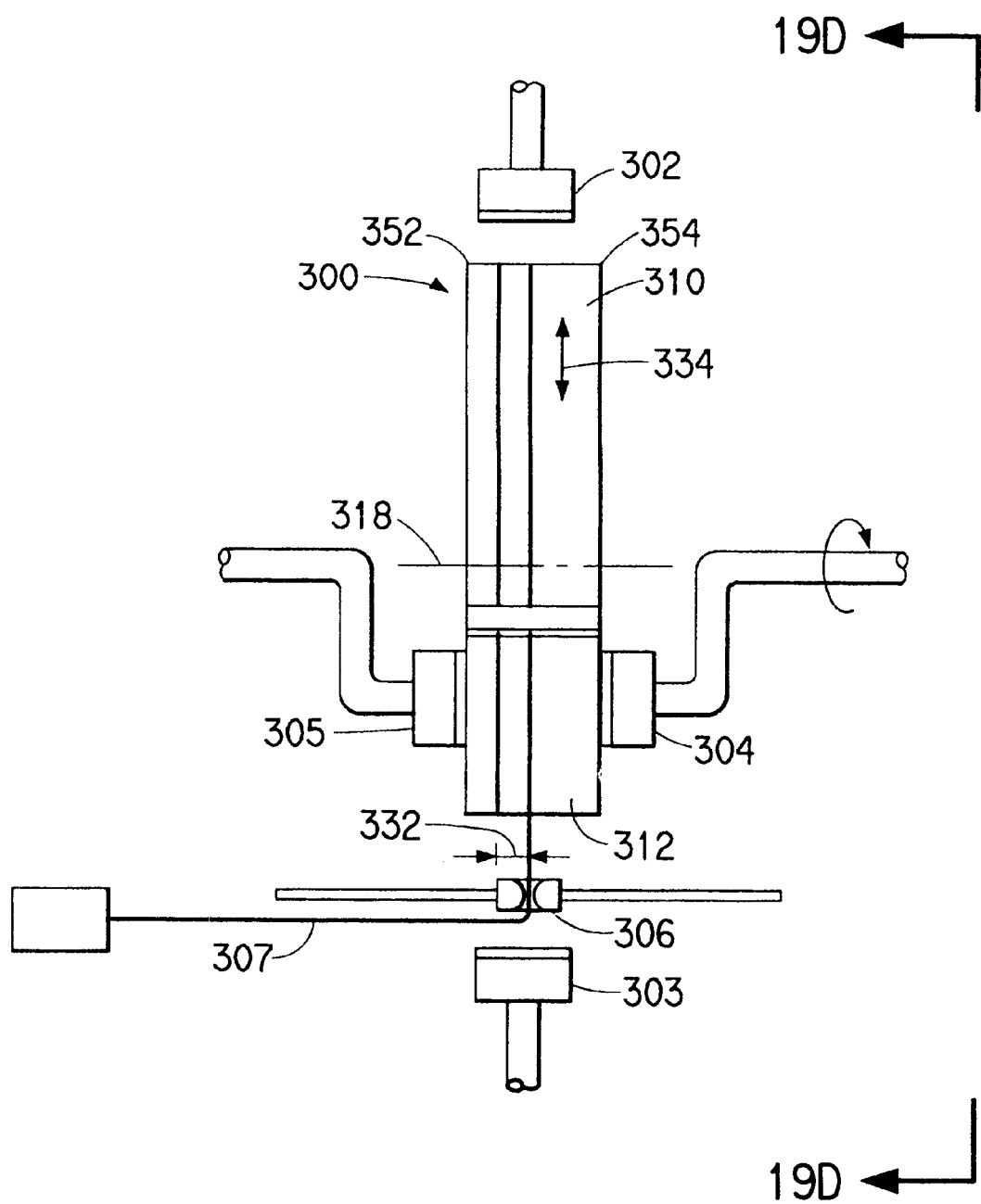

To handle the form, and rotate it around three axes for ease of fabric forming, there are two pairs of gripper devices arranged in a framework (not shown) surrounding the mandrel. A suitable framework for supporting the grippers for rotation and translation and a variable speed motor for driving them can be provided by one skilled in machinery art and will not be discussed further here. Referring to FIG. 19A, a first pair of opposed grippers 302 and 303 are arranged to support the mandrel 300 for rotation about first mandrel axis 314. A second pair of opposed grippers 304 and 305 are arranged for supporting the mandrel 300 for rotation about second mandrel axis 316. Referring to FIG. 19B, the mandrel can be reoriented 90 degrees from the position in FIG. 19A and the second pair of opposed grippers 304 and 305 are arranged for supporting the mandrel 300 for rotation about third mandrel axis 318. Each pair of grippers are moveable rotationally and axially toward and away from one another; that is, gripper 302 can rotate and move axially toward and away from gripper 303, and gripper 303 can also rotate and move axially toward and away from gripper 302.

In FIG. 19A, grippers 304 and 305 have both moved axially to engage the ends of mandrel piece 312 to rotate mandrel 300 about axis 316. The face of each gripper of the pair engaging the ends of the mandrel may be covered with a resilient high friction surface to securely grip the mandrel and any fabric laid there, or they may be covered with pins or needles to engage the ends of the mandrel and fabric. There is a first yarn guide 306 for winding a first yarn 307 onto mandrel 300 about axis 316. The guide 306 is supported and propelled by a rotating threaded rod 320 for transverse motion parallel to axis 316. The rod is supported by simple supports and driven by a variable speed motor not shown. The rotation of the mandrel grippers 304/305 and rod 320 are coordinated by a controller 321 so in one revolution of grippers 304/305 the yarn 307 moves one cell distance 322 along the mandrel 300 to lay down a first subgroup of yarn in the direction 324 on the mandrel. After covering the mandrel with one subgroup of yarn, the winding stops and grippers 302 and 303 engage the mandrel and grippers 304 and 305 retract. Grippers 302/303 rotate the mandrel 90 degrees and stop, grippers 304 and 305 re-engage the mandrel, and grippers 302 and 303 retract. This places the mandrel in the position shown in FIG. 19B.

Referring to FIG. 19B, grippers 304 and 305 have both moved axially to engage the sides of mandrel piece 312 to rotate mandrel 300 about axis 318. The first yarn guide 306 is now arranged for winding yarn 307 onto mandrel 300 about axis 318. The guide 306 will now be supported and propelled by the rotating threaded rod 320 for transverse motion parallel to axis 318. The rotation of the mandrel grippers 304/305 and rod 320 are coordinated so in one revolution of grippers 304/305 the yarn 307 moves one cell distance 332 along the mandrel 300 to lay down a first subgroup of yarn in the direction 334 on the mandrel.

Figure 19C:
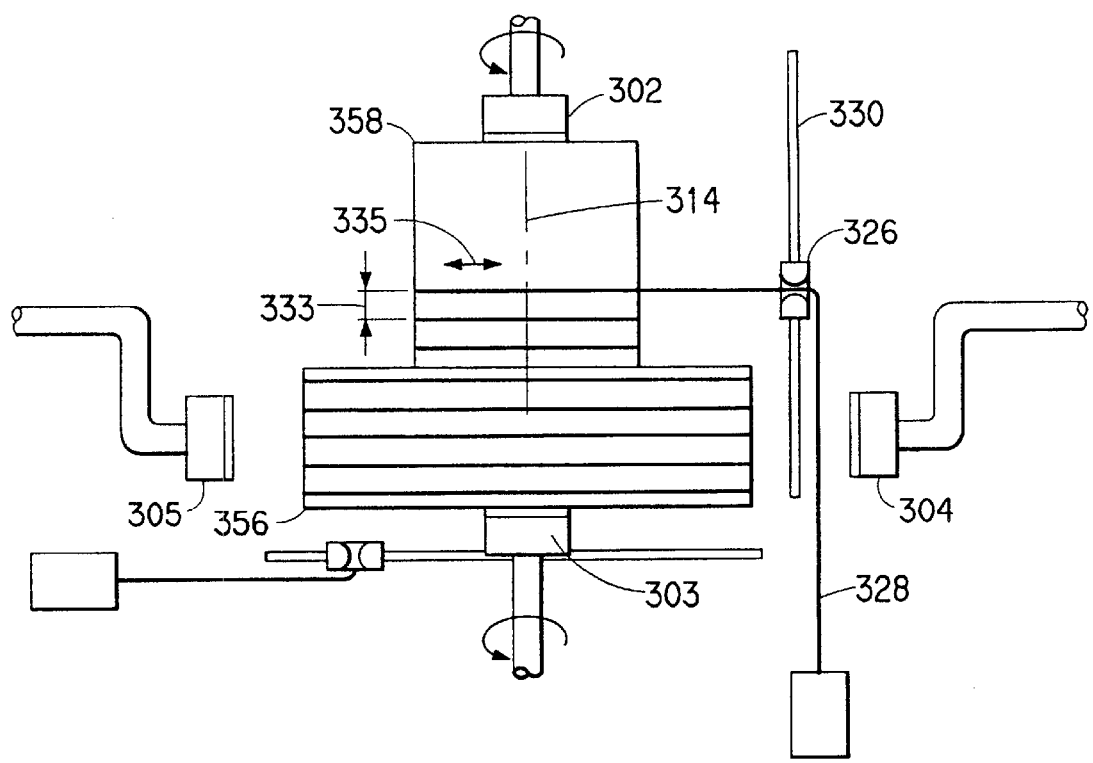
Figure 19D:
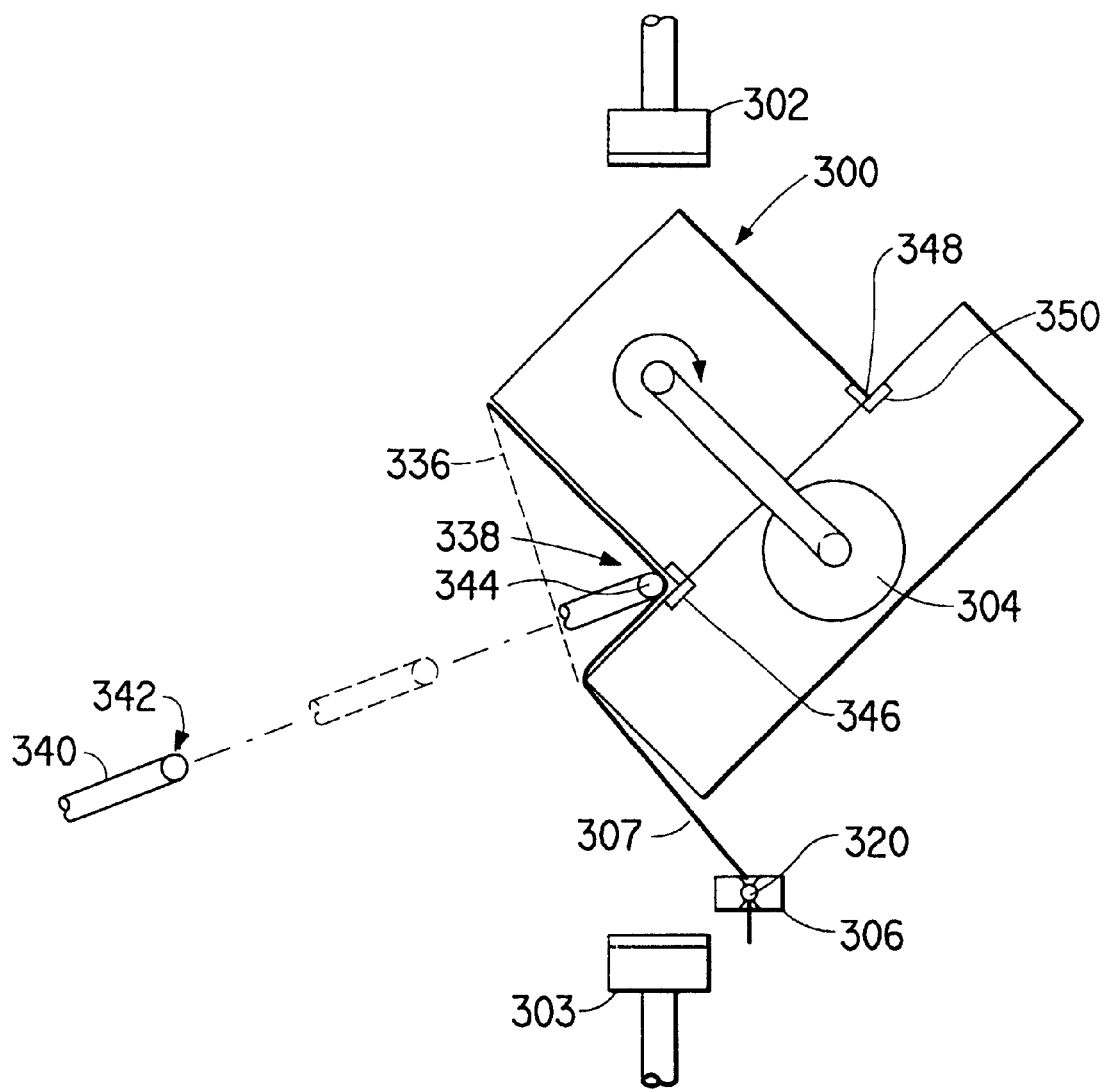

When winding yarn about axis 318 of mandrel 300, in order to lay down the yarn on the mandrel in the underarm of the shirt form, a special yarn deflector is used that is best seen in FIG. 19D, which is a side view of the mandrel and grippers shown in FIG. 19B. As the mandrel 300 is rotated, at one point the yarn 307 lies along dashed path 336 and across underarm 338 of the mandrel. At this point, a yarn deflector 340 moves from a retracted position 342 to an extended position 344 and tucks the yarn into the underarm where an insert 346 having temporary fasteners, such as hooks or adhesive, engages the yarn and holds it in position in the underarm. The deflector 340 then quickly returns to the retracted position 342 and the mandrel continues rotating and yarn continues being laid down. As the mandrel continues rotating and the other underarm 348 comes into the vicinity of the deflector 340, this cycle is repeated and the deflector tucks the yarn into underarm 348 where it is engaged by temporary fastener insert 350.

Referring to FIG. 19C, grippers 302 and 303 have both moved axially to engage the ends of mandrel 300 to rotate it about axis 314, and grippers 304 and 305 have retracted. The face of each gripper of the pair 302/303 engaging the ends of the mandrel may be covered with a resilient high friction surface to securely grip the mandrel and any fabric laid there, or they may be covered with pins or needles to engage the ends of the mandrel and fabric. There is a second yarn guide 326 for winding a second yarn 328 onto mandrel 300 about axis 314. The guide 326 is supported and propelled by a rotating threaded rod 330 for transverse motion parallel to axis 314. The rotation of the mandrel grippers 302/303 and rod 330 are coordinated so in one revolution of grippers 302/303 the yarn 328 moves one cell distance 333 along the mandrel 300 to lay down a first subgroup of yarn in the direction 335 on the mandrel.

To make a densely covered mandrel using four subgroups of yarn in each of the three directions, the following sequence of operations is preferred, although other sequences are possible:

the mandrel is gripped by grippers 304/305 as in FIG. 19B and the yarn 307 is attached to a corner 352 of the mandrel;

grippers 304/305 rotate mandrel 300 about mandrel axis 318 and yarn 307 is traversed by moving guide 306 to achieve a cell distance of 332;

the yarn is stopped at about position 354 and is cut and attached to the mandrel;

grippers 302/303 engage the mandrel 300 and grippers 304/305 retract as in FIG. 19C and the yarn 328 is attached to a corner 356 of the mandrel;

grippers 302/303 rotate mandrel 300 about mandrel axis 314 and yarn 328 is traversed by moving guide 326 to achieve a cell distance of 333;

the yarn 328 is stopped at about position 358 and is cut and attached to the mandrel;

grippers 304/305 engage the mandrel 300 and grippers 302/303 retract as in FIG. 19A and the yarn 307 is attached to a corner 360 of the mandrel;

grippers 304/305 rotate mandrel 300 about mandrel axis 316 and yarn 307 is traversed by moving guide 307 to achieve a cell distance of 322;

the yarn 307 is stopped at about position 362 and is cut and attached to the mandrel;

grippers 302/303 engage the mandrel and grippers 304/305 retract and grippers 302/303 rotate mandrel 300 to the position in FIG. 19B;

grippers 304/305 engage the mandrel and grippers 302/303 retract as in FIG. 19B and the yarn 307 is attached near corner 352 except at an offset position of one, two, or three yarn diameters from position 352;

yarn is wound once more about mandrel axis 318 at the offset position and is cut and attached near position 354;

grippers 302/303 engage the mandrel 300 and grippers 304/305 retract as in FIG. 19C and the yarn 328 is attached near corner 356 of the mandrel except at an offset position of one, two, or three yarn diameters from position 356;

yarn is wound once more about mandrel axis 314 at the offset position and is cut and attached near position 358;

grippers 304/305 engage the mandrel 300 and grippers 302/303 retract as in FIG. 19A and the yarn 307 is attached to a near corner 360 of the mandrel except at an offset position of one, two, or three yarn diameters from position 360;

yarn is wound once more about mandrel axis 316 at the offset position and is cut and attached near position 362;

the above process continues with succeeding yarns wound about a given mandrel axis being offset from preceeding yarns until the mandrel is densely covered with the four subgroups of yarns in the three directions. On any given face of the mandrel, there will be yarns in only two directions, thereby forming a biaxial fabric structure on each face;

on each face of the mandrel, the outermost subgroup of yarns are connected to the innermost subgroup of yarns where the outermost yarns cross the innermost yarns, by application of an ultrasonic horn only at the crossovers, with the mandrel acting as an ultrasonic anvil. Alternatively, a plurality of spaced ultrasonic horns could be traversed over each face of the mandrel in a diagonal path relative to the directions of the yarns on that face, similar to what was taught with the flat fabric structures;

after connecting is complete, the mandrel can be removed from the grippers and the sleeve ends of the fabric shirt can be cut open and mandrel piece 312 disengaged from piece 310 and piece 312 slid out of the cut sleeve opening;

the waist end of the fabric shirt can be cut open and mandrel piece 310 slid out of the cut waist opening;

the cut ends of fabric may be removed or may be used to form cuffs on the sleeves and waist of the shirt.

Using the above technique, three dimensional fabric articles of clothing can be made easily using relatively simple mandrels. By winding in a simple manner about three axes of the mandrel, a bidirectional yarn, three dimensional fabric can be made without cutting and seaming separate fabric pieces as in the prior art. This produces unique articles of fabric clothing without seams.

FIG. 19E illustrates the yarn pattern as seen on a corner of the mandrel at the end of a sleeve at corner 364 as also seen in FIG. 19A. The mandrel axes are labelled at 366. Several of the first subgroup of yarns laid down about the mandrel axis 318 are labelled 1; several of the second subgroup of yarns laid down about the mandrel axis 314 are labelled 2. Several of the third subgroup of yarns laid down about mandrel axis 316 are labelled 3. The subgroups are labelled in the order in which they are laid on the mandrel. For subgroups above three, only one yarn in the subgroup is labelled to illustrate the pattern that develops on the mandrel. The group of yarns laid down about mandrel axis 318 are labeled with the number 1 for the first subgroup, the number 4 for the fourth subgroup, the number 7 for the seventh subgroup, and the number 10 for the tenth subgroup. The group of yarns laid down about mandrel axis 314 are labeled with the number 2 for the second subgroup, the number 5 for the fifth subgroup, the number 8 for the eighth subgroup, and the number 11 for the eleventh subgroup. The group of yarns laid down about mandrel axis 316 are labeled with the number 3 for the third subgroup, the number 6 for the sixth subgroup, the number 9 for the ninth subgroup, and the number 12 for the twelfth subgroup. Although yarns are wound about three axes of the mandrel, on mandrel face 368, the yarns form a biaxial structure; on mandrel face 370, the yarns form a biaxial structure; and on mandrel face 372, the yarns form a biaxial structure.

Points 374 and 376 on face 368 show some typical bond points between the outermost subgroup 11 and the innermost subgroup 1. Points 378 and 380 on mandrel face 370 show some typical bond points between the outermost subgroup 12 and the innermost subgroup 2. Points 382 and 384 on mandrel face 372 show some typical bond points between the outermost subgroup 12 and the innermost subgroup 1. In general terms, the process just described for forming an interlaced shaped fabric structure comprises:

(a) providing a rectangular parallelipiped fabric support surface rotatable in three orthogonal axes thereby defining three orthogonal yarn laydown directions X, Y, and Z;

(b) laying down a first subgroup of yarns to sparsely cover the support surface in said X direction;

(c) laying down a second subgroup of yarns to sparsely cover the support surface in said Y direction and form a stack with the yarns in the X direction;

(d) laying down a third subgroup of yarns to sparsely cover the support surface in said Z direction and form a stack with the yarns in the X direction and the Y direction;

(e) repeating the laying down and stacking for each of the first, second and third subgroups and offsetting the yarns in subsequent subgroups from all yarns in previous subgroups until each of the plurality of subgroups forms a group of yarns in the respective direction for that subgroup that densely covers the mandrel surface;

(f) connecting the top subgroup in the stack to the bottom subgroup in the stack thereby forming a shaped interlaced fabric structure.

EXAMPLES

Example 1

A fabric structure was made from a sheath/core yarn of 710 total denier which included a 400 denier core of continuous multifilaments of nylon 6,6 flat yarn having 6 denier per filament. The core was wrapped with a sheath of staple fibers comprised of a nylon 6,6 copolymer containing 30% by weight of units derived from MPMD (2-methyl pentamethylene diamine) which had a melt point lower than the core polymer. The staple fibers being wrapped on the core were a sliver of 1.5 inch staple length and 1.8 dpf. This yarn was made on a "DREF 3 Friction Spinning Machine" manufactured by Textilemachinenfabrik Dr. Ernst Fehrer AG of Linz, Austria. The fabric structure had 16 subgroups arranged as in FIG. 2A and was wound on a device as in FIG. 11B. The fabric cell distance contained 8 yarns. The bonds were made circumferentially using an ultrasonic generator made by the Dukane Co., model #351 Autotrak, which was operated at 40 kHz with a force against the mandrel of about 4–5 lbs. The horn speed along the mandrel was such that about 0.2 joules per bond of ultrasonic energy was applied to the fabric. The bond paths were spaced about 0.2 inches apart and the horn tip was about 0.1 inch wide and 0.75 inches long with a slightly concave surface across the 0.1 dimension for about 0.5 inches of the length. At the concave end of the bonding surface, there was a radius to eliminate the leading corner and the concavity followed the radius. The horn did not make full contact along the 0.75 inch dimension due to the radius of the mandrel. The horn made highly bonded regions at the edges of the concave surface. It is believed that an improvement in bonding would be realized with a narrower horn of about 0.04 inches width with a flat bonding surface instead of a concave one.

After bonding, the fabric was removed from the mandrel and was given a tensile test in a direction parallel to one group of the yarns. The maximum theoretical tensile strength of this fabric without any bonds was computed to be 148 lbs/inch by multiplying the yarn strength of 4.6 lbs by 32 yarns per inch. The bonded fabric of the invention had an actual grab strength of about 120 lbs/inch. It is believed that the sheath/core yarn bonded by primarily melting the lower melting sheath, while the core filaments remained essentially undisturbed, so the strength of the fabric was not significantly diminished due to bonding. In another test of a fabric made with 630 denier nylon 6,6 multifilament yarn without the low melting sheath structure, the theoretical unbonded fabric tensile strength was 370 lbs/inch, and the actual bonded grab strength was 120 lbs/inch. This indicated a significant reduction in strength for the bonded multifilament yarn compared to the strength reduction with the bonded low melting sheath. The low melting sheath offers a significant strength improvement when ultrasonic bonding is used for connecting the yarns.

Example 2

A fabric structure was made with limited permeability by inserting film sheets in the fabric structure during fabrication. A sample was made using 630 denier continuous multifilament yarn wound on the device of FIG. 11B and bonded with the ultrasonic system described in Example 1. The fabric cell distance contained 8 yarns. The film sheet was about a 3–5 mil thick Bynel polypropylene film. The fabric was made by first laying two subgroups on the mandrel followed by a sheet of film, followed by 12 subgroups of yarn, followed by another sheet of film, followed by 2 subgroups of yarn. The fabric was then bonded in the manner of Example 1. The fabric was removed from the mandrel and when examined by blowing air at the fabric, it was found that very little air passed through the fabric and this occurred only at the bonded region.

Example 3

A reinforced fabric structure was made by adding a sheet of spunbonded nonwoven fabric in the structure during fabrication. The yarn was the same yarn as in Example 2. The nonwoven was a low melt copolymer polyamide weighing about 1 oz/sq yd. The fabric was made in the manner of Example 2. Fourteen subgroups of yarn were wound on the mandrel, the nonwoven sheet was laid on the mandrel and two subgroups of yarn were wound over the nonwoven. The fabric was bonded in the manner of Example 1. The fabric was removed from the mandrel and was found to have improved strength and reduced deflection in the bias direction.

Example 4

A preform for a composite panel was made using a non-thermoplastic yarn and sheets of thermoplastic film. The yarn was 840 denier continuous multifilament aramid (Kevlar™) flat yarn. The film sheet was a 2–3 mil thick polyester film. The fabric was made in the manner of Example 2. Two subgroups of yarn were wound on the mandrel, followed by a film sheet, followed by four subgroups of yarn, followed by a film sheet, followed by four subgroups of yarn, followed by a film sheet, followed by four subgroups of yarn, followed by a film sheet, followed by two subgroups of yarn, for a total of 16 subgroups of yarn and four film sheet. The film made up about 15% by weight of the fabric. The fabric was bonded in the manner of Example 1. The fabric was removed from the mandrel and was found to have adequate integrity for handling as a composite preform.

Example 5

A fabric was made with a cotton sliver web inserted during fabrication to make a fabric that was soft to the touch. The yarn was the same as used in Example 2. The cotton was a sliver formed into a web of about 8×11 inches and about 0.5 oz/sq yd weight. The fabric was made in the manner of Example 2. Eight subgroups of yarn were wound on the mandrel, followed by the cotton web. followed by eight subgroups of yarn. The fabric was bonded in the manner of Example 1. The fabric was removed from the mandrel and was found to be a soft coherent structure, but it could be separated along the cotton web. It is believed that the integrity of the structure could be improved by adding some nylon 6,6 staple, or a low melting copolymer nylon 6,6 staple, to the cotton sliver by blending before making the cotton web. It is believed this would improve the bonding of the nylon yarns together through the cotton web.

Example 6

A fabric structure was made with natural fibers as the inner subgroups and thermoplastic fibers as the first and last subgroups. The structure used 8 feed yarns with 28 subgroups. The natural cotton yarns had a denier of 1600, while the thermoplastic yarns were nylon 6,6 of 630 total denier. The laydown sequence was as follows: first subgroup was nylon 6,6; next 26 subgroups were cotton; and the last subgroup was nylon 6,6. The structure was then bonded by tracing the path of each yarn in the last subgroup with the ultrasonic horn, bonding along the length to bond each intersection of the first and last subgroup.

Example 7

A fabric structure was made of Dacron™ yarns (1.3 dpf, 255 total denier) consisting of repeating groups of subgroups. The fabric consisted of a two-layered fabric structure where one layer is a stack of two groups of subgroups that form a densely covered area, and the other layer is an identical group of subgroups that form a second densely covered area. The resulting fabric had a basis weight equivalent to a fabric consisting of the same number of total subgroups that were parallel but offset with no subgroups on top of one another, but gave a bulkier feel and appearance.

For comparison, three separate fabrics were made to explore the effect of different fabrication techniques on the bulk of the finished fabric. All fabrics were made using the above yarn placed in 16 guides in the ring of the device of FIG. 11B. All fabrics were bonded the same using the circumferential bonding process of Example 1. Fabric A was comprised of two groups of yarns having a combined total of 18 subgroups, and with 9 yarns per cell space to make a 1 oz/yd$^2$ fabric. Fabric B was comprised of two groups of yarns having a combined total of 36 subgroups, and with 18 yarns per cell space to make a 2 oz/yd$^2$ fabric. The yarns in Fabric B were more closely packed in the same cell space as were the yarns of Fabric A. Fabric C was comprised of a two-layered fabric structure where a first layer like Fabric A was formed, and then a second layer like Fabric A was formed on top of the first layer to make a fabric with a combined total of 36 subgroups of yarn to make a 2 oz/yd$^2$ fabric. The two layers were bonded only after both layers were wound onto the mandrel. The 3 fabrics were removed from the mandrel and were examined visually and by hand for bulk. Fabric A seemed to have the least bulk; Fabric C had the most bulk; Fabric B had a bulk level between that of Fabric A and Fabric C. It was surprising that packing more yarn into a cell space produced more bulk (comparison of Fabric A and Fabric B) and that a two-layered structure with the same quantity of yarn produced more bulk (comparison of Fabric B and Fabric C). Since all fabrics were bonded the same, this indicated that yarn packing and layering can also be used to control bulk.

Example 8

Miscellaneous samples were made using two ply, bulked, continuous filament (BCF) nylon 6,6 carpet yarn of 2500 denier and 19 denier per filament; and using staple nylon 6,6 carpet yarn. The bonding energy for this large denier yarn may be as much as 1–2 joules of ultrasonic energy per yarn crossing. Miscellaneous samples were also made using 150 denier, 0.75 denier per filament textured polyester yarn. Flat and three dimensional samples were also made manually using ⅛–¼ inch diameter rope or cord and plastic ties for connecting the yarns where the outermost subgroups cross.

The fabric structure of the invention can be made by a variety of ways, including by manual and automated means, either in a batch or continuous manner, and using a wide variety of yarns and connecting means.

What is claimed is:

1. A method of forming a fabric of interlaced yarn, comprising:
   (a) providing an elongated fabric support surface having an elongated axis and opposed lateral edges parallel to the axis, and arranging the surface adjacent a plurality of yarn guide blocks arranged along opposed lateral edges of the elongated surface;
   (b) providing a plurality of guides on said guide block, each guide adapted to guide a yarn from a yarn source to the support surface;
   (c) engaging the yarns at one edge of said support surface;
   (d) providing relative motion between the support surface and each of the plurality of guide blocks so that the guide blocks deposit yarn from the guides onto the surface in a first diagonal direction relative to the edge of the surface and in a predetermined direction along the support surface to sparsely cover a predetermined support surface area with Yarns in said first diagonal direction at a repeating cell distance of three or more yarn widths;

(e) engaging the yarns at an opposed edge of said support surface;

(f) reversing the relative motion of the guide blocks and support surface so that the guide blocks deposit yarn from the guides onto the surface in a second diagonal direction relative to the edge of the surface and in said predetermined direction to sparsely cover said predetermined support surface area with yarns in said second diagonal direction at a repeating cell distance of three or more yarn widths, the second diagonal direction crossing the first diagonal direction;

(g) arranging said guide blocks and guides along said elongated surface and arranging said relative motion so that when said yarns from said blocks are deposited on said surface, the diagonal positions of the yarns from one block are offset from a direct overlapping alignment with the yarns from the remaining blocks to thereby densely cover the support surface with said yarns in one cycle of said relative motion from one edge to the opposite edge and back to the one edge during repeated cycles of said relative motion;

(h) connecting a portion of the yarns deposited in the first direction to yarns deposited in the second direction where they cross.

2. The method of claim 1 wherein providing said relative motion comprises moving said support surface in a predetermined direction along said axis of said surface and moving said guide blocks in a direction along a path from said one edge to said opposed edge, said path substantially perpendicular to said axis.

3. The method of claim 2, in which at least one of said blocks is arranged along one edge and at least another said block is arranged along said same edge and said one and another of said blocks move from one edge to said opposed edge in unison during said providing of relative motion.

4. The yarn product made by the method of claim 3.

5. The method of claim 1, in which at least one of said blocks is arranged along one edge and at least another of said blocks is arranged along said opposed edge and said one and another of said blocks move toward and away from each other as they move from one edge to an opposed edge during said providing of relative motion.

6. The yarn product made by the method of claim 5.

7. A method of forming a fabric of interlaced yarn, comprising:

(a) providing an elongated fabric support surface on a rotatable mandrel having a rotational axis and opposed lateral ends substantially perpendicular to said axis, and (b) orienting the surface adjacent a circumferential yarn guide ring substantially perpendicular to said axis, the ring arranged adjacent a lateral end of the fabric support surface;

(c) providing a plurality of guides on said guide ring, each guide adapted to guide a yarn from a yarn source to the support surface, the guides equally spaced to deposit yarn at equal intervals around the mandrel circumference;

(d) engaging the yarns at one end of said support surface;

(e) providing relative motion between the support surface and the guide ring so that the ring deposits yarn from the guides onto the surface in a first diagonal direction relative to the ends of the surface from one end to the opposed end and in a predetermined rotational direction along the support surface the yarn in said first diagonal direction spaced at a repeating cell distance of 3 or more yarn widths, thereby sparsely covering a predetermined fabric area on the mandrel surface with yarns in said first direction;

(f) engaging the yarns at an opposed end of said support surface;

(g) reversing the relative motion of the guide ring and support surface so that the guide ring deposits yarn from the guides onto the surface in a second diagonal direction relative to the ends of the surface from said opposed end to said one end and in said predetermined rotational direction along the support surface the yarn in said second diagonal direction spaced at a repeating cell distance of 3 or more yarn widths, thereby sparsely covering the predetermined fabric area on the mandrel surface with yarns in said second direction, the yarns deposited in said second direction crossing the yarns deposited in said first direction;

(h) arranging said guide ring and guides and arranging said relative motion so that when the yarns from said guides on the guide ring are subsequently deposited on said surface, the diagonal positions of subsequently deposited yarns are placed in said cell distances at positions offset from a direct overlapping alignment with previously deposited yarns in each first and second diagonal direction to thereby densely cover the support surface with said yarns after repeated cycles of relative motion from said one end to the opposed end and back to said one end.

8. The method of claim 7, wherein arranging said relative motion comprises stopping said relative motion between said guide ring and said mandrel support surface when said guide ring first returns to said one end and continuing said predetermined rotation of said mandrel surface for a predetermined distance to place a subsequently deposited yarn in a predetermined offset position relative to a previously deposited yarn in said first direction and before the reversing of said relative motion; and repeating said stopping, said continuing, and said reversing at said opposed end to place a subsequently deposited yarn in a predetermined offset position relative to a previously deposited yarn in said second direction and before the reversing of said relative motion; and stopping said relative motion between said guide ring and said mandrel support surface when said guide ring has placed a yarn in all offset positions for each first and second directions to thereby densely cover a fabric area on the mandrel support surface.

9. An interlaced fabric structure made by the method of claim 7.

10. The method of claim 8 wherein continuing said predetermined rotation of said mandrel surface for a predetermined distance comprises:

defining two or more equal subintervals of offset positions between the first deposited yarns in the first and second directions;

sequentially continuing said predetermined rotation at said one end and opposed end to place subsequently deposited yarns in each direction at these subintervals;

further sequentially continuing said predetermined rotation at said one end and opposed end to progressively place yarns in each subinterval at positions offset from a direct overlapping alignment with previous yarns to thereby complete the placing of yarns in all offset positions in all the subintervals together to densely cover the predetermined fabric area.

11. A method for forming an interlaced fabric structure, comprising the steps of:

(a) providing an elongated fabric support surface having an elongated axis and opposed lateral edges, wherein a machine direction (MD) is defined in the direction of the elongated axis and a cross-machine direction (XD) is defined between opposed edges;

(b) laying down at the support surface a plurality of yarn subgroups having yarns oriented in the MD, each subgroup laid down at spaced locations along the elongated axis, the yarns in each one MD subgroup located at positions in the XD different from other MD subgroups and thereby offset from a direct overlapping alignment therewith;

(c) laying down at the support surface a plurality of yarn subgroups having yarns oriented in the XD, each subgroup laid down at spaced locations along the elongated axis, an XD subgroup spaced from a respective MD subgroup, the yarns in each one XD subgroup located at positions in the MD different from other XD subgroups and thereby offset from a direct overlapping alignment therewith;

(d) moving the support surface in a predetermined direction aligned with the elongated axis to bring together the yarns deposited from all MD and XD subgroups to form a stack;

(e) urging the subgroups together and connecting the top subgroup in the stack to the bottom subgroup in the stack to thereby form an interlaced fabric structure.

12. An interlaced fabric structure made by the method of claim 11.

13. A method for forming an interlaced shaped fabric structure, comprising the steps of:

(a) providing a rectangular parallelepiped fabric support surface rotatable in three orthogonal axes thereby defining three orthogonal yarn laydown directions X, Y, and Z;

(b) laying down a first subgroup of yarns to sparsely cover the support surface in said X direction;

(c) laying down a second subgroup of yarns to sparsely cover the support surface in said Y direction and form a stack with the yarns in the X direction;

(d) laying down a third subgroup of yarns to sparsely cover the support surface in said Z direction and form a stack with the yarns in the X direction and the Y direction, (e) repeating the laying down and stacking for each of the first, second and third subgroups and offsetting the yarns in subsequent subgroups from all yarns in previous subgroups until each of the plurality of subgroups forms a group of yarns in the respective direction for that subgroup that densely covers the mandrel surface;

(f) connecting the top subgroup in the stack to the bottom subgroup in the stack thereby forming a shaped interlaced fabric structure.

14. The method of claim 13, further comprising the step of separating the fabric support surface from the fabric.

15. An interlaced shaped fabric structure made by the method of claim 14.

\* \* \* \* \*